Aug. 3, 1965    R. A. LOCKE ETAL    3,198,427
KEYBOARD CONTROLLED RECORDING MACHINE
Filed April 27, 1962    14 Sheets-Sheet 1

INVENTORS.
Robert A. Locke
Gunnar Pohevitz
Joseph Kolar
Paul H. Smith
Kenneth R. Strandberg
BY
ATTORNEY.

Aug. 3, 1965  R. A. LOCKE ETAL  3,198,427
KEYBOARD CONTROLLED RECORDING MACHINE
Filed April 27, 1962  14 Sheets-Sheet 2

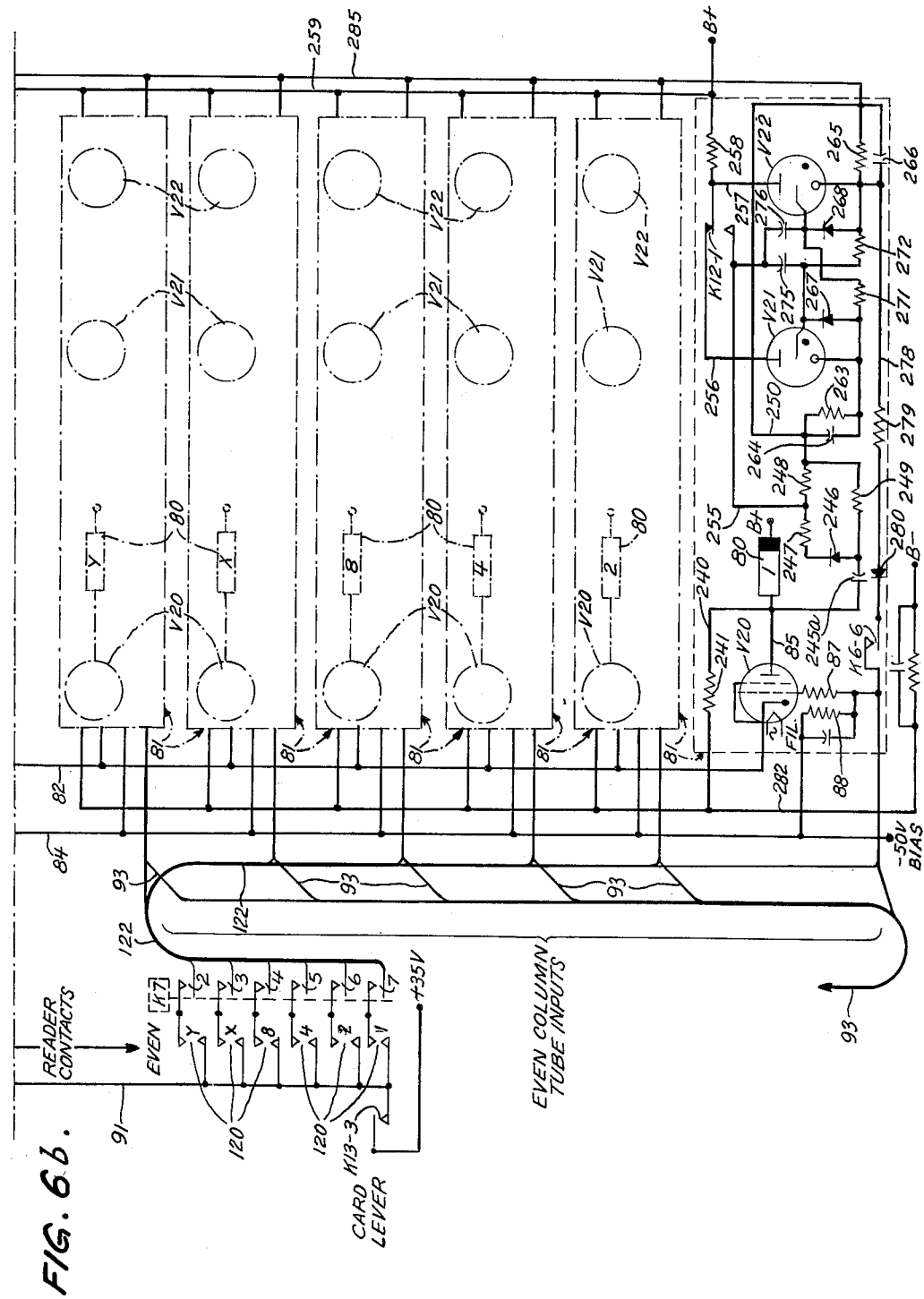

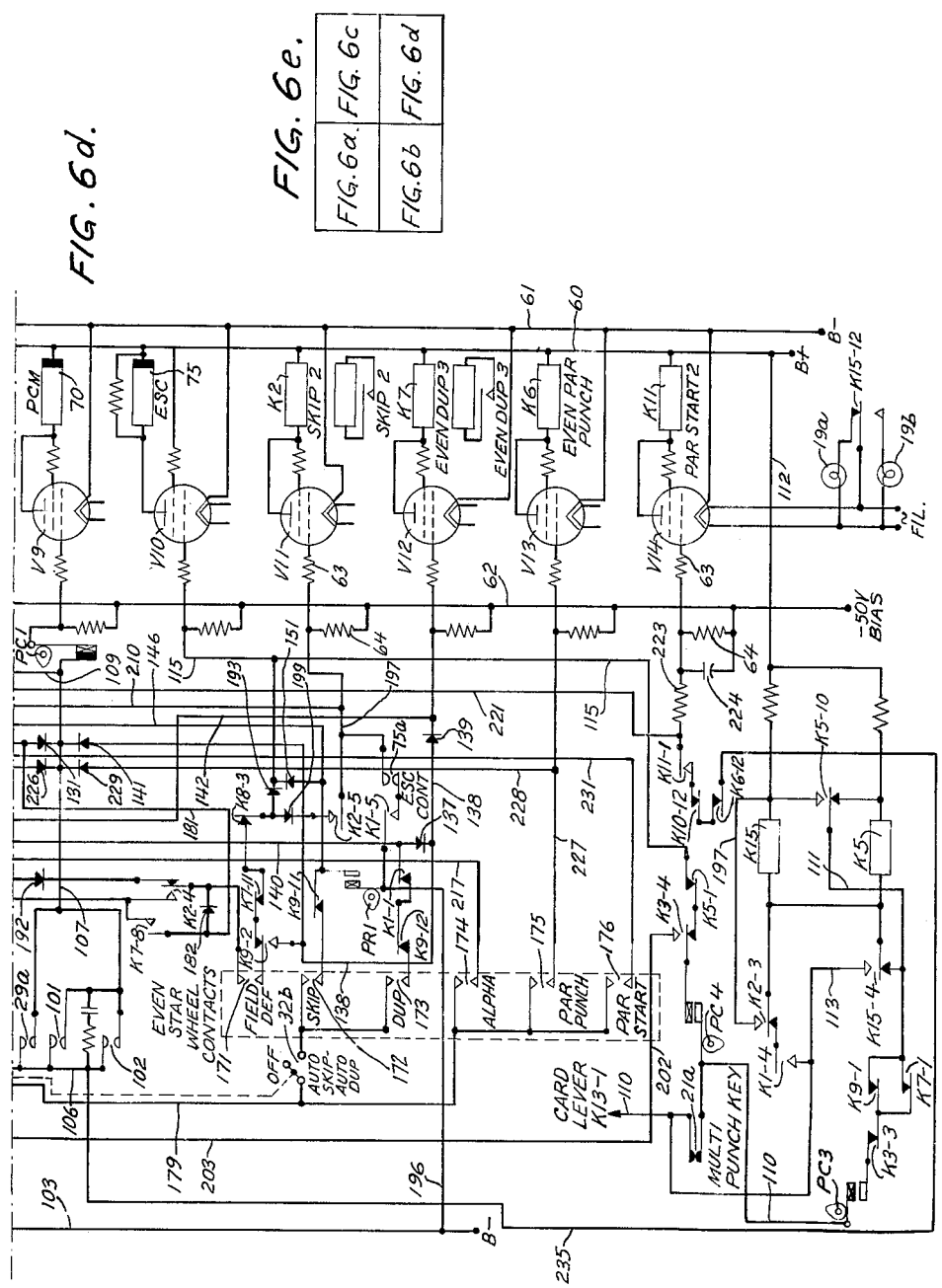

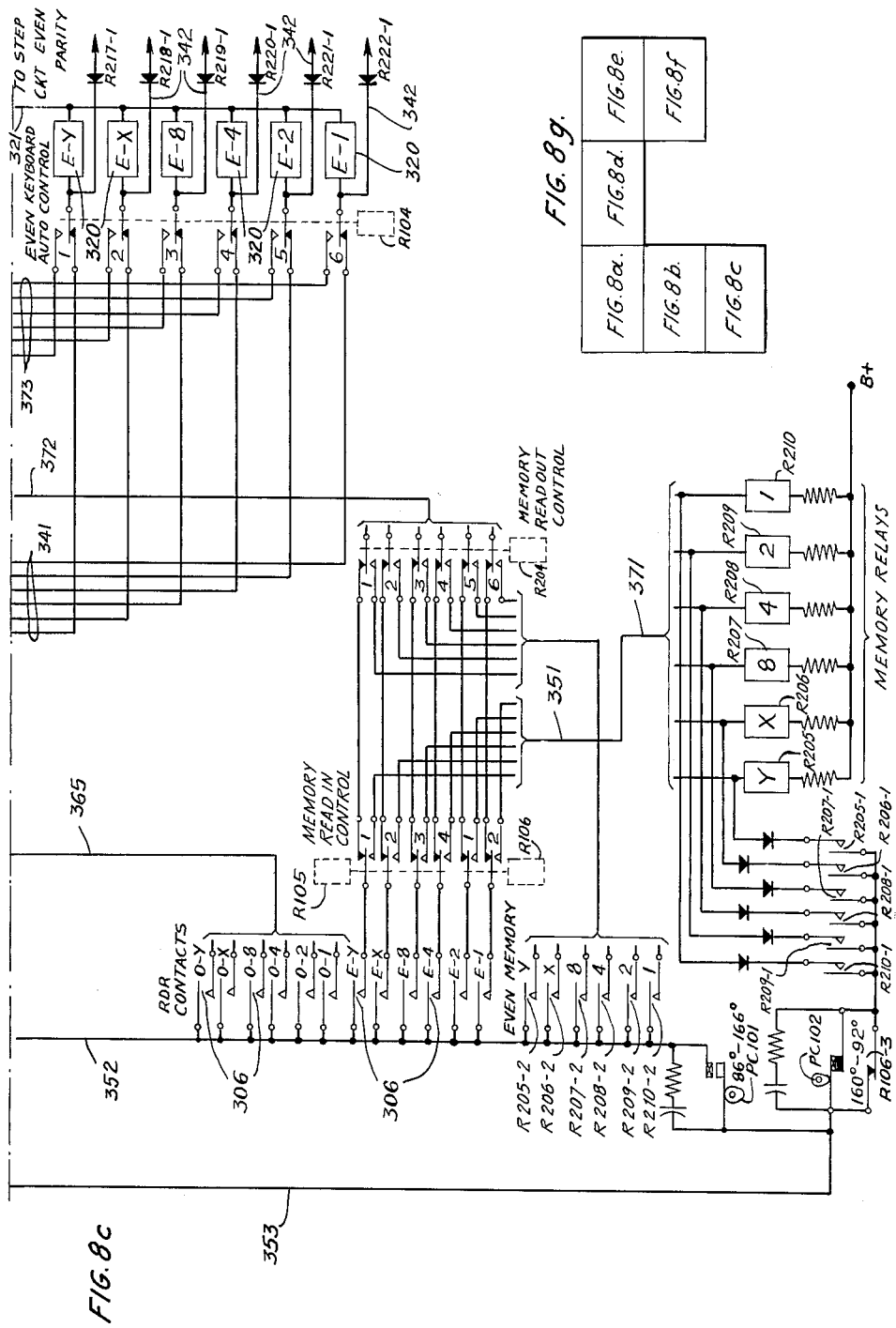

United States Patent Office 3,198,427
Patented Aug. 3, 1965

3,198,427
KEYBOARD CONTROLLED RECORDING MACHINE
Robert A. Locke, Easton, Conn., Gunnar Pohevitz, Brooklyn, and Joseph Kolar, Mount Vernon, N.Y., Paul H. Smith, Weston, Conn., and Kenneth R. Strandberg, Deer Park, N.Y., assignors to Sperry Rand Corporation, New York, N.Y., a corporation of Delaware
Filed Apr. 27, 1962, Ser. No. 190,529
44 Claims. (Cl. 234—18)

The present invention relates geneally to data recording machines and has more particular reference to machines of this character operable under keyboard control for recording information into a record medium in a column by column manner.

The invention is herein disclosed in embodiments adapted for recording information on a standard sized tabulating or punched card. One form of tabulating card now in common usage is known as an 80 Column or "Hollerith" card which is capable of recording eighty separate items of information by perforation code patterns, one code pattern in each vertical card column. In this form of card each card column contains twelve index or punching positions which, by various combinations of perforations within a column, record data in what may be referred as a twelve bit code.

In key punches now in common usage the card is advanced in step movement, column by column, past a row of twelve punches which are selectively actuated under keyboard control to punch the desired code pattern in a card column in the course of a punching cycle. In conjunction with each punching cycle the card is also advanced to present the next successive column of the card into punching position.

The machine according to the present invention makes use of a punch code requiring only six index or punch positions i.e., a six bit code, and in so doing makes it possible to double the information bearing capacity of the standard size Hollerith or 80 Column Card since only half the number of index positions of a former card column are now required to constitute a single card column. In adapting the standard size Hollerith card for this increased capacity, the twelve vertically aligned index positions which formally constituted one card column may be considered as divided in half, the upper six positions constituting a single card column for receiving information in a six bit code with the lower six positions constituting another card column, whereby the card may be regarded as being divided horizontally in half with eightly columns in the upper half of the card and eightly columns in the lower half of the card. In carrying out the concepts of the present invention the six position columns are numbered in consecutive sequence alternating from upper half to lower half columns so that starting from the left hand edge of the card the first six vertically aligned index positions in the upper half of the card are considered as card column "1" while the first six index positions in the lower half of the card are considered card column number "2," with card column "3" comprising the next six vertically aligned index positions in the upper half of the card and so on. Accordingly, the eighty columns contained in the upper half of the card will be all the odd numbered columns starting at the left with column "1" and ending at the right hand end of the card with column "159," while all the columns contained in the lower half of the card will be even numbered columns starting with column number "2" and ending with column "160."

The machine according to the present invention is adapted to punch the several card columns consecutively in accordance with the above described numbering sequence of the columns, and this is accomplished during the course of a single pass of the card through a punch station containing a line of twelve punches, six of which are operable in the even numbered card columns and six being operable in the odd numbered card columns. By adopting this alternate odd-even column sequence of punching the necessity for escaping the card in connection with each punch operation is avoided, and this contributes greatly to the speed of processing the card, particularly in duplicating, skipping and releasing operations since two columns of the card, one odd and one even, are processed in these operations simultaneously.

An important feature of the present invention is the provision of means for automatically punching the card column defining the end of a selected card field in the index position required to give every horizontal row of index positions within the field the same parity count so as to enable a parity check to be made on the selected field when the card is subsequently processed by associated card processing equipment having appropriate parity check means therein. In the machine of the present invention odd parity is employed so that upon completion of key punching of a selected field if the total number of punches in any row of index positions within the field should be an even number, the next horizontally adjacent column will be automatically punched in the same row position, whereas if the total number of punches in a given row is an odd number the next horizontally adjacent column will not be punched at that row position, thereby providing all rows within the field with an odd parity count. Since a card field of successive columns, in accordance with the novel card format with which the present invention is concerned as heretofore described, will always include both odd and even numbered columns which are located in both the upper and lower half of the card, two columns are reserved for receiving the parity punching, i.e. the last odd column of the selected parity field and the last even column of the selected field. There is no restriction on the number of fields of the card which may be selected for parity punching or on the number of columns within the field. The parity count and subsequent punching at the termination of the selected field is brought into operation automatically by the so called program card which, as well known in the art, is prepunched and inserted in the machine to be advanced in synchronism with the card being processed so as to exercise automatic control over certain functions of the machine.

It is therefore one of the principal objects of the invention to provide an improved key punch operable for recording data on cards having separate data recording columns in each upper and lower half of the card.

It is a further object of the invention to provide, in a column by column key punch, means enabling sequential punching of card columns arranged alternately in separate halves of the card.

It is a further object of the invention to enable, in a key punch of the character described having means for duplicating information from one card to another, the duplication of two card columns simultaneously.

It is a further object of the invention to provide, in the machine of the character described, means for automatically punching, at the termination of a selected card field comprised of a plurality of successive card columns, perforations which will provide all rows of index positions within the selected card field with the same parity condition.

Further objects of the invention together with the features contributing thereto and advantages accruing therefrom will be apparent from the following description when read in conjunction with the accompanying drawing wherein.

Figure 6A:
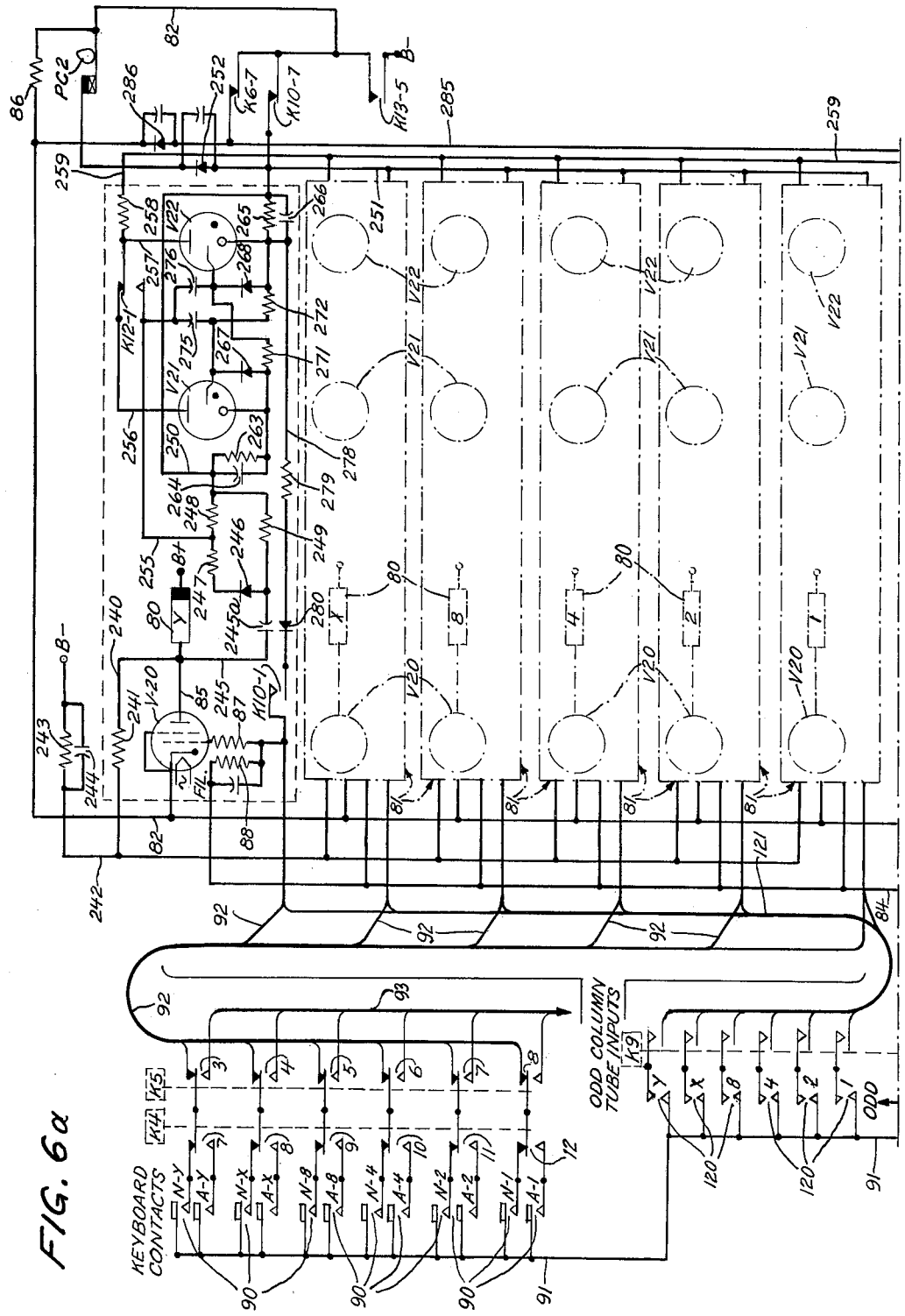

FIGS. 6a, b, c, and d when arranged in accordance with the plan of FIG. 6e comprise a wiring diagram of the machine incorporating said first embodiment of the invention.

Figure 7A:
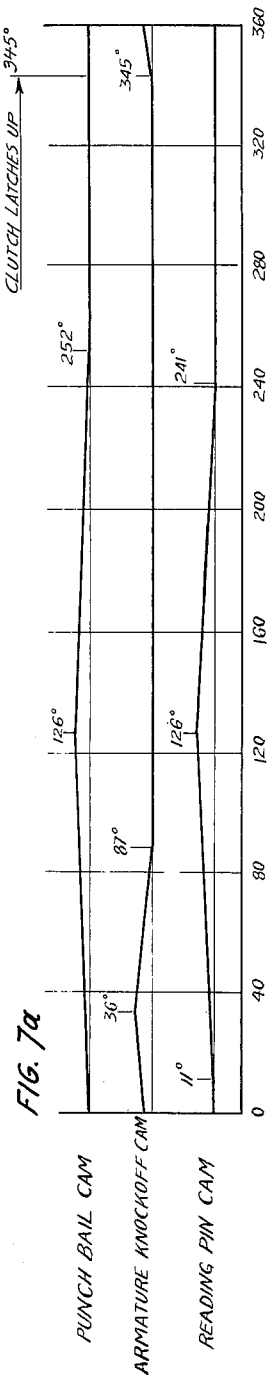

FIGS. 7a, b and c are timing charts for a machine incorporating a second embodiment of the invention.

Figure 8A:
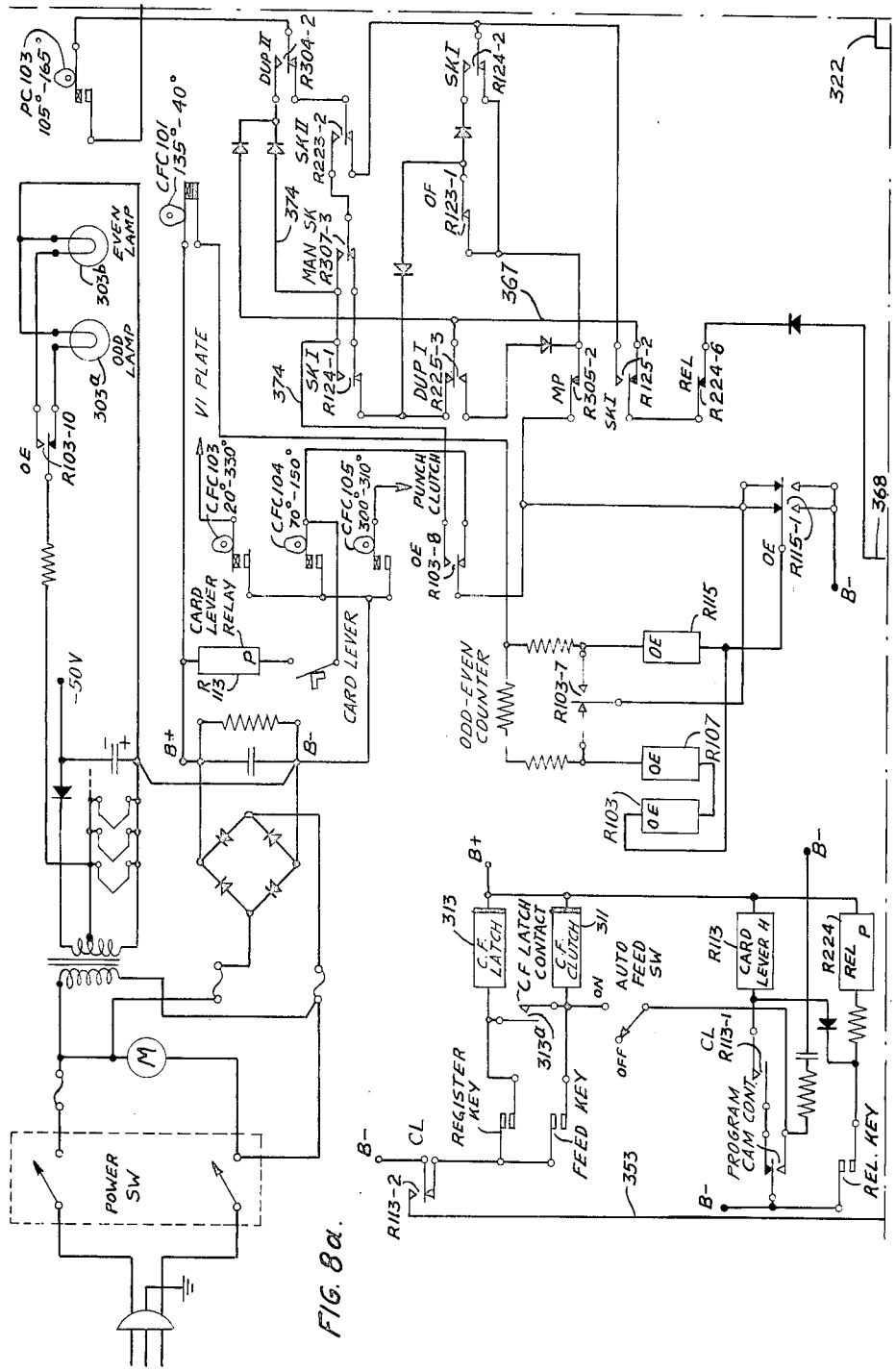

FIGS. 8a, b, c, d, e, f, when arranged in accordance with the plan of FIG. 8g, comprise a wiring diagram for the machine incorporating said second embodiment of the invention.

The machine according to the present invention makes use of mechanical features of a well known column by column key punch which is fully shown and described in United States Patent No. 2,647,581, issued to E. W. Gardinor et al. on August 4, 1953. For a full understanding of the mechanical features of the machine, reference may be had to the aforesaid patent, and it is not deemed necessary for an understanding of the novel inventive concepts herein disclosed to include a detailed description and disclosure of the machine structure and its mechanical components. Generally stated, the invention is carried out by substituting a new control circuit for the machine of the aforesaid patent which circuit represents a novel logical approach to the control of the machine and includes additional circuit features whereby the several objects of the invention are accomplished. As in the machine of the aforesaid patent, the control circuit includes a number of contacts operated by cams on the various drive shafts, and in certain instances, primarily those associated with the punch shaft, the timing of these cams has been changed. Also associated with the punch shaft are a number of cams for performing mechanical functions within the machine such as actuating the punches and the reading pins, and in the first embodiment of the invention the timing of these cams also has been changed, as will be apparent from the description and the timing chart herein contained, although the function of these mechanical cams has not been changed. Other mechanical changes over the machine of the aforesaid patent relate to the keyboard which is of expanded capacity to take advantage of all possible code combinations in a six bit binary code and which is modified with respect to its permutation couplings to the keyboard for the purpose of encoding into a six bit code rather than the twelve bit code of the machine of the aforesaid patent, which modification is accomplished without change in the encoding principle involved. Another structural modification in the first embodiment of the invention relates to the card registration mechanism which has been altered to the extent of registering a card at the completion of a card feed cycle with the first card column in position to be punched as opposed to the machine of the aforesaid patent wherein the card is registered in a position one column in advance of the first card column, referred to in the aforesaid patent as the zero card column. The column indicator associated with the program card drum has also been modified to the extent of making provision for an additional column indicator disk so as to provide a separate indicator disk for the odd numbered columns contained in the upper half of the card and another separate disk for the even numbered columns contained in the lower half of the card, since in accordance with the novel columnar format employed with the instant machine both an odd and even column are in punching position at each escapement position of the card relative to the punch station.

Accordingly, it is believed that a detailed description of the novel control circuit disclosed herein, including reference to corresponding circuit elements in the circuit disclosed in the aforementioned patent along with brief statement of the mechanical function effected thereby, when considered in relation to the novel columnar format of the card processed by the machine and the minor structural changes in the patented machine as will be hereinafter more fully explained, will enable a clear understanding of the inventive concepts herein disclosed.

Figure 1:
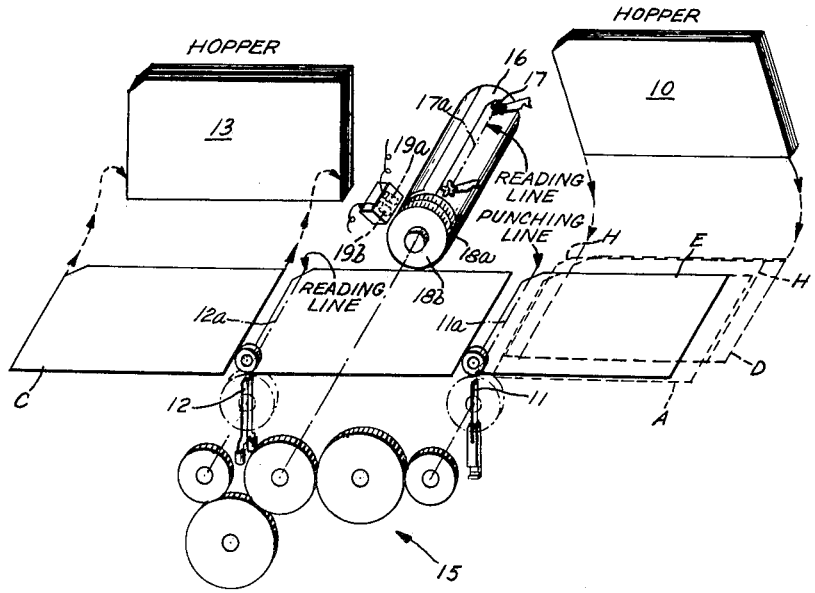
FIG. 1 is a diagrammatic view showing the path of travel of the cards through the machine from the supply magazine or hopper to the discharge stacker.

As shown in FIG. 1, and as fully described in the aforementioned Patent No. 2,647,581, cards are fed from a card magazine or hopper generally designated 10 upon the initiation of a card feeding cycle, by card picker mechanism and feed rolls operative during a card feeding cycle, to a position not fully within the card feed bed and indicated D and then are pushed at right angles by a pusher arm mechanism to the position indicated H, which is the position the card assumes at the completion of the first card feed cycle. A second card feed cycle is required to bring the card into registration with punches 11 at the punching line 11a, and during the course of this second card feed cycle it is advanced from the H position to the A position wherein it lies entirely within the card feed bed and from which position it is advanced at the end of the second card feed cycle to the E position, shown in full lines.

It will of course be understood that during the second card feed cycle the second card is fed from the hopper through the same path of travel so as to reach the H position at the completion of the cycle and underlie the first card which is now at the E position. When the first card is moved into the E position it is brought into engagement with card escapement mechanism indicated generally by 15, under control of an escapement magnet not shown in FIG. 1, which operates to advance the card step by step past the punching line 11a until the last column of the card advances past the punching line whereupon another card feed cycle is initiated, either manually or automatically, to register the first card with reader pins 12 at the reading line 12a and at the same time register the second card at the punching line 11a. From this point both the first and second cards are advanced by the escapement mechanism 15 past the reading line 12a and punching line 11a, respectively, in synchronism until the advance of the cards by the escapement mechanism is completed whereupon the initiation of another card feed cycle will eject the first card to the C position and thence to a discharge hopper or stacker 13 at the same time registering the second card at reading line 12a and the third card being fed at the punching line 11a. It should be made clear at this time with respect to the first but not the second embodiment of the invention that when a card is registered by the card feed mechanism at the punching line, i.e. position indicated E in FIG. 1, the first two card columns are in register with the punching line, i.e. the upper card column 1 and lower card column 2, as distinguished from the machine of aforesaid Patent 2,647,581 wherein the card when registered at the punching line is registered one column short of the punching line, i.e. with the zero column of the card at the punching line. As shown in FIG. 1, associated with the escapement drive gearing is a program drum 16 around which is secured a program card prepunched with control holes which may be utilized for programming the operation of the cards through the machine. Associated with the program drum are sensing devices in the form of star wheels 17, which read the control perforations in the program card as it steps in synchronism with the cards feeding or advancing under control of escapement mechanism past the reading line 12a and punching line 11a. In carrying out the present invention, a full complement of twelve star wheels are employed to enable reading of program codes in both the odd and even columns of the program card, and they are positioned so as to define a program reading line 17a. The interrelation between the mechanisms above described in the first embodiment of the invention is such that when a card to be punched is registered with the first two card columns at the punching line 11a, the preceding card is registered with its first two columns at the reading line 12a and the program card secured to the program drum 16 is registered with its first two columns at the reading line 17a. Thereafter, as the cards including the program card are advanced by the escapement mechanism in column by column manner past their respective reading and punching lines, correspondingly numbered columns of the card will move into and out of the respective reading and punching lines simultaneously.

Associated with the program drum 16 is a column indicator for enabling the operator to determine which column of the card will record the next punching. In the present instance the column indicator consists of two separate dials 18a, 18b which rotate with the program drum under control of escapement mechanism, the dials in the present instance being in the form of disks made of light conducting material such as "Lucite" or the like and light shielded from one another. The periphery of the disk 18a is marked with calibrations for indicating odd numbered columns, and the disk 18b is marked with calibrations indicating even numbered columns, since both an odd and even numbered column of the card are in register with the punching line at the same time. A pair of dial illuminating lamps 19a, 19b, respectively, are mounted in close proximity to their respective dials and are controlled by an odd-even counter, hereinafter described, so as to illuminate one or the other of the disks 18a, 18b thus indicating whether the machine is conditioned to punch the odd or even numbered column of the card which at any given period during the escapement travel of the card is in register with the punching line. The disks 18a, 18b are enclosed within a suitable masking member, not shown, which exposes to the operator only the numbers of the odd and even column which are in register with the punching line, and since only one of the lamps 19a, 19b will be lit at the completion of a punching cycle, an indication will thus be given to the operator of in which column of the card the next punching operation will occur.

Figure 2:
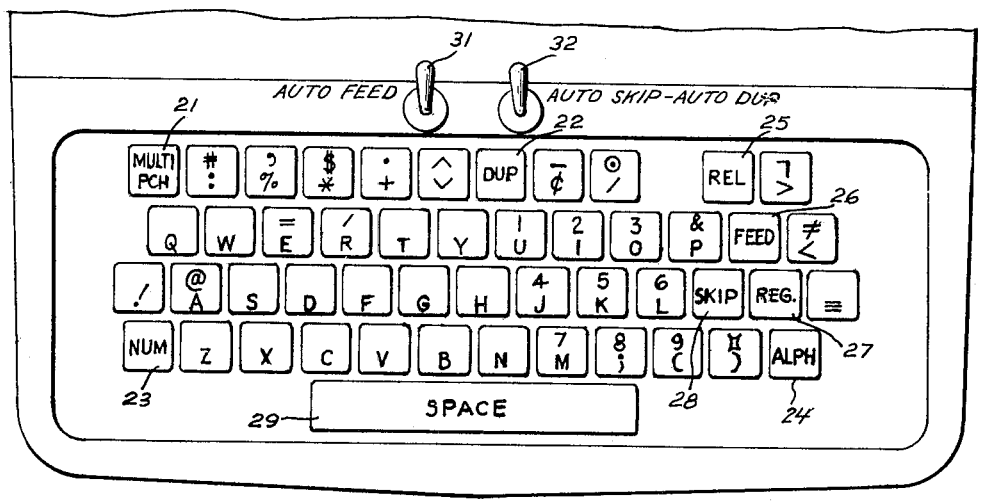
FIG. 2 is a plan view illustrating the keyboard layout for the machine.

The keyboard of the machine is a separate mechanical unit which is connected to the punch by electrical connections. The keyboard operates on the same mechanical principles as that of the aforesaid Patent No. 2,647,581 and is modified to the extent of providing additional keys for recording additional symbols and punctuation marks and in adapting the encoding mechanism to encode in a six bit code rather than the twelve bit code of the aforesaid patent. FIG. 2 illustrates the keyboard layout which, it will be noted, includes a full complement of alpha and numeral keys and other data recording keys for a variety of symbols and punctuation marks. It also includes a number of function control keys whose function will briefly be now stated and more fully explained later in connection with a description of the machine control circuit. The data recording keys which include the alpha, numeral, punctuation and symbol keys indicate by the labelling in the lower half of the key cap the information which will be recorded by the key when the keyboard is in the alpha shift condition. The labelling of the upper half of the key cap indicates the data which will be punched when the keyboard is in the numeral shift condition. With the exception of certain ones of the function control keys, as will be hereinafter pointed out, depression of a key operates as described in the aforesaid patent to release a latch to release in turn a spring biased slide selectively coupled in accordance with the code employed to rockable permutation bail members which in turn actuate electrical contacts in appropriate combinations for completing circuits effective for energizing an appropriate combination of interposer magnets which render the appropriate combination of punches effective in a given punch cycle. Associated with the key released latches is a keyboard restoring means which automatically resets the latches after completion of the punch actuating circuits so as to prevent repeat punching or other functional operations of the machine in the event the key is held depressed.

Certain of the function control keys, however, do not operate through the same latch mechanism but instead operate contacts directly so as to not be affected by the keyboard restore mechanism. These keys are the Multi-punch key 21, the Dup key 22, the Numeral Shift key 23 and the Alpha Shift key 24. The Multi-punch key is utilized when it is desired to overpunch in a given card column and, as more fully explained in connection with the circuit description, operates to disable the circuit which otherwise would be effective for conditioning the punch to punch in the next successive card column. The Dup key 22 is utilized when it is desired to duplicate, under manual control, information sensed from a preceding card at the reading station into the card being punched, and since the duplication may involve a plurality of card columns the key is effective as long as it is held depressed. The Numeral Shift key 23 is effective for placing the keyboard in the numeral shift condition when through other means the keyboard may be normally in the alpha-shift condition, and since this conditioning of the keyboard may be desired for a number of card columns the key is effective as long as it is held depressed. Likewise, the Alpha-shift key 24, which is employed to change the shift condition of the keyboard if through other means it is normally in numerical shift condition, is effective as long as it is held depressed.

Other function control keys of the keyboard operate through the aforesaid latching mechanism so as to be affected by the keyboard restore mechanism and include the Release key 25 which when operated releases the escapement drive mechanism so that a card either at the reading station or the punching station will be advanced completely through said stations but will not cause subsequent cards to register at the reading and punching stations, respectively, unless the machine is conditioned for automatic feed in which case the subsequent cards will be registered at the respective stations and a new card will be fed from the card hopper.

The Card Feed key 26, which also operates through the latch mechanism of the keyboard so as to be affected by the keyboard restore mechanism, is operated to initiate a card feeding cycle. This key is ineffective if there is a card in register with the punch station at the time the key is depressed. When there are no cards in the card feed path two successive depressions of this key, as hereinbefore mentioned, will feed a card from the hopper to the feed bed and thence on the second depression will register the card at the punching station. If there are cards in the card feed path but which are not registered, such as at the completion of the escapement advancement of a card past the punching and reading stations, depression of the Card Feed key 26 feeds a card from card hopper 10 partially into the card bed to the position indicated H in FIG. 1, registers the next preceding card at the punching line 11a, registers the next preceding card at the reading line 12a, and ejects the next preceding card into the card receiving hopper 13.

The Register key 27 operates under the same conditions and performs the same functions as the Card Feed key with the exception that no card will be fed from the hopper 10. Depression of this key initiates a card feeding cycle but means hereinafter more fully described are provided to disable the card picker mechanism to prevent feed of another card into the card bed.

The Skip key 28 operates through the latching mechanism of the keyboard affected by the keyboard restore mechanism to initiate various types of skip operations depending upon the shift condition of the keyboard and also depending on whether or not the punching operation is under program card control. Assuming that the operation is not under program card control, operation of the Skip key when the keyboard is in Alpha Shift condition operates to perform the same function as a single column space operation. If the keyboard should be in the numeral shift condition, depression of the shift key in addition to effecting a single column space operation also causes the punch to perforate the "X" position of the card column so as to effect what is known as an X-skip operation to signify that the column in question was intentionally skipped. If the machine is being operated under program card control with the successive card columns of the program card punched with perforations representing a field definition, the skipping operation initiated by depression of the Skip key 28 will cause skipping over all successive columns of a card field designated by field definition control perforations in the program control card. Under program control if the keyboard is in the Alpha Shift condition, the skipping operation will be a normal skip without any punching of the first column of the card field, whereas if the keyboard is in the numeral shift condition the first column of the skipped field will be punched in the "X" position to likewise indicate that the card field in question was intentionally skipped.

The Space key 29, as its name applies, operates to condition the machine for punching in the next successive column of the card. It should be pointed out that this does not necessarily mean that the card is physically advanced one column past the punch line due to the novel columnar format of the card used with the machine of the instant invention. Since all odd numbered columns in accordance with this novel card columnar format are contained in the upper half of the card and all even numbered columns are contained in the lower half of the card, with the punching of the columns proceeding in normal numerical sequence so as to alternate from upper to lower i.e, odd to even numbered columns, when the machine is conditioned for punching an odd numbered column, operation of the Space bar 29 does not physically advance the card but merely conditions the machine for perforating in the next succeeding even numbered column. However, if the machine is conditioned for punching an even numbered column, operation of the Space bar 29 causes escape advancement of the card the distance of one card column and at the same time conditions the machine for punching in the next odd numbered card column.

Also mounted on the keyboard are a pair of switches 31, 32 labeled Auto Feed and Auto Skip-Auto Dup respectively. The Auto Feed switch 31 when closed causes the machine to automatically initiate a card feed cycle after the last column of a card advances by operation of the escapement mechanism past the punching station. As heretofore briefly described, a card feeding cycle causes the card which has just passed the punching station to be registered at the reading station, the following card to be registered at the punching station and a further card to be fed from the hopper 10 into the feed bed. The Auto Skip-Auto Dup switch 32 when closed enables skipping and duplicating functions of the machine to be automatically initiated under control of appropriate control perforations of the program card.

Figure 3:
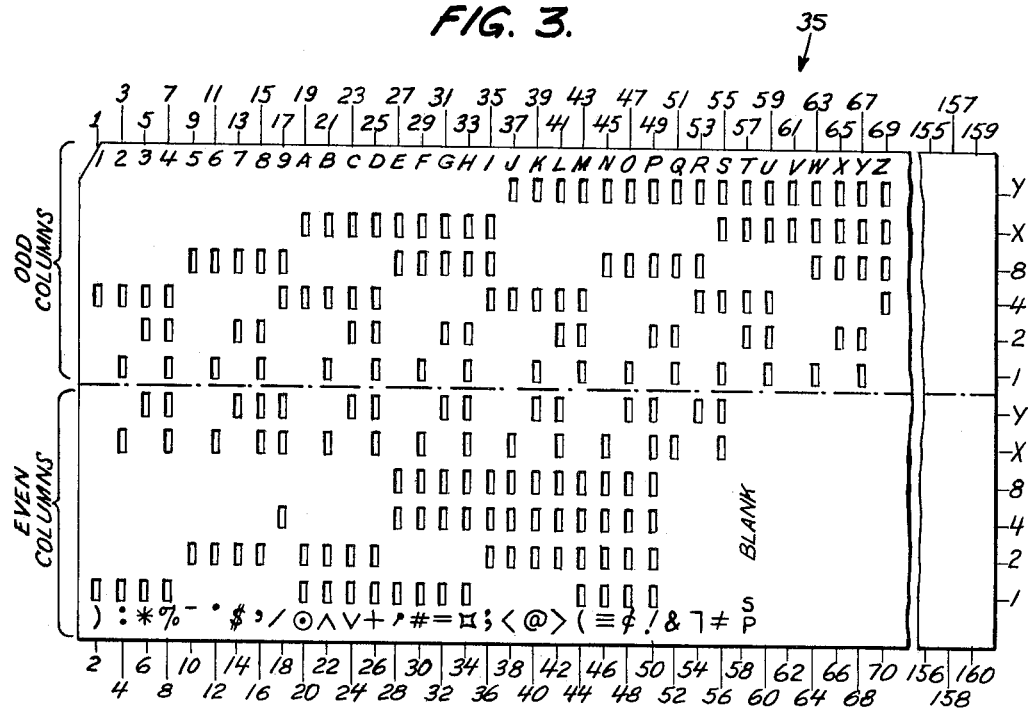
FIG. 3 is a view of the form of punched card processed by the machine illustrating the sequential order of the odd and even numbered card columns in the upper and lower half, respectively, of the card and also illustrating the coding employed in recording data on the card.

FIG. 3 shows a card 35 of the type used with the machine of the instance invention illustrating the novel columnar format of alternating odd even columns in upper lower halves of the card, respectively, and also illustrating all of the code perforations which may be recorded through operation of the expanded capacity keyboard in conjunction with the use of a six bit code. The card has the same physical dimensions as the standard "Hollerith" or 80 Column Card with index point positions arranged in columns and rows as in the well known 80 Column Card. However, by dividing the card in half along its length and utilizing a column of index positions in the upper half of the card as one card column and a column of six index positions in the lower half of the card as another card column it will be readily apparent that the information recording capacity of the card is doubled so as to provide in effect a double deck card of 160 card columns. As shown in FIG. 3 the eighty columns in the upper half of the card are designated by the odd numbers in series from column 1 at the left hand edge of the card to column 159 at the right hand edge of the card and will hereinafter be referred to as odd columns. Likewise the columns in the lower half of the card are designated by even numbers starting with column number 2 at the left hand edge of the card running to column 160 at the right hand end of the card and will hereinafter be referred to as even card columns. The six index positions within each column are designated running from the bottom to top of the column as positions "1," "2," "4," "8," "X" and "Y." The code employed in recording numerals is the XS-3 binary code which simplifies greatly the further processing of cards so coded in related card controlled processing equipment now in common usage and employing internally the XS-3 code, in that by employing the same code on the record card the necessity for translation from the card code to the internal code of the related processing machine is avoided.

As hereinbefore briefly mentioned, and as will be apparent from the description of the control circuit of the machine, the sequence in which the columns of the entire card are punched follows in straight numerical sequence according to the numbering of the columns, i.e. a five column card field for recording a five digit number might comprise columns 1–5 wherein the highest order of the number would be recorded in column one, the next highest order would be recorded in column 2, the next highest in column 3, and so forth, with the punch operating alternately in odd and even columns as it enters data into the card field. Since the machine is equipped with twelve punch elements arranged in one line at the punching station it will be readily apparent that the entire 160 columns of the card can be punched during the course of 80 escape advancements of the card past the punching line. A novel feature of the invention, which will be explained fully in connection with the circuit description, determines which of the two columns in register with the punches at the same time in each escapement position of the card is to be punched in order to maintain the alternating sequence between odd and even columns in step with the sequence of the data being entered in each consecutive keyboard operation.

As fully described in the aforesaid Patent No. 2,647,-581 the machine may be operated under control of a program card which is pre-punched with control program perforations at predetermined index positions of a column for enabling automatic control over functions of the machine. As described in said patent six different index positions within a card column are employed each for its own purpose in automatically controlling the machine so that in carrying out any one program only one half, i.e., the upper half, of the program card is utilized. The machine of the aforesaid patent also includes a feature referred to as alternate programming in which the six positions in the lower half of the card are utilized whenever it might be desired to substitute one program for another without the necessity of removing the program card from the program drum. When utilizing the alternate programming feature in the patented machine, a full complement of program sensing devices, in the form of star wheels, and associated contacts are employed, and under operator control the six star wheel sensing devices associated with the upper half of the card or the six associated with the lower half of the card are brought into operation at will depending upon which of the two programs contained in the program card are desired at any point in the punching operation.

Figure 4:
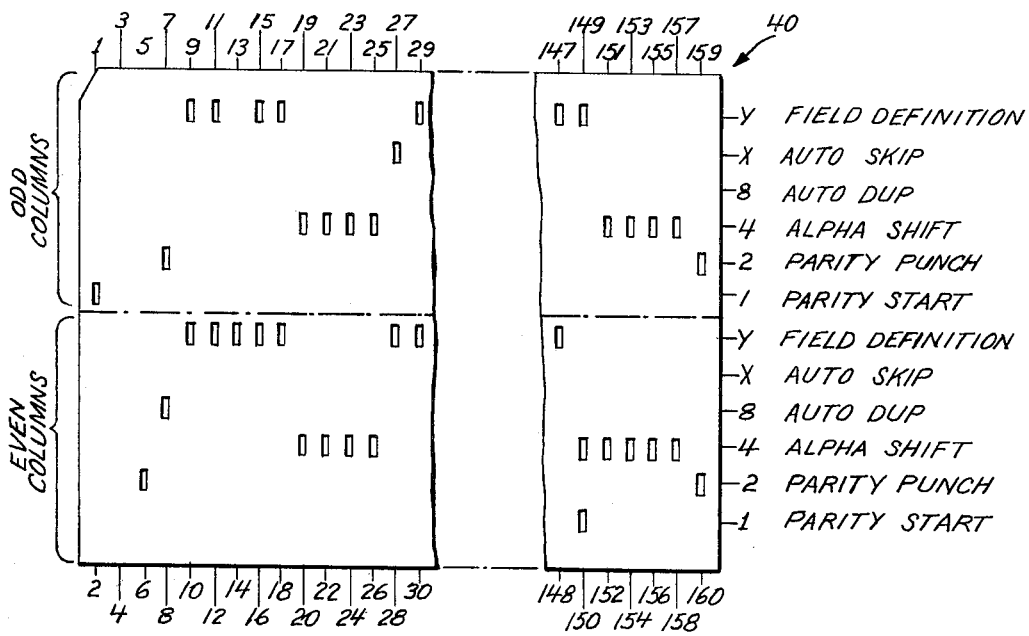
FIG. 4 is a view of a program control card illustrating the manner in which the program card is punched with control perforations for controlling automatic functions of the machine.

In carrying out the present invention alternate programming from a single program card is not employed, but a full complement of star wheel sensing members and associated contacts are utilized, such as in the patented machine when employing the alternate program feature, since the program card for the machine of the instant invention contains program control perforations in both the odd and even columns of the card. FIG. 4 illustrates a program card 40 as utilized with the instant invention and identifying the control positions as utilized for programming purposes. As shown in FIG. 4, the uppermost or "Y" index position of a card column is designated the Field Definition position and is employed in conjunction with skipping and duplicating operations to define the successive columns constituting a single card field which it may be desired to skip over or to duplicate punch. In preparing the program card the "Y" index position is punched into each column of the selected field except the first column.

The "X" index position of a card column in the program card is utilized to start an automatic skipping operation which will continue as long as field definition control perforations exist in the immediately succeeding card columns. The start skip control perforation is punched in the first column of the card field which it may be desired to automatically skip over.

The "8" index position is utilized for programming purposes to start an automatic duplicating operation which like the automatic skipping operation will continue as long as field definition control perforations exist in the immediately following columns to define the field in which duplication is to occur. The start duplication control perforation is punched into the first column of the card field in which automatic duplication is desired.

The "4" index position of a program control card is employed for shifting the keyboard of the machine to the alpha shift condition. When the machine is operating under program control the keyboard is normally in the numeral shift condition so that when a control hole in the "4" position of a program card column is sensed the keyboard is automatically shifted into an alpha shift condition. This control hole must be punched in each column of the field in which it is desired to maintain the keyboard in the alpha shift condition.

The "2" index position of a column of the program card is utilized for causing the punch to automatically perforate a parity bit if the parity count for a given row of a card field in which a parity count is desired indicates an even parity condition. This position is punched in the last two columns, i.e. the last odd and last even column of the card field in which automatic parity punching is desired.

The "1" index position of a column in the program card is utilized to condition the parity section of the circuit for starting a row parity count of a selected card field. This control position is punched into the control card in the first column of the card field in which automatic parity punching is desired.

The specimen program card 40 shown in FIG. 4 would result in automatically programming the punching of the several fields of the card in the following manner. Columns 1–7 would constitute a parity field for recording numeric data since these columns of the program card do not contain the alpha shift control perforation, but column 1 contains a parity start control perforation and columns 6 and 7 are punched with the parity punch control perforations. The field comprising columns 8–12 would be automatically duplicated since column 8 of the program card contains an auto dup control perforation while the remaining columns of the field, 9–12, contain field definition control perforations. The field consisting of columns 13–18 would constitute a keyboard controlled punch field in which data could be entered from the keyboard. Since this field however contains field definition control holes in columns 14–18 the field could, at the will of the operator, be skipped or duplicated by manual depression of the skip or dup key respectively. The skip or duplication operation would not be initiated automatically since there is no appropriate control perforation in column 13 which is the first column of the field. The field comprising columns 19–26 comprises an alpha shift field in which data entered from the keyboard would be lower case data resulting from the alpha shift keyboard condition. The field starting with column 27 would be an automatically skipped field since column 27 contains the auto skip control perforation and subsequent columns contain field definition control perforations. If we assume that all subsequent columns up to column 149, broken away in FIG. 4, contain field definition control punchings, the skipping operation would continue through column 149. The field comprising columns 150 through 160 comprise another parity field for recording alpha data since the columns 150 to 158 are punched with the alpha shift control perforation, column 150 in addition being punched with the parity start control perforation. Columns 159 and 160, the last two columns in the parity field, are punched with the parity punch control perforations to cause automatic parity punching in the last two columns of the parity field.

Referring now to the circuit diagram for a first embodiment of the invention as shown in FIGS. 6a, 6b, 6c and 6d, it will be understood that a suitable power supply, not shown, is provided to provide various circuit operating potentials which will be designated in the diagram as B+, B—, +35 v., and —50 v. bias. The B+ designations represents a potential of 165 volts which is utilized to supply positive potential to the plates of the various control tubes in the circuit. The B— designations represents a potential of approximately 0 volts which provides a source of supply potential to the cathodes of the various control tubes and also as a supply for positive pulses to the control grids of certain of the tubes which are normally held at a negative bias. The —50 v. bias supply is utilized to bias the grids of certain of the tubes negatively and the +35 v. supply is utilized for supplying positive pulses to the control grids of certain other tubes in the circuit. In addition the power supply also provides appropriate low voltage A.C. for tube filament supply source which will be designated in the drawings as Fil.

In the circuit diagram all of the control relays will be designated by a numeral prefixed by the letter K, and the relay contacts except when shown in ganged arrangement will be numbered prefixed by a dash and the corresponding relay designation. All relay contacts are shown in their normal condition when the corresponding relay is not energized, the contact which is made during the de-energized state of the relay being shown darkened to distinguish it from the undarkened contact points which make when the relay energizes. Each of the tubes in the circuit diagram are designated by a numeral prefixed by the letter V. The circuit contains a number of circuit breaking cams including some mounted on the punch shaft so as to be effective in punching operations and these are identified by the letters PC. Other circuit breaking cams operate during a card feeding cycle and are identified by the letters CF. There are also a pair of contact operating cams associated with the program drum which operate when the cards advancing under control of the escapement mechanism reach a predetermined escapement position, and these cams are identified by the letters PR. Where space permits the contacts operated by function controlling keys of the keyboard and by the program drum star wheels through control punchings of the program card are identified by an appropriate abbreviated legend of the function related to or performed by the respective key or program controlling perforations.

Figure 6C:
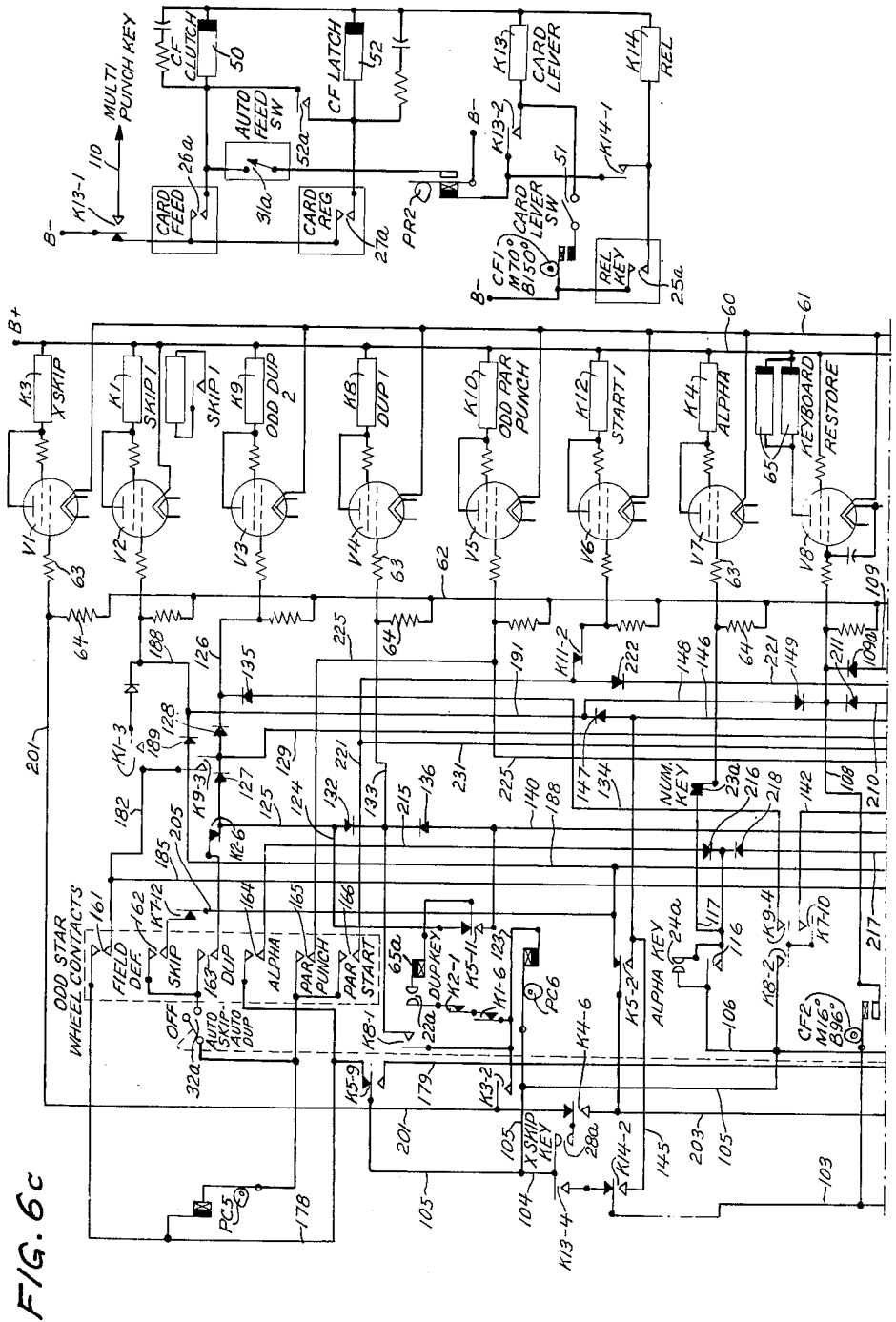

The portion of the circuit shown in the upper right hand area of FIG. 6c is directly concerned with initiating a card feeding operation. The manual depression of the card feed key 26 (FIG. 2) on the keyboard will close contacts 26a to complete a circuit from B— supply through the normally closed contacts K13–1 of the card lever relay K–13, through contacts 26a to a card feed clutch magnet 50 and thence to B+ supply, thereby energizing the card feed clutch magnet. This magnet (corresponding to card feed clutch magnet 28 in the aforesaid Patent 2,647,581) causes the machine to operate through one card feed cycle. The card feed key contacts 26a are automatically restored by the keyboard restore mechanism, as will be explained hereinafter more fully, so that one card feed cycle of operation results upon depression of the card feed key. Assuming that there are no cards in the feed bed, the first card will feed during the first card feed cycle to the position indicated H in FIG. 1 in which position it operates a well known card lever to close the card lever switch contacts 51 which, however, are ineffective in the first card feeding cycle since the card lever switch contacts 51 are in a circuit with contacts operated by a card feed cam CF1 which make at 70 degrees of the feeding cycle and break at 150 degrees of the feed cycle, which latter point of the feed cycle is before the first card fed has closed the card lever switch contacts 51. A second depression of the card feed key to initiate a second card feed cycle will feed the first card into registration with the punch station and a second card out of the hopper into the card feed bed, and during this second card feeding cycle when contacts CF1 make at 70 degrees a circuit will be completed from B— through card lever relay K–13 and thence to B+. Relay K–13 when energized locks in through one of its contacts K13–2 by a circuit to B— supply through the normally closed contacts operated by a program cam PR2 (corresponding to the program cam contacts PR3 of the aforesaid patent) which as described in said patent are associated with the program drum and are timed to operate after a card has fully escaped past the punching station. In the present machine the contacts operated by program cam PR2 are timed to transfer when the card has been advanced beyond the punching station approximately three columnar spacings and are restored when the card is approximately one column away from registration with the reading station. It will be seen that when the PR2 contacts transfer, the locking circuit for relay K13 is momentarily broken, and if the contacts 31a of the Auto Feed switch 31 are closed, a circuit is completed from B— through the transferred program drum contacts PR2, switch 31a to the card feed clutch magnet 50 and thence to B+ to thereby automatically initiate another card feeding cycle. From the foregoing, and as more fully described in the aforesaid patent, as long as cards are continually being fed with a card in registration with the punching station the card lever relay K13 will remain energized and will be dropped momentarily only after the card has been completely advanced by the escapement mechanism past the punching station at which time a new feeding cycle may or may not be automatically initiated depending upon the setting of the automatic feed switch 31.

A card feeding operation will also be initiated by operation of the Register key 27 whose contacts 27a will close to complete a circuit from B— through normally closed contacts K13–1 to the card feed latch magnet 52 and thence to B+. The magnet 52 (corresponding to the card feed latch magnet 46 of the aforesaid patent) when energized disables the card picker mechanism so as to prevent feed of a card out of the hopper 10. The card feed latch magnet 52 upon energizing brings in its contact 52a to complete a circuit to the card feed clutch magnet 50 thereby bringing in the card feed clutch to initiate a card feeding operation which registers cards at the punching and reading stations but which does not feed a card from the card hopper. It will be noted that the card registration key will not be effective at any time that the card lever relay K13 is energized since the contacts 27a connect to B— through contacts K13–1 when in their normally closed position.

Manual operation of the release key 25 closes its contacts 25a to complete a circuit directly from B— to the relase relay K14 and thence to B+ to energize the relay which locks in through its contacts K14–1 to complete a locking circuit through the contacts of program cam PR2 to B—. As will hereinafter be more fully explained, other contacts operate to control the escapement mechanisms so as to cause the cards to skip through the punching and reading stations, respectively, and as heretofore mentioned when the cards clear past the punching station a distance of approximately three card columns the contacts operated by PR2 will transfer to break the holding circuit to the release relay K14 and will at the same time complete a circuit to the card feed punch magnet 50 to initiate a new card feeding cycle if the Auto Feed switch contacts 31a are closed.

Once a card is registered at the punching station as a result of a card feeding operation, it is under control of the card escapement mechanism, as fully described in the aforesaid Patent 2,647,581, and if there is a preceding card in the feed bed it will likewise be registered at the reading station and, also, if the machine is under program card control the program card will be registered with the star wheel program drum reading members. However, it should again be pointed out with respect to the first embodiment of the invention now being described that, as distinguished from the machine of the aforesaid patent, the card at the reading station is registered in position for punching the first two card columns, odd column one and even column two, with the card at the reading station and the program card likewise in position for the reading of the first two card columns whereas in the machine of the aforesaid patent the card at the punching station is registered one column in advance of the first card column in the position referred to as the "0" card column while the card at the reading station and the program card are registered, respectively, for reading the first column of the respective cards. From this point on, the machine is in condition for performing punching and other various operations until the entire card has passed the punch station under control of the escapement mechanism and a new card feeding cycle is initiated in the manner hereinbefore described.

Referring to FIGS. 6c, 6d there is included in the circuit a plurality of tubes V1–V14, which in the instant machine are 25L6 tubes and which may be referred to generally as function control tubes, the plate circuits of which tubes contain a function controlling relay or magnet and are joined to a common plate lead 60 running to a B+ supply terminal. The cathodes of each of said tubes V1–V14 are connected to a common lead 61 running to a B— supply terminal. The control grid of each of said tubes is connected through a pair of resistors 63, 64 in series having values of 10K and 56K, respectively, to a common bias line 62 running to the 50 volt negative bias terminal of the power supply.

The bias on each tube is removed by various circuit paths running from the junction of the grid bias resistors 63, 64 associated with each tube to the B— supply which in effect applies a positive pulse to the control grids of the tubes to render the tubes conductive thereby energizing the associated function controlling element in the plate circuit thereof. Except for tubes V8, V9 and V10, the said tubes control relays whose function is indicated in the circuit diagram and will be more fully explained hereinafter. Relays K1, K2 and K7 are slow release relays due to the self shorting hold coils associated therewith, as indicated in the diagram. The tube V8 controls the keyboard restore magnets 65 of which there are two connected in parallel in the plate circuit (corresponding to the magnets 352 in the aforesaid Patent 2,647,581) to restore the key slide latch mechanism of the keyboard and at the same time open a pair of normally closed interlock contacts 65a (shown at left portion of FIG. 6c) which are held open as long as the magnet remains energized. Tube V9 controls the punch clutch magnet 70 (corresponding to the punch clutch magnet 204 of the aforesaid patent) which as fully described in said patent causes the punch clutch to engage and drive the punch shaft for one cycle unless the magnet remains energized at the latch up time of the clutch to permit continued cycling of the clutch shaft and the mechanism associated therewith. Tube V10 controls the escapement magnet 75 (corresponding in function of magnet 104 of the aforesaid patent) which releases the escapement drive mechanism to advance the cards including the card on the program drum in a column by column manner for a number of columns depending upon the length of time that the escapement magnet is held energized. Associated with the escapement magnet 75 are contacts 75a which close and remain closed as long as the magnet remains energized, see central portion of FIG. 6d.

Initiating a punching cycle under keyboard control is effected by completing a circuit to one or a combination of interposer magnets 80, see FIGS. 6a, 6b, of which there are twelve (corresponding to interposer magnet 188 of the aforesaid patent) which when energized release associated interposers which latch on to a punch bail driven from the punch shaft and in so doing rock on interposer bail to complete a circuit which initiates a card punching operation. The interposer magnets include six shown in FIG. 6a associated with the six punches for perforating the odd columns of the card and six shown in FIG. 6b associated with the punches for perforating the even columns of the card, the magnets being identified by the respective index position of a card column with which they are associated. In the instant invention as distinguished from that of the aforesaid patent, the interposer magnets 80 are included in the plate circuits of actuator tubes V20, which in the present instances are 2D21 tubes and since the energizing circuits for these magnets are identical they are not all shown in detail, there being one shown for a magnet associated with an odd card column and another shown in detail associated with an even card column and represented by the circuitry contained within the dotted line enclosure 81. The cathode of each tube V20 is connected by a common lead 82 to the B— supply, see FIG. 6a, through contacts operated by a punch shaft driven tube cut off cam PC2 and relay contacts K13–5 of the card lever relay. The shunt circuit in lead 82 to B— around the contacts operated by PC2 and including a 510K resistor 86 is provided for purposes hereafter described and will not pass sufficient current to keep the tubes conducting when the PC2 contacts open. The control grids of each of the tubes V20 are connected through grid resistors 87, 88 of 1M and 51K respectively to a common grid bias lead 84 which runs to the negative 50 volt bias terminal of the power supply. Each of the interposer magnets 80 is connected to the plate of its respective tube through a lead 85, the magnets in turn being directly tied to a B+ supply terminal.

Now that the card is in register with the punches, the machine is in condition for keyboard entry of data into the card. The manual depression of any data key of the keyboard as heretofore mentioned and as fully described in the aforesaid patent, through the mechanical permutation encoding system of the keyboard, operates to selectively close keyboard bail contacts 90 (corresponding to bail contacts 381 of the aforesaid patent) of which there are twelve in the present machine which are closed in accordance with the code combination for the respective keyboard character so as to establish circuits for energizing selected combinations of the interposer magnets 80 to cause punching of the corresponding code symbol in a column of the card. The circuit to the keyboard bail contacts 90 can be traced from the +35 voltage power supply terminal, see FIG. 6b, through the now transferred contacts K13–3 of the card lever relay to a common lead 91 to each of the keyboard bail contacts 90. Whenever a contact 90 or a combination of contacts 90 is closed by operation of the keyboard permutation bail encoding mechanism the circuit will continue to the contacts of the alpha shift relay K4 which, when deenergized places the keyboard in the numeral shift condition and, when energized places the keyboard in the alpha shift condition. The transfer contacts of relay K4 are connected directly to the transfer contacts of relay K5 which is the odd-even column counter relay which when deenergized conditions the machine for punching in the odd columns of the card and when energized conditions the machine or the output of the keyboard for punching the even columns of the card. When relay K5 is deenergized to condition the machine for odd column punching its contacts K5–3 through K5–8 continue the circuit or combination of circuits to the input leads 92 running to the control grids of the tubes V20 associated with the odd column interposer magnets 80, the lead running in each case to the junction of the grid bias resistors 87, 88 associated with each of said tubes. The grids of the selected tube or combination of tubes receiving a positive pulse cause the tube to fire and thus energize the associated interposer magnet 80. When the relay K5 is energized to condition the machine for punching in even columns the keyboard output circuits are transferred to the tube input leads 93 which in turn run to a respective one of the control grids of the tubes V20 controlling the interposer magnets 80 associated with the punches for the even columns of the card. Accordingly, it will be apparent that while there are twelve keyboard bail contacts 90 employed the machine operates in a six bit code so that various combinations of said contacts 90 of more than six may be operated in any one keyboard operation if the key is effective in both numeral and alpha shift condition, i.e. represents both upper and lower case data. However, in any one cycle a maximum of only six of the contacts 90 will be effective in the appropriate code combination depending upon the condition of the alpha shift relay K4, which circuits will in turn be utilized as inputs to the means for actuating the punches in the odd card columns or in the even card columns depending in turn upon the condition of the odd-even column counter relay K5. The tube circuits in each case run from the B— supply terminal in the upper right hand corner of FIG. 6a through the tube cut off contacts operated by punch cam PC2, over common cathode lead 82, through the respective tube V20 and the plate lead 85 to the associated interposer magnet 80 which in turn is connected to a B+ terminal of the power supply.

As fully described in the aforesaid patent the mechanism which is brought into operation upon energization of any one of the interposer magnets includes an interposer which is released to latch on to the punch bail so that when the punch shaft rotates, the interposer, being latched on to the bail, will cause the corresponding punch element to perforate the corresponding index position of a card. The interposer in releasing to latch on to the punch bail rocks an interposer bail which is common to all interposers and when rocked is effective for closing a pair of interposer bail contacts (contacts 194, 195 of the aforesaid patent) which initiate a punching operation. The interposer bail contacts of the instant embodiment of the application are designated contacts 101, 102 (upper left of FIG. 6d) which are in a circuit extending from the B— supply terminal over lead 103, normally closed contacts K14–2 of the release key relay K14, and the transferred contacts K13–4 of the card lever relay which as heretofore explained remains energized during the entire period that the card is escaping through the punch station and thereby provides a constant source of B— potential to most of the circuits shown in FIGS. 6c and 6d which may come into operation while the card is advancing past the punch station. From the contacts K13-4, the circuit continues over line 104 to a conductor 105 which extends in both directions from its junction with line 104 and constitutes a B— source as long as the card is in registration with the punch station and the release key relay K14 is not energized. Conductor 105 extending downwardly from its connection with 104 runs to a line 106 common to a plurality of contacts including the interposer bail contacts 101, 102 which are connected in parallel in the circuit to continue the circuit to a lead 107 running through contacts operated by punch shaft cam PC1 directly to the control grid of tube V9 which removes the negative bias from the grid causing the tube to fire and energize the punch clutch magnet 70. At the same time, through a parallel circuit the keyboard restore magnets 65 are energized, the parallel circuit running from lead 107 over line 109 via diode 109a to a lead 108 running to the control grid of tube V8 which fires in parallel with the tube V9 so as to energize the keyboard restore magnets 65. The keyboard restore magnets are also brought in under various other conditions, one of which is during card feed cycles by operation of the card feed cam CF2 (corresponding to cam CF5 of the aforesaid patent) which in the instant machine makes its contact from 16° to 96° of the card feed cycle so as to complete a circuit from B— lead 103 over lead 108 to the control grid of tube V8 to thus energize the keyboard restore magnets during the course of each card feed cycle. As fully described in the aforesaid patent, energization of the punch clutch magnet causes the punch shaft to undergo one revolution of movement unless it is held energized beyond the clutch latch up point of the cycle, during which revolution certain cams operate to drive mechanical linkages in the machine and other timing cams are operated to make or break circuits at particular time intervals in the shafts rotation. By reference to the timing diagram (FIG. 5) in which degrees of the cycle are referenced to the time that the punch bail starts to operate to cause punching of the card at the punch station with the clutch latch up point being indicated as occurring at 290° at the cycle, it will be seen that the first mechanical action resulting from rotation of the punch shaft is the operation of the reader cam (corresponding to cam 220 of the aforesaid patent) enabling the reader pins 12 at the reading station to become effective for reading the card in register with the reading station to control punching in duplicating operations. At zero degrees of the punch cycle the punch bail cams on the punch shaft (corresponding to cams 208 of the aforesaid patent) operate the punch bail and any interposer which may be latched thereto so as to drive the corresponding punch through the record at the punching station, this action starting at zero degrees of the cycle with the punch stroke being completed at 126° and the bail being restored by 252° of the cycle. Also operated by the punch shaft is an interposer magnet armature knock off bail which is driven by a cam on the shaft (corresponding to cam 211 of the aforesaid patent) and which is timed to operate in the machine herein between 75° and 177° of the cycle causing the interposer magnet armatures to be restored by 126° of the cycle. In this connection it should be noted by reference of the timing diagram that the timing cam PC2, also driven by the punch shaft, cut off the cathode circuit to all tubes V20 thereby deenergizing the interposer magnets 80 at 30° of the punch cycle.

Since the operation being described is one involving entry of data from the keyboard, and not involving duplication of information from a preceding record at the reading station, we can disregard momentarily the effect of the reader cam operating early in the punch cycle. At 60 degrees of the punch cycle the timing cam PC1 on the punch shaft opens its contacts to break the circuit over line 107 running to the grid resistor for tube V9 which extinguishes the tube and deenergizes the punch clutch magnet 70 but which does not affect the keyboard restore magnets 65 which deenergize when the interposer bail contacts open at about 80 degrees of the cycle. These magnets 65 as heretofore described restore the latching mechanism of the keyboard and at the same time, as long as energized, open their contacts 65a (left center, FIG. 6c) so as to render the Man Dup key contacts 22a ineffective. At 30° of the punch cycle the contacts operated by the timing cam PC2 are opened so as to cut off the cathode circuit over common lead 82 to all the tubes V20 thereby deenergizing all of the interposer magnets 80 which were selectively energized to initiate the punch cycle as heretofore described. PC2 cam contacts restore the cathode circuit to the tubes V20 at 142° of the cycle.

For the purposes of the following description it will be assumed that we are concerned with punching the first column of the card, i.e. column 1 which is an odd column in which case the interposer magnet 80 or combination of magnets 80 which energize to initiate the card punching operation would be one or more of the six magnets associated with the odd columns since the odd-even column counter when in the odd column condition maintains the counter relay K5 deenergized thereby feeding keyboard output signals to the six odd column interposer magnet control tubes V20 and cutting off the keyboard output from the six even column interposer magnet control tubes V20 as heretofore explained. The odd-even column counter comprises a pair of relays K15 and K5, see lower central portion of FIG. 6d, of which relay K15 is of the mercury wetted contact type. The counter is normally pulsed each punching cycle through contacts controlled by the punch cam PC3 so as to change the state of the counter in successive punch cycles. The circuit to the counter extends from the B— supply of upper right portion of FIG. 6c through the transferred contacts K13-1 of the card lever relay to a conductor 110 which continues as labelled lower left, FIG. 6d) to the contacts 21a of the multipunch key and thence to the timing cam contacts operated by PC3 which close in each punch cycle at 66° and remain closed for 50° or until 116° of the punch cycle. The circuit continues from the cam operated contacts to normally closed contacts K3-3 of the X skip relay K3, contacts K9-1 and K7-1 in parallel of the odd dup 2 relay and the even dup 3 relay to normally closed contacts K15-4 of the counter relay K15. At this point the circuit continues in parallel to relay K15, relay K5 and also as a shunt over lead 111 to contacts K5-10, which parallel circuits are completed through a common lead 112 to a connection with B+ common line 60 and thence to the B+ supply terminal. When relay K5 is deenergized the counter is in the odd column condition and this will be the condition of the counter when the card is registered for punching either in columns 1 or 2 since the circuit to the card lever relay K13 is momentarily broken by the program cam contacts operated by PR2 so as to remove the B— potential from the lead 110 at contacts K13-1 thereby assuring that the relay K5 will be deenergized as the card is registered at the punching station for the first column punching.

Accordingly, at 66° of the first punching cycle a circuit will be completed through the contacts of PC3 to the contacts K15-4 which are make before break contacts, and K15 will make at the moment the circuit is completed. K5 however will not energize due to the shunt circuit over lead 111 and through its contacts K5-10. When K15 makes, its contacts K15-4 transfer to establish a holding circuit over lead 113 to conductor 110, which holding circuit shunts the cam operated contacts of PC3 and the contacts 21a of the multipunch key so as to hold relay K15 energized after PC3 contacts open 50° later or at 116° of the punch cycle. When the contacts of PC3 open at 116°, the shunt circuit over lead 111 around relay K5 is broken so as to thereby enable relay K5 to energize through the holding circuit over lead 113. When relay K5 comes in by the opening of contacts PC3 its contacts K5-10 transfer to establish a shunt circuit over lead 111 around the relay K15. However, this shunt circuit is not of any effect at this time since the counter cam contacts PC3 are open at this time. This is the condition of the counter to indicate an even column condition, and the counter will remain in the even column condition until the counter cam PC3 contacts close in the next subsequent punching cycle which will complete the circuit from B— over conductor 110 through the cam contacts of PC3 and thence continuing over the line 111 through the transferred contacts K5–10 to provide a shunt around relay K15 which deenergizes K15 whose contacts K15–4 restore to break the holding circuit over conductor 113 and maintain an energizing circuit to relay K5 as long as the cam contacts of PC3 are held closed. Thereafter as cam contacts of PC3 open 50° later, at 116° of the cycle, the energizing circuit for relay K5 is broken, its contacts K5–10 restore and the counter is once more in the odd column condition. It will be noted from the timing diagram in connection with the aforementioned description of counter operation that although the contacts of PC3 open at 116° of the cycle, the make time of the respective relays is such that the state of the counter does not change until a few degrees later in the cycle or at about 142° of the punching cycle. The counter may also be conditioned in other operations involving relays K1 and K2 which will be explained more fully hereinafter in connection with other machine operations involving these relays.

Accordingly, continuing the cycle of operation of the first column punching, it will be seen that by 142° of the punch cycle, the counter has been switched to the even column condition. Shortly thereafter and at 164° of the punching cycle, another timing cam referred to as the escape cam PC4 operates so close its contacts to complete a circuit to the escape magnet 75 depending upon the condition of the odd-even column counter. This circuit extends from the B— lead 110 through the contacts 21a of the multi-punch key, the contacts operated by PC4, the normally closed contacts K3–4 of the X Skip relay K3 and contacts K5–1 of the odd-even column counter relay K5 if in the odd column condition, and thence over lead 115 to the control grid of tube V10 to provide a positive pulse removing the grid bias so as to fire the tube and energize escape magnet 75. The escape magnet 75 (corresponding to the escape magnet 104 of the aforesaid patent) releases the escapement drive mechanism for length of time depending upon the period of time the magnet is held energized. The escape cam contacts PC4 are timed to close for 70° of the punching cycle or until 234° of the cycle which is the time required for one tooth of the escapement wheel to advance past the escape magnet armature so as to step the card a distance equivalent to the width of one card column.

However, in continuing the description of the first punching cycle, i.e. punching card colum 1, as heretoforementioned, the odd-even column counter was caused to change to an even column state at about 142° of the punch cycle so that when the escape cam contacts of PC4 close at 164° of the cycle the counter is in the even state with the counter relay K5 energized, thereby opening its contacts K5–1 to interrupt the circuit from the escape cam PC4 contacts to the escape magnet 75 through tube V10, so that, in this first column punching cycle, no escapement takes place and the machine is conditioned by the state of the counter for punching, in the next punching cycle, column 2 (the "even" column in the lower half of the card which is registered at the punch station.

The next operation of the keyboard for punching data into column number 2 will produce the appropriate combination of keybord output circuits in accordance of the code of the character to be recorded through the contacts of the alpha shift relay K4 and thence to the contacts K5–3 through K5–8 of the odd-even counter relay, now shifted to even state condition, whereupon the keyboard output circuits are transferred to the input leads 93 running to the tubes V20 controlling interposer magnets associated with the punches for perforating the even numbered columns of the card. Upon energizing one of the even column interposer magnets 80, another punching cycle is initiated in the same manner as described in connection with an odd column punching cycle by closure of the interposer bail contacts 101, 102, thereby completing a circuit to the tube V9 for energizing the punch clutch magnet 70 to start another punching cycle. In the second punching cycle card, column 2 is perforated in accordance with the appropriate encoded code symbol and when the odd-even counter is pulsed by cam contacts of PC3 during the period from 66° to 116° of the second punch cycle, the counter now being in the even condition will be driven to the odd column condition by 142° of the cycle in which condition counter relay K5 is deenergized so that when the escapement cam contacts operated by cam PC4 close during the period from 164° to 234° of the cycle, the contacts K5–1 of the odd-even column counter will now be closed so that the escape signal or circuit will be completed to the grid of tube V10 to energize the escape magnet 75 for a period of 70° of the cycle thereby causing the card to escape the equivalent of one card column. The punch cycle ends with the card now in position for punching columns 3 and 4 and with the odd-even column counter in the odd condition which will thereby cause the next punching cycle to perforate column 3 of the card.

As can be seen in FIG. 6d, with reference to the A.C. filament supply for the tube V14, contacts K5–12 of the odd-even column counter relay K5 are connected across the filament supply in separate circuits which include the column indicator illuminating lamps 19a, 19b, respectively. Accordingly, when the odd-even column counter is in the odd condition, a circuit will be completed through lamp 19a to illuminate the odd column indicator dial 18a, see FIG. 1, and when the counter is in the even column condition the contacts K5–12 will be transferred so as to complete a circuit through lamp 19b to illuminate the even column indicator dial 18b. In this manner, the operator is given an indication, for each escapement position of the card, of the column of the card into which the next punching operation will be recorded.

To briefly summarize the sequence of events during the course of a card punching cycle under keyboard control, it will be seen that the card will be punched in either an odd or even column depending on the state of the odd-even counter at the beginning of the punch cycle. During the oscillation of the punch bail in effecting the punching of the card the odd-even column counter is pulsed so that its state is changed. Thereafter in the cycle, provision is made to complete a circuit to the escape magnet if the changed state of the counter indicates an odd column state, the circuit to the escape magnet being broken if the changed state of the odd-even column counter indicates an even column state, the actual escapement of the card, when permitted by the state of the counter, occurring near the end of the punching cycle. It should be mentioned that the sequence of events during the course of a punching cycle is different from the sequence of events in a punching cycle of the machine of the aforesaid Patent Number 2,647,581 wherein for each punching operation the card escapes to the next columnar position prior to the operation of the punch bail.

A spacing operation, which may or may not result in actual escaping of the card depending upon whether the operation is initiated from an odd column or even column, is initiated by the space bar 29 on the keyboard which closes its contacts 29a, FIG. 6d, which connect line 106 to lead 107, which contacts are in parallel with the interposer bail contacts 102 so that, when the contacts 29a of the space key are closed, a circuit is completed from B— to the control grid of tube V9 to energize the punch clutch magnet thereby initiating a punching cycle. However, since none of the interposer magnets 80 are energized in this spacing operation, no punching occurs in the column, and during the course of the punch cycle the odd-even column counter is pulsed to shift the state of the counter so that later in the cycle, when the contacts operated by punch cam PC4 close, a circuit will be completed to the control grid of tube V10 for energizing the escape magnet 75 depending upon the state of the counter at that time of the cycle. Accordingly, if the space key is operated at a time when the machine is conditioned for punching an odd column, the effect of the subsequent cycling of the punch shaft is only to change the state of the counter to the even column state without advancing the card physically past the punches. However, if the space key operation is initiated when the machine is in condition for punching an even column, the resulting cycling of the punch shaft will operate to switch the counter to the odd state condition, whereupon the subsequent escape signal through contacts of PC4 will be effective for energizing the escape magnet to physically advance the card so as to condition the machine for punching in the next odd column.

To shaft the keyboard into the alpha-shift condition, depression of the Alpha key 24 of the keyboard will close its contacts 24a (lower left, FIG. 6c) which as heretofore mentioned are not latch contacts affected by the keyboard restore mechanism so that they remain closed as long as the key is held depressed. These contacts when closed will connect the B— line 106 to a line 117 which runs through the normally closed contacts 23a of the numeral shift key 23 to the control grid of tube V7 causing the tube to fire and energize the alpha relay K4. The alpha relay when energized transfers its contacts K4-7 through K4-12, see FIG. 6a, so as to connect with the six keyboard bail contacts 90 effective in the alpha-shift condition and thereby provide an appropriate input circuit or combination of circuits to the interposer magnets 80 in accordance with the encoding in effect when the keyboard is in the alpha-shift condition.

In certain operations, the machine is automatically conditioned to be in the alpha-shift condition, for example, when not operating under program card control and with the star wheel sensing members raised to their ineffective position. In this type of operation, a star wheel limit switch associated with the means for raising the star wheels to their ineffective position, said switch being indicated by numerals 116 (corresponding to the switch contact 399 of the aforesaid patent) closes to complete a circuit (lower left, FIG. 6c) from conductor 106 to line 117, said limit switch 116 being in parallel with the alpha key switch contacts 24a thereby bringing in the alpha relay K4 to automatically place the keyboard of the machine in the alpha-shift condition. In this type of operation when the machine is automatically conditioned for recording alphabetic data, the keyboard may be shifted back to the numeral shift condition by operation of the numeral key 23 which opens its contacts 23a to interrupt the circuit over lead 117 and thereby deenergize the alpha relay K4. Since the numeral key 23 is not affected by the keyboard restore mechanism, i.e. its contacts are not latch contacts, the keyboard will remain in the numeral shift condition as long as the numeral key is held depressed.

The Multi-punch key 21 is generally used to record codes not readily available on a keyboard. In essence, it conditions the machine so that successive punching operations can be accomplished or completed in the same card column. Depression of this key opens its contacts 21a, see lower left, FIG. 6d, so as to break the B— input over conductor 110 to the contacts operated by punch cam PC4 and also to the counter cam contacts operated by punch cam PC3. The Multi-punch key 21 is held depressed while two or more data keys are operated to cause the punch to go through corresponding punching cycles, the key being released before operation of the data key which enters the last of the multi-punchings desired in a single card column into the card.

The last of the multiple punch operations, with the multiple punch key 21 released, will initiate a normal punching cycle as heretofore described wherein the odd-even column counter will be pulsed and shifted and the punch cams PC4 will be effective for causing an escapement of the card depending upon the state of the odd-even column counter at the time when the escape cam contacts PC4 close.

*Manual duplicating operations*

In duplicating operations, the data sensed from a card read at the reading station is punched into corresponding columns of the card at the punch station, the reading operation being accomplished by sensing pins which are cyclically released under control of the reader cam on the punch shaft so as to selectively close reader contacts 120 (corresponding to the reader pin contacts 223 of the aforementioned Patent No. 2,647,581) in accordance with the code pattern sensed to provide inputs for selectively energizing the interposer magnets 80 thereby causing a punching cycle to occur to duplicate data in accordance with the information sensed from the card at the reader station. In FIG. 6a is shown the reader contacts 120 associated with the odd columns of the card and in FIG. 6b the reader contacts associated with the even columns of the card, all said contacts being connected to the common +35V line 91. In the case of the odd column reader contacts it will be noted that they are tied to the contacts K9-5 through K9-10 of an odd column duplicating relay K9 each of which contacts is connected to a respective input lead 121 running to the control grid of a respective one of the tubes V20 controlling the odd column interposer magnets 80. In the case of the even column reader contacts 120 they are tied to the contacts K7-2 through K7-7 of an even column duplicating relay K7 each of said contacts of relay K7 being connected to an input line 122 running to the control grid of a respective one of the tubes V20 controlling the interposer magnets 80 associated with the even columns of the card. The reader contacts 120 are operated in each punching cycle but are not effective for controlling the interposer magnets unless one or the other of the relays K9 or K7 is energized.

A duplicating operation can be initiated automatically under control of the program card or it may be initiated manually by operator control through depression of the Dup key 22, in which case the duplication operation proceeds in a column by column manner as long as the Dup key is held depressed. This latter type of operation, referred to as a Manual Dup operation, will now be described. Upon operation of the Manual Dup key 22 its contacts 22a, see FIG. 6c, close to complete a circuit from the line 105, normally at B— potential as heretofore described, through the transferred contacts K13-4 of the card lever relay and the normally closed contacts K14-2 of the release relay K14 connected by lead 103 to the B— power supply terminal. The circuit continues from the lead 105 through the contacts operated by punch shaft cam PC6 over lead 123 through normally closed contacts K1-6 and K2-1 to the manual Dup key contacts 22a and thence through contacts 65a normally closed and opened during energization of the keyboard restore magnet 65 to contact K5-11 of the counter relay and depending upon the state of the counter eventually to the grid of the control tube for the odd column duplicating relay K9 or the even column duplicating relay K7. Assuming for the moment that the manual duplicating operation starts in an odd column, relay K5 will be in the odd column condition so that the circuit will continue over lead 124 to a connection with lead 125 where the circuit branches and runs up to a conductor 126 which connects directly through diodes 127, 128 to the control grid of tube V3 which upon receiving the positive pulse, considering its normal negative bias, fires to bring in the odd column duplicating relay K9. From lead 126 a parallel circuit is also completed over line 129 via diode 131 to a connection with the lead 107 running to the control grid of tube V9 which fires to energize the punch clutch magnet and thereby start a punching cycle. Also completed is a circuit from lead 124 through diode 132 to a connection with a lead 133 which runs directly to the control grid of tube V4 which fires to bring in Dup 1 relay K8. As a result of the operation of the Manual Dup key 22 for starting the operation in an odd column it will be seen that relays K9, K8 and the punch clutch magnet 70 are energized. The main function of relay K8 is to provide a holding circuit around the key contacts 22a for the duplicating operation. It will be seen that the relay contacts K8–1, (left, FIG. 6c) will be brought in to lock in the relay from lead 123, to hold relay K8 energized until the punch cam contacts PC6 open which, as can be seen by reference to the timing diagram, occurs at the end of a punching cycle, i.e. from 248° to 290° which is the time of the cycle that the punch clutch latches up. The Dup 1 relay K8 also provides a hold circuit for relay K9 at its contact K8–2 (lower left, FIG. 6c) which are tied to the B— lead 106 and when transferred in conjunction with the energization of the odd column duplicating relay K9 establish a holding circuit for relay K9 through contacts K9–4 over line 134 and diode 135 to the lead 126 running to the control grid of the odd column duplicating relay control tube V3. Relay K9 when coming in transfers its contacts K9–5 through K9–10 so that the reader pin contacts 120 will be connected to tubes V20 for the odd column interposer magnets 80 so as to duplicate only information recorded in the odd column of the card at the reading station.

Figure 5:
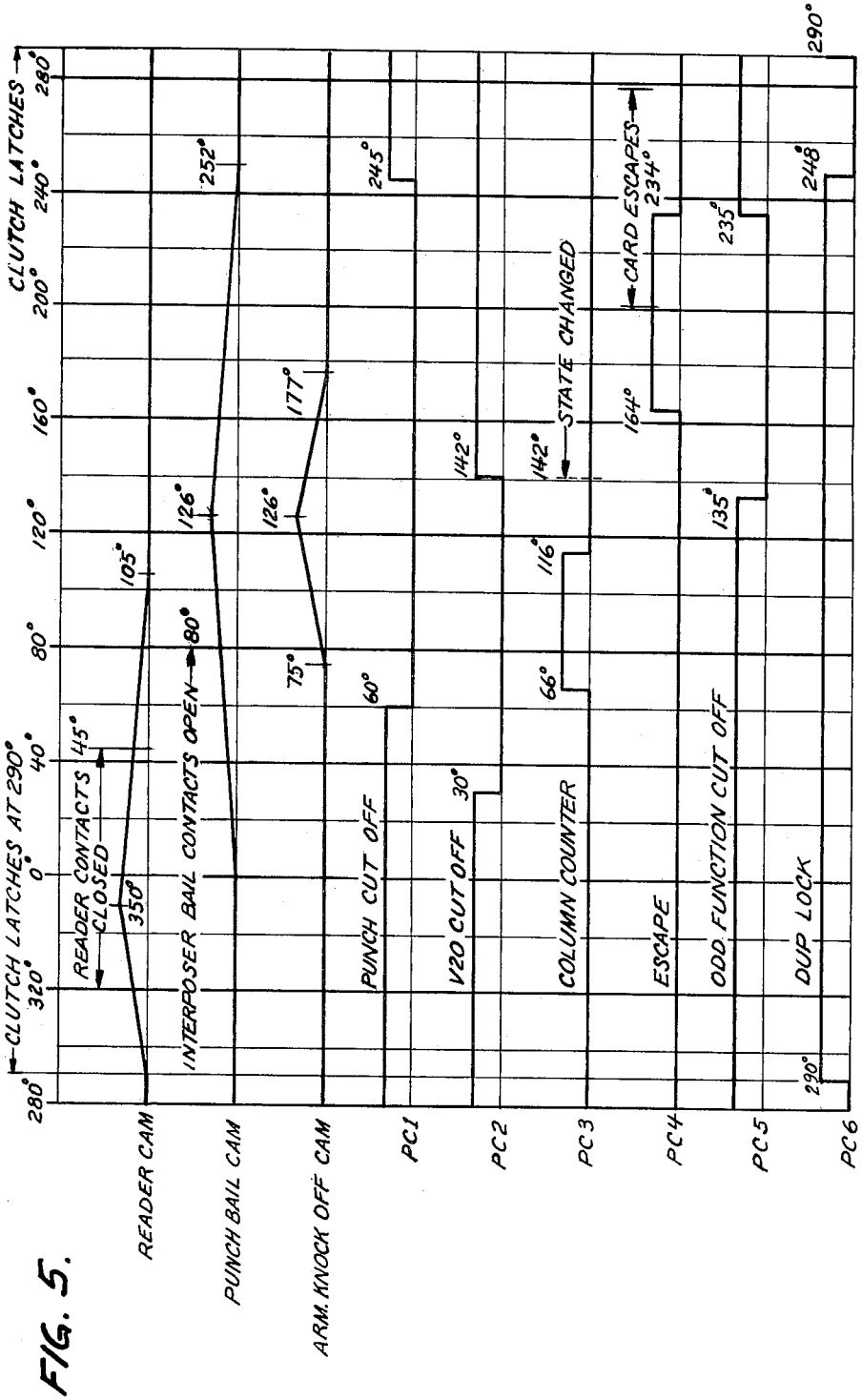
FIG. 5 is a timing chart for a machine incorporating a first embodiment of the invention.

The energization of the punch clutch magnet 70 starts the duplicating cycle wherein, as can be seen by reference to the timing diagram, FIG. 5, the sensing or reader pins operate under control of the punch shaft early in the punch cycle so as to close their contacts at approximately 320° of the cycle and thereby selectively energize the odd column interposer magnets 80 prior to the time that the punch bail starts to oscillate at 0° of the cycle. Accordingly, as the cycle continues, the information sensed from the card at the reading station will be duplicate punched into the card at the punch station in the corresponding column since the cards are in column to column registration in the respective stations as heretofore mentioned. During the course of this first duplicate punching cycle, the odd-even column counter will be pulsed so as to condition the circuit for punching in the even column in the next punching cycle. Assuming that the manual Dup key 22 is released before completion of the first punching cycle only one column duplication will occur, and the relays K9 and K8 will be deenergized when the holding circuit through the punch cam PC6 contacts opens near the end of the punching cycle. In the event that the Manual Dup key 22 is not released but is held depressed after the first punching cycle, the duplicating operation will continue but since by this time the counter has changed state the next duplicating cycle will occur in an even column. When the odd-even column counter changes states, its contacts K5–11 (left center, FIG. 6c) transfer to bring in the even column duplicating relay K7 and drop out the odd column duplicating relay K9. This circuit can be traced as before up to the duplicating key contacts 22a and thence through the transferred contacts K5–11 to a line 140 which runs upwardly through diode 136 to a connection with the input lead 133 to the control tube for the relay K8 which again energizes and establishes a holding circuit through its contacts K8–1 and the punch cam contacts operated by PC6. The line 140 also runs downwardly, see FIG. 6d, through diode 137 to a connection with lead 138 running to the control grid of tube V12 for the even column duplicating relay K7 via diode 139. The lead 138 branches at its junction with line 140 and continues through a diode 141 to a connection with the lead 107 completing a parallel circuit to the control tube V9 for the clutch magnet 70. The resulting cycling of the punch shaft in the second duplicating cycle with relay K8 and the even column duplicating relay K7 energized will cause the information in the even column of the card at the reading station to be sensed and reproduced or duplicated in the corresponding even column of the card at the punching station since the relay K7 in energizing brings in its contacts K7–2 through K7–7 to selectively energize the even column interposer magnets 80 thereby causing the same punched pattern to be duplicated into the corresponding column of the card at the punch station. Relay K7 when brought in at the start of the second duplicating cycle is held in by its locking contact K7–10 which completes a locking circuit from the B— line 105 through contacts K8–2 which transfer in each manually controlled duplicating cycle, the contacts K7–10, and a line 142 connecting with the lead 138 which runs directly to the control grid of the tube V12 which energizes the even column duplicating relay K7. This locking circuit will be held until the punch cam contacts PC6 open at 248° of the punch cycle at which time the locking circuit to the relay K8 through its contacts K8–1 is broken to interrupt the hold circuit to relay K7 at the same time so that if the Manual Dup key 22 is released before completion of the second operating cycle both relays K7 and K8 will deenergize and the duplicating operation will stop after two duplicating cycles. As long as the manual duplicating key 22 is held depressed the duplicating operation will proceed with the odd column duplicating relay K9 and the even column duplicating relay K7 being brought in alternately in sequence with the operation of the odd-even column counter in a continuous succession of punching cycles to accomplish a duplication of whatever card field may be selected or desired by the operator.

Release of the cards from the punching station and reading station, respectively, as heretoforementioned, is accomplished by operation of the release key 25, see FIG. 6c, whose contacts 25a close to bring in the release relay K14 which locks in through its contacts K14–1 and through program drum contacts of PR2. The release key contacts 25a are latch contacts, i.e. contacts restored by operation of the keyboard restore magnet 65. When the release relay K14 locks in, its contacts K14–2 (left, FIG. 6c) transfer interrupting the main source of B— potential to the control circuits and completing a circuit over lead 145 which runs to a connection with lead 146 and thence through diode 147 to a connection with line 148 which connects through a diode 149 to the lead 108 running to the control grid of tube V8 which fires to bring in the keyboard restore magnet 65. This will restore or relatch the release key contacts 25a. However, the release relay K14 is still locked in as long as the cards are in registration at the punch and reading stations, and the circuit completed by release relay contacts K14–2 to the lead 146 also runs downwardly, see FIG. 6d, and through diode 151 to a connection with the lead 115 running to the control grid of tube V10 which is thereby fired to bring in the escape magnet 75. This circuit to the escape magnet is held as relay K14 is locked in so as to enable the card to clear the punch and reading stations and until the program drum cam contacts of PR2 transfer after the cards have escaped completely past the respective stations to break the locking circuit for the release relay K14 and thereby deenergize the relay K14 to interrupt this circuit to the escapement magnet. As heretofore mentioned, the transfer of the program drum cam contacts of PR2 also broke the holding circuit to the card lever relay K13 thereby requiring the initiation of another card feed cycle during which feed cycle the card just released from the pushing station will be registered at the reading station, the following card will be registered at the punching station, which feed cycle will be automatically initiated by the transfer of the program drum contacts of PR2 if the automatic feed switch is closed to complete a circuit through its contacts 31a to the card feed clutch magnet 56 as heretofore described. It will be understood that after a card has cleared completely past the punching station, it is no longer under control of the escapement drive mechanism and is advanced into register with the reading station during the course of another card feed cycle. The escapement drive mechanism must however be operative for a sufficient time to advance the program drum to the position where column 1 of the program card will be in register with the program card star wheel sensing members. For this purpose another timing cam associated with the program drum, PR1, see FIG. 6d (corresponding to program drum cam contact PR2 of the aforesaid patent), comes into operation at this time to establish another hold circuit to the escape magnet 75 which can be traced from the B— lead 103, line 196, contacts of program cam PR1, line 146, diode 151 to lead 115 into the tube V10 controlling the escape magnet. The timing is such that the contacts of PR1 close immediately after the last column of the program card escapes past the program drum sensing line and open while the program card escapes from the first columnar position before column one, which may be referred to as the zero card column, into the first data columns of the program card, thereby stopping the escape advance of the program drum with column one and two of the program card in register with the program drum reading line.

Program card control

The next operations to be described will be those involving program card control. As heretofore mentioned and as fully described in the aforesaid Patent 2,647,581, automatic programming of the operation of the machine may be accomplished by a program card wrapped around the program drum and containing control perforations in selected index positions of the columns of the program card, the program drum being driven by the escapement mechanism so as to escape relative to the program card sensing members, in the form of starwheels, in synchronism with the escapement of the cards in the feed bed past the punch mechanism and the reading mechanism, respectively. In the presently described embodiment of the invention, as heretofore pointed out, the registration of the three cards involved is such that columns one and two of the card at the punching station registers with the punches concurrently with the registration of columns one and two of the card at the reading station and, further, concurrently with the registration of columns one and two of the program card with the program card star wheel sensing members. The contacts operated by the program drum star wheel sensing members associated with odd columns of the program card are shown in FIG. 6c and include contacts 161 operated by the star wheel at the Y index position of an odd column of the program card, contacts 162 for the X index position, contacts 163 for the "8" index position, contacts 164 for the "4" index position, contacts 165 for the "2" index position and contacts 166 for the "1" index position of an odd column of the program card. In each case, the function performed by the respective contacts is also indicated in the wiring diagram. Similarly, for the even columns of the program card, see FIG. 6d, contacts 171 through 176 are associated with corresponding index positions of the even columns of the program card, with the function associated with each of said contacts being indicated in the wiring diagram. When the machine is under program card control it will of course be understood that the sensing star wheels are lowered into contact with the program card in which position the star wheel limit switch contact 116 (lower left, FIG. 6c), heretofore mentioned, opens the circuit for energizing the alpha-shift relay K4 so as to place the keyboard of the machine in the numeral shift condition.

In certain automatically controlled operations it may be desired to place certain of the programmed operations, in particular the skip and duplicating operations, under control of the operator even though they may be programmed in the program card. For this reason the Auto Skip-Auto Dup switch is provided on the keyboard and which may be set by the operator to the "Off" position so as to prevent the program card from automatically initiating a skip or duplicating operation even though the program card may contain control perforations which otherwise would initiate the automatic skipping or duplicating operation. As can be seen by reference to FIG. 6c the B— circuit to the program drum star wheel contacts is completed through the contacts K5–9 of the counter relay K5 which when in the odd column condition connect the B— lead 103 through a lead 178 directly to the odd column star wheel contacts 161, 164 and through contacts of an odd function cut off cam PC5 to the contacts 165, 166 and also in parallel to the contacts 32a of the Auto Skip-Auto Dup switch. This switch when closed feeds the B— potential to the contacts 162, 163 which close in response to the sensing of control perforations in the "X" and "8" control positions in the program card to initiate automatic skipping or duplicating by the machine.

When the odd-even column counter is in the even column condition, the B— circuit to the odd column program card contacts is interrupted by contacts K5–9 and transferred over lead 179, see FIG. 6d to the even column star wheel sensing contacts 174, 175, 176 and through the Auto Skip-Auto Dup switch contacts 32b to the even column program contacts 172, 173 for automatically initiating skipping and duplicating functions starting from even columns if the switch contacts 32b are in the closed position. It might be pointed out at this time that the line 179 does not feed B— potential directly to the even column star wheel contacts 171 since these contacts, generally stated, are connected in series with other control circuits, as will be apparent from the following description, for determining the beginning and end of field definition in conjunction with the odd column field definitions contacts 161 and controlling the automatically programmed operations in accordance therewith.

The first automatically programmed operation to be described will be an automatic duplicating operation, and for the purpose of this explanation it will be assumed that the card field to be automatically duplicated starts with an odd column and ends with an even column. As heretofore explained, programming for an automatic duplicating operation is achieved by perforating the program card in the first column of the field to be duplicated in the "8" index position which is the control perforation for indicating the start of an automatic duplicating operation. The remaining columns of the field will include program control perforations in the "Y" index position which is also referred to as a field definition control position and which determines the extent of the field to be automatically duplicated. Of course since we are dealing with an automatic duplicating operation the Auto Skip-Auto Dup switch 32 will be "ON" so that its contacts 32a and 32b will be closed. Since we are starting the automatic duplicating operation in an odd column the odd-even column counter will be in the odd column state so that B— supply will be fed over the normally B— lead 103, the relay contacts K5–9 of the counter relay to lead 178 and through the contacts of punch shaft cam PC5 to contacts 32a of the Auto Skip-Auto Dup switch and thence through contacts 163 which close upon sensing the start duplicating signal in the odd column of the program card, continuing the circuit through contacts K2–6 over lead 126 and through diodes 127, 128 to the tube V3 so as to bring in the odd column duplicating relay K9. A circuit has also been established from lead 126 over line 125 through diode 132 to the lead 133 running to the control grid of tube V4 so as the bring in the Dup 1 relay K8. Another parallel circuit is also established from the lead 126 over line 129 through diode 131 to the lead 107 to the control grid of tube V9 for energizing the punch clutch magnet so as to thereby initiate a punching cycle. The same signal running over lead 129 to the punch clutch magnet also carries the signal over line 181 and through a diode 132 to the even column field definition contacts 171 which, for purposes of this explanation, will be closed because field definition has been assumed to end with an even column and therefore at this time contacts 171 would be closed by their respective star wheel sensing member since they would be under control of the first even column of the field being duplicated. The circuit would continue through the field definition contacts 171 and contacts K9–2 of the odd field duplicating relay, now transferred, to the lead 138 which runs through diode 139 to the control grid of tube V12 which will bring in the even column duplicating relay K7. Since both the odd column duplicating relay K9 and the even column duplicating relay K7 are simultaneously energized, their respective contacts tied to the reader pins 120, see FIGS. 6a, 6b, close so that, during the ensuing punching cycle, data will be read from both the odd and even columns of the card at the reading station to selectively energize the interposer magnets for controlling both odd and even column punching so as to simultaneously punch the information from the two columns read into the first two columns of the field being duplicate punched.

During this first automatic duplicating cycle, since it was initiated from an odd column, the counter was in the odd column condition. In this first duplicating cycle, the counter will be prevented from switching to the even condition since the input to the counter from the counter punch cam contacts of PC3 include contacts K9–1 and contacts K7–1 in parallel, and with both relays K9 and K7 being energized the input to the counter is broken. Thus the counter will remain in the odd state so that when the punch cam PC4 makes its contacts later in the cycle the counter, being held in the odd condition, will feed the signal to the control tube V10 for the escape magnet over line 115 so as to cause escapement of the card to place the next two columns, i.e. an odd and even column, in register with the punches. As heretofore mentioned in connection with the manually controlled duplicating operation, the odd and even duplicating relays K9 and K7, when energized in conjunction with duplicating relay K8, are locked in through their contacts K9–4 and K7–10 (bottom, FIG. 6c) connecting with contacts K8–2 to the line 105 running to the Dup lock cam contacts of PC6 which open the locking circuit at about 248° of the cycle. The escape cam, PC4 as heretofore mentioned, operates to close its contacts at 164° of the cycle causing card escapement to occur. The card starts its escape movement at about 202° of the cycle and ends the escapement travel at about 270° of the cycle. During the escapement travel of the program drum, the sensing star wheel contacts make before the card completes its escapement travel so that if a field definition control hole is sensed by the associated star wheel in the next odd column of the card, the field definition contacts 161 will close to establish another holding circuit for the odd column duplicating relay K9 over lead 182 through its hold contacts K9–3, which are still transferred at this point of the cycle by the locking circuit controlled by relay K8 heretofore described through the contacts of Dup lock cam PC6, so as to thereby hold the odd column duplicating relay K9 energized for a second duplicating cycle. With relay K9 held energized now under control of the field definition contacts 161, circuits similar to those initiated by closure of the duplication start contacts 163 will be completed running now from the field definition contacts 161 through contacts K9–3 and over lead 129 to the control tube for the punch clutch magnet 70 and also in parallel over lead 181 through diode 132 to the field definition contacts 171 for the even numbered columns which, if closed as a result of a field definition control hole in the next even column, will again bring in the even column duplicating relay K7 so that in the second duplicating cycle the data recorded in both the odd and even columns of the card at the reading station will be duplicated into the corresponding odd and even columns of the card at the punching station simultaneously. From this point on, as long as field definition control holes appear in both the odd and even columns of the field, successive duplicate punching operations will occur with the odd column duplicating relay K9 being locked in continuously under control of the field definition contacts 161 of the odd columns of the field since the star wheel sensing members operating these contacts hold the contacts closed during the escapement travel of the card as long as control holes appear in successive odd columns of the card. It was assumed for the purposes of this description that field definition would terminate with an even column. During the punch cycle for the last odd and even columns of the field, the card will escape along with the program drum, at which time the next odd column of the program card, by not having a field definition control hole, will cause the contacts 161 to open thus dropping out the odd column duplicating relay K9 and at the same time interrupt the circuit over lead 129 to the punch clutch magnet and the parallel circuit to the even column field contacts 172 thereby causing the even column duplicating relay K7 to also drop out. The clutch latches up at the end of the cycle, and since there was no input to the odd-even column counter throughout the duplicating operation, the counter will remain in the odd column condition.

If we assume that field definition did not end with an even column but instead ended with an odd column, upon escapement of the card and program drum to the last odd column of the field being duplicated, the circuit to the odd column duplicating relay K9 would still be held in by the field definition contacts 161, and a parallel circuit would also be established over lead 129 to the control tube V9 for the punch clutch magnet. However the parallel circuit over lead 181 to the field definition contacts 171 for the simultaneously registered even column would be interrupted by the opening of the contacts 171 so as to drop out the even field relay K7. Accordingly, another duplicate punching cycle would occur but in this instance, since relay K7 has been dropped out, the duplication would occur only in the odd column. Also during this last duplicating cycle in the odd column, the counter cam contacts operated by PC3 (lower left, FIG. 6d) will now be able to complete the circuit to the odd-even column counter so that during this last punching cycle in the odd column, the counter will change state to the even condition whereby the circuit to the escape magnet will be interrupted by the opening of the counter relay contacts K5–1 to prevent escapement of the card during this last duplicating cycle in an odd column.

If we assume that the automatic duplicating operation were to be initiated from an even column, the odd-even column counter will be in the even state and the operation will be initiated by closure of the start duplicate contacts 173 resulting from appropriate punching of the program card to complete a circuit starting from the normally B— lead 105, see FIG. 6c, through contacts K5–9, now transferred since the counter is in the even condition, over lead 179 through the contacts 173, K9–12 and K1–1 to line 140 where the circuit branches running upwardly to connect through diode 136 with lead 133 running to the control tube V4 for the Dup 1 relay K8. The other circuit branch over lead 140 runs through diode 137 to bring in the even column duplicating relay K7. Lead 138 also runs from its connection with line 140 through diode 141 to the lead 107 to the tube V9 for energizing the punch clutch magnet 70 whereby three parallel circuits are completed for energizing simultaneously Dup 1 relay K8, even column Dup 3 relay K7 and the punch clutch magnet 70 to initiate the first punching cycle of the duplicating operation. In this first cycle, only the even column field will be duplicated since relay K7 connects the even column reading pins 120 to their associated interposer magnets 80, and relay K9 which is associated with the odd column reader pins 120 is not energized in this first punching cycle. During the first punching cycle starting in an even column, the column counter will be driven to the odd state so that during the course of the cycle the card will escape. Since the odd-even column counter has been driven odd and the escapement occurs before the locking circuit to the even column Dup 3 relay K7 under control of relay K8 is broken by punch cam PC6 contacts, if the next odd column of the card contains a field definition control hole then a circuit will be established for bringing in the odd column duplicating relay K9 which can be traced as follows: starting at the lead 105 normally at B—, through contacts K5–9, lead 178 to the odd column field definition contacts of the program drum which will close during escapement of the card completing a circuit over line 185, contacts K7–8 (still transferred since relay K7 is locked in until 248° of the cycle as heretofore mentioned), the circuit continuing over line 181 to its connection with line 129 and thence to a connection with lead 126 running through diode 123 to the grid of the control tube V3 for bringing in the odd column duplicating relay K9. From this point on, the duplicating operation will continue in the manner heretofore described, duplicating both odd and even columns in register with the punch station simultaneously as long as field definition control perforations are contained in the corresponding columns of the program card and ending the duplication with the last column, whether it be odd or even, in which the corresponding column of the program card contains a field definition control perforation.

It may be brought out again at this time that when the machine is operating under program control, but with the Auto Skip-Auto Dup switch in the "OFF" position, a manually initiated duplicating operation will result in the same operation as an automatically initiated field duplicating operation if field definition is programmed into the program card. As heretofore described, manual operation of the Dup key 22 operates to bring in Dup 1 relay K8 and energizes the punch clutch magnet 70 along with either the odd field duplicating relay K9 or the even field duplicating relay K7 depending upon whether the operation was initiated from an odd or even column. Once the odd field Dup 2 relay K9 is brought in, the extent of the duplicating operation will be automatically determined by the field definition programming in the program card in the same manner as an automatically initiated duplicating operation so as to continue throughout the field programmed for duplication even though the Manual Dup key 22 may be released before duplication of the entire field is completed.

Skip operations

Generally stated, there are two different types of manually initiated skipping operations. Of course it should be understood that although the operation is referred to as manual skip, it involves program control for field definition purposes in order to determine where the skipping stops. If a manual skip operation is initiated when the machine is not under control of the program card so as to not have any means for determining field definition, the operation would be the equivalent of a space operation which would result in merely changing the state of the odd-even column counter if initiated in an odd column, or changing the state of the odd-even column counter and escaping the card one escape position if the operation were initiated from an even column. Assuming that the machine is operating under program card control, manually initiating a skip operation by depression of the Skip key 28 will result in an X skip if the keyboard is in the numeral shift condition, which is its normal condition when operating under program control, or the operation will be a normal skip if the keyboard is in the alpha shift condition. The difference between the two types of skip operations is that in an X skip operation the card at the punching station is punched in the "X" index position in the column in which the skipping operation is initiated whereafter skipping will continue as long as field definition exists in successive columns. In the normal skip operation there is no punching in the initiating column, and the skipping operation continues from the initiating column without any punching as long as field definition exists in successive columns of the program control card. The normal skip operation would be initiated by depression of the Alpha Shift key 24 simultaneously with the Skip key 28 whereupon a circuit may be traced as follows, starting with the B— supply terminal, see FIG. 6d, over B— lead 103 through release relay contacts K14–2 and the card lever relay contacts K13–4 to the contacts 28a now closed by operation of the skip key 28 and thence through contacts K4–5, now transferred due to operation of the alpha shift key 24 to bring in alpha shift relay K4, and thence to contacts K5–2 of the odd-even column counter relay K5.

If we assume for purposes of this description that the skip operation is initiated from an odd column, with the odd-even column counter in the odd column condition, the circuit will continue through contacts K5–2 now closed to a connection with line 188 which runs upwardly and through diode 189 so as to carry a positive pulse to the control grid of tube V2 to fire the tube and bring in the Skip 1 relay K1. At the same time, a parallel circuit is made from line 188 over line 191 to line 148 which via diode 149 and lead 108 carries a positive pulse to the control grid of tube V8 so as to bring in the keyboard restore magnet 65. The skip key contacts 28a are latch contacts in the keyboard so that as soon as the keyboard restore magnet is brought in, the contacts 28a open and remain open even though the skip key 28 may be held depressed. The skip operation will continue, however, as long as field definition is programmed in successive columns of the program card. It will be noted that another parallel circuit resulting from operation of the skip key continues downwardly on lead 188 through diode 192 through contacts K2–4, normally closed, of Skip 2 relay K2, and thence to the field definition contacts 171 associated with the even card columns of the program card. If there is no field definition programmed into this next successive even column of the program card, the circuit will not continue for the contacts 171 will be open. If this be the case, i.e. no field definition in the even column, the result of the energization of the Skip 1 relay K1 will be to transfer its contacts K1–4, see lower left FIG. 6d, providing an input to the odd-even column counter so as to energize counter relays K15 and K5 through normally closed contacts K2–3 thereby changing the state of the odd-even column counter to the even column condition. As Skip 1 relay drops out by operation of the keyboard restore magnets, the counter will remain in the even column condition by the hold circuit over line 113 through K15–4 contacts now transferred, as heretofore described. Therefore, with no field definition programmed in the next successive even column after the column from which the skip was initiated, the resulting operation will be the equivalent of a spacing operation with no escapement of the card but merely a change in state of the odd-even column counter. Assuming now that the next even column was programmed for field definition, the program drum contacts 171 would then be closed to continue the skip initiating circuit over line 188 and through contacts K2–4, the even field definition contacts 171, normally closed contacts K9–2 and K7–11 to normally closed contacts K8–3 and thence via diode 193 to the lead 115 running to the control grid of the tube V10 which fires to energize the escape magnet 75. The escape magnet in energizing allows the card to advance through the punch station under control of the escapement drive mechanism and at the same time closes its associated escape contacts 75a (corresponding to escape contact 107 of the aforesaid Patent 2,647,581) to complete a circuit for bringing in the Skip 2 relay K2. This circuit for bringing in relay K2 can be traced from the B— lead 103 over line 196 to contacts K1-5 of the Skip 1 relay, now transferred, the escapement contacts 75a and to a lead 197 running to the control grid of tube V11 which fires to bring in the Skip 2 relay K2. It will be understood that at the time Skip 2 relay is brought in, the card has started its escapement travel to the next escapement position. The Skip 2 relay K2 is held locked in by its contacts K2-5 and K2-4, in a manner hereinafter more fully explained, as long as field definition exists in successive odd and even columns as the card is advancing under control of escapement mechanism during the skipping operation. Another contact of the Skip 2 relay, the contact K2-3, controlling the odd-even column counter, see FIG. 6d, transfers to connect the counter input line 113, through contacts K15-4 now transferred, to a shunt line 197 around relay K15 to connect with lead 112 running to B+ potential thereby dropping out relay K15 to change the counter to the odd column condition and jamming the counter in this condition as long as relay K2 remains energized. It will be remembered that when relay K1 was brought in at the start of the skip operation its contacts K1-4, in transferring, changed the state of the counter to the even column condition, so that now, after relay K2 comes in, resulting from field definition in the next even numbered column, the counter is returned to the odd column state and remains jammed in the odd state as long as field definition exists in both odd and even columns of the program card thereby enabling a probing circuit to be established for determining if field definition in fact exists in both odd and even columns of the card as the card escapes past the program drum reading station. With the odd-even column counter now jammed in the odd condition and the card having escaped to the next escapement position, a field definition probing circuit is established running from line 105, normally at B— potential as heretofore-mentioned, through contacts K5-9 see FIG. 6c, lead 178 to the odd column field definition contacts 161 which will be closed if field definition is programmed in the next successive odd column, continuing the probe circuit to lead 182. The circuit over lead 182 will operate to lock in Skip 1 relay K1, which is a slow release relay, through its locking contacts K1-3 as long as field definition exists in successive odd columns of the program card. The probe circuit runs from lead 182 over lead 185 to the Skip 2 relay contacts K2-4, now transferred, and thence to the field definition contacts 171 which, if the next even column of the program card is programmed with field definition control holes, will be closed to continue the circuit to contacts K9-2, K7-11, K8-3, diode 199 to contacts K2-5 of the Skip 2 relay which over lead 197 maintain a holding circuit for relay K2 as long as field definition exists in both the odd and even columns of the card on the program drum as it advances past the star wheel sensing members. At the same time, a parallel circuit is established to the control tube for the escape magnet 75 which parallel circuit continues from the junction of diodes 199, 193 through diode 193 to the lead 115 which as heretoforementioned fires tube V10 maintaining the tube energized or fired and the escape magnet energized along with Skip 2 relay K2 as long as field definition is programmed in both the successive odd and even columns of the program card.

The skipping operation thus continues until a field definition control hole is absent from either an odd or even column of the program card at the program card reading line. If we assume that a field definition program control hole exists in an odd column but not in the even column of the program card columns being read, the probe circuit just described will be interrupted at the even column field definition contacts 171 which will have the effect of dropping out the escape magnet 75 and the Skip 2 relay K2 so as to stop card escapement and bring the skipping operation to an end under which conditions the last column of the skipped field will be an odd column. Since field definition does exist in the odd column of the program card being read, the skip relay K1 remains energized through its holding contact K1-3 so as to hold its odd-even counter input contact K1-4 transferred. When the skip relay K2 drops out due to the lack of field definition in the even column its counter input contacts K2-3 restore, thereby completing an input circuit through contacts K1-4 and K2-3 to counter relay K15 to switch the counter to an even column state. As the counter switches to an even column state, its contacts K5-9, see left of FIG. 6c, transfer to interrupt the probe circuit at that point so that there is no longer a hold circuit for Skip relay K1 through the odd column field definition contacts 161 and hold contacts K1-3 with the result that Skip 1 relay K1 also drops out. The circuit is now in condition for punching the even column next following the last odd column of the field which had been skipped.

If we assume now that the field bing skipped ends with an even column, the program card after escaping past the last even column of the skipped field will not contain a field definition control hole in the next succeeding odd column so that, in this instance, the field definition probe circuit as before described will be interrupted at the odd column field definition contacts 161. Skip 1 relay K1 will lose its hold circuit through said contacts 161 and will drop out along with Skip 2 relay K2 and the escape magnet 75. Under these conditions, the contacts of the Skip 1 and Skip 2 relays in the input circuit to the odd-even column counter, i.e. contacts K1-4 and K2-3 will both restore to prevent the counter from shifting from the odd state since, as before mentioned, during the skipping operation it has held jammed in the odd state. Accordingly, under these conditions, card escapement will be stopped with the card in position for punching the next odd column following the end of the skipped field terminating with an even column, the odd-even column counter remaining in the odd condition.

An X skip operation is similar to the normal skip operations just descried as to duration controlled by field definition in the program card, with the exception that provision is made in initiating the operation for punching an X skip indication in the card in the first column of the field skipped. The X skip key 28, which is the same key as is employed for initiating a normal skip operation, can be considered to be a data recording key in addition to a functional key, due to the fact that it operates a latch contact in the keyboard through slide mechanism, (as fully described in the aforesaid Patent Number 2,647,581), mechanically coupled to the permutation encoding bail mechanism in such a manner as to close one of the keyboard bail contacts 90, in particular, the contact effective when the keyboard is in the numeral shift condition for energizing the interposer magnet 80 effective for punching the "X" index position of a card column. As heretoforementioned, an X skip operation results when the Skip key is depressed at a time when the keyboard is in the numeral shift condition which is the normal condition of the keyboard when the machine is operating under program card control. Depression of the Skip key 28 (in addition to initiating a punching cycle for perforating the X index position of the initiating column, through a keyboard contact 90 and associated interposer magnet 80 in the same manner as heretofore described in connection with keyboard controlled punching operations) completes a circuit to the X skip relay K3 as follows: from the lead 104, normally at B— potentially, through the Skip key contacts 28a, normally closed alpha relay contacts K4–6, and line 201 which runs directly to the control grid of the tube V1 which fires to bring in the X Skip relay K3. The X Skip relay is held in by its holding contact K3–2 through the timing cam contacts of PC6 which holds the relay energized until 248 degrees of the punching cycle. The X Skip relay K3, when energized, operates the contacts K3—3 (which is connected to the contacts of timing cam PC3) thereby interrupting input to the odd-even column counter. The X Skip relay K3 contacts K3–4 interrupt the circuit through the contacts of punch shaft escape cam PC4 to the escape magnet 75 over lead 115. Accordingly, during the punching cycle which initiates the X Skip operation, the odd-even column counter will be prevented from changing state. The transfer of contacts K3–4 of the X Skip relay K3 operates to establish a probe circuit through the punch shaft timing cam contacts of PC4 for even column field definition if the state of the counter was odd at the start of the X skip operation, i.e. if the field to be skippd begins with an odd column. This probe circuit through cam contacts of PC4 and relay contacts K3–4 also operates to energize the Skip 1 relay K1. The circuit can be traced starting with line 110 normally at B— potential through the contacts 21a of the Multi-punch key, the punch cam escape contacts of PC4, contacts K3–4 now transferred, line 203 to odd-even counter relay contacts K5–2 which, when the counter is in the odd state connect with line 188 which runs upwardly to pulse the control grid of tube V2 so as to bring in the Skip 1 relay K1, the line 188 extending downwardly to probe through contacts K2–4, normally closed, for field definition in the even column of the program card at contacts 171 just as heretofore explained in connection with normal skip operations over a field starting from an odd column. If there is no field definition in the even column, i.e. contacts 171 are open, the probe circuit is interrupted at this point and the resulting operation will amount to only a one column X skip. The Skip 1 relay K1, being energized, closes its contact K1–4 to complete a circuit to the odd-even counter relay K15 thereby changing the state of the counter, but there will be no card advanced by the escapement mechanism since there is no circuit completed to the escape magnet 75. If, on the other hand, there is even column field definition so that contacts 171 are closed, the probe circuit continues through contacts K9–2, K7–11, K8–3 to the junction of diode 193, 199 where it branches to bring in the escape magnet 75, and also to hold in the Skip 2 relay K2 after the Skip 2 relay is brought in by closure of the escape contacts 75a in series with contacts K1–5, all as heretofore explained in connection with normal skip operations. From this point on, the operation continues with the odd-even column counter held jammed in the odd condition and the skipping continuing under control of field definition programming in successive odd and even columns and terminating in the same manner as heretofore explained in connection with normal skip operations.

In the event that the X skip operation is initiated with an even column, i.e. that the skipped field starts with an even column, the punching cycle would take place in the same manner but occurring in the first even column of the field being skipped and the X Skip relay K3 will be energized over the same circuit path including line 201. In this instance, starting with an even column, the probe circuit established through the punch shaft escape cam contacts of PC4 and the transferred contact K3–4 of the X Skip relay would run likewise to counter relay contacts K5–2 which, now in the even condition, completes a circuit to line 146, through diode 147 and line 191, connects with the lead 188 running to the grid of the control tube V2, bringing in the Skip 1 relay K1. The line 146 running downwardly from its connection with diode 147 completes a parallel circuit through diode 151, to the lead 115, running to the control grid of tube V10 for thus energizing the escape magnet 75. Energization of the escape magnet causes escapement of the card and at the same time, in closing its contacts 75a, with the Skip 1 relay energized and its contacts K1–5 transferred, brings in the Skip 2 relay K2 so that the skipping is again under control of field definition programming in the program card with the odd-even column counter being jammed in the odd condition and the operation continuing under control of field definition programming, terminating at the proper card column with the odd-even column counter in the appropriate state depending upon the column of the program card in which field definition terminated, exactly as described in connection with normal skipping operations.

Automatically initiated skipping operations utilize the same circuits as are employed in normal skipping operations, the only difference being in the automatic initiation of the operation which, once started, continues under control of field definition in the same manner as normal skip operations which were manually initiated. Thus it is not deemed necessary to repeat a detailed description except for the manner in which the operation is initiated. As heretoforementioned, if the skipping operation is to be automatically initiated, the program card is punched in the "X" index position of the first column of the field, and subsequent columns of the field to be skipped are punched with field designation perforations, i.e. perforations in the "Y" index position. In order to initiate automatically a skipping operation, the Auto Skip-Auto Dup switch must be closed so as to supply B— potential to the program drum reading contacts 162 with respect to odd columns and contacts 172 with respect to even columns, just as in the case of automatically initiated duplicating operations, heretofore described. If the field to be skipped starts with an odd column, the B— potential will be fed through the normally closed counter relay contacts K5–9 to the odd column skip initiating contacts 162 (which will now be closed) to continue a circuit through contacts K7–12 and over line 205 which connects with line 188 which (as in the case of a manually initiated normal skipping operation starting in an odd column) continues the circuit to bring in Skip 1 relay K1 and a parallel circuit to probe for even column definition at even column contacts 171 which if open (indicating only a single column skip), the net result (as heretofore explained in connection with a manually initiated normal skipping operation) is to change the state of the counter to the even state condition. However, if the probe circuit finds even column field definition with contacts 171 closed, the circuit continues as before described to energize the escape magnet 75 which in turn brings in the Skip 2 relay K2 so as to thereby continue the skipping operation, under the control of field definition, in the successive columns, terminating at the proper column, with the odd-even column counter in the proper state, all as heretofore described.

If the automatically initiated skipping operation starts in an even column, the odd-even column counter will be in condition so that the initiating circuit now runs from the counter relay contact K5–9 over line 179 through Auto Dup-Auto Skip contacts 32b to the program drum sensing contacts 172 in the "X" index position of the even column which will be closed to initiate the automatic skipping operation. The circuit continues through normally closed contacts K9–11 to line 146 which extends in parallel circuits, one running through diode 151 to bring in the escape magnets 75, the other parallel circuit running through diode 47, line 191 and lead 188 to bring in the Skip 1 relay K1. The energization of the escape magnet causes card advance and also brings in Skip 2 relay K2 by the circuit through the escape magnet contacts 75a and Skip 1 relay contacts K1–5 so that from this point on the skipping operation is again under control of field definition in successive columns in the program card, terminating upon interruption of field definition programming, all in the manner as heretofore described in connection with manual skipping operations. It will of course be understood that throughout all skipping operations, the keyboard restore magnet 65 will be held energized to lock the keyboard, since whenever Skip 1 relay K1 is energized or Skip 2 relay K2 is energized a parallel circuit is also completed to the tube V8 for controlling or bringing in the keyboard restore magnet 65. In the case of the Skip 1 relay, the parallel circuit to the keyboard restore magnet control tube V8 includes the lines 191, 148 which connect through diode 149 with the input lead 108 to the control grid of the tube V8 which fires to bring in the keyboard restore magnet 65. In the case of the Skip 2 relay K2, the parallel circuit which is established to the keyboard restore magnet control tube comprises the line 210, running from a connection with the input lead 197 to the control grid of tube V11 associated with the skip two relay, and extending through diode 211 to a connection with the input lead 108 running to the control grid of the tube V8 for bringing in the keyboard restore magnet 65.

Automatic alpha shift under program control, as heretoforementioned, is accomplished by perforating the program card in the "4" index position of each column in which it is desired to enter alpha data into the corresponding columns of the card at the punch station. In the event the alpha field begins with an odd column, B— potential over line 105 to counter relay contact K5–9 will be fed to the odd column alpha shift program drum contacts 164 which will be closed upon detecting the alpha shift control perforation thereby completing the circuit over line 215, through diode 216, to a connection with lead 117 which, as heretofore described, runs through the normally closed contacts 23a (operated by the numeral shift key) to the control grid of tube V7 which fires to bring in the Alpha relay K4.

When the odd-even column counter is in the even condition, the circuit at counter relay contacts K5–9 transfers so as to feed over line 179, the even column alpha shift program contacts 174 which, when closed, continue the circuit over line 217 and through diode 218 to a connection with lead 117 which, as just mentioned, runs to the control grid of tube V7 to bring in the Alpha relay. Accordingly, as long as a succession of columns of the program card contain alpha shift control perforations, the Alpha relay K4 will be successively brought in for each successive punching cycle, the control perforations in successive alpha shift index positions of the program card in effect constituting field definition for the alpha shift condition.

*Parity punch operations*

One of the novel features of the instant invention is the use of means for determining the row parity condition of the punchings within a selected card field and for automatically causing the machine to punch a partiy bit perforation in the last two columns comprising the end of the selected field in whatever row it may be required to place all rows within the field in the same parity condition. The parity control portion of the circuit, briefly stated, comprises a plurality of cold cathode thyraton flip-flop circuits, see FIGS. 6a, 6b, there being one flip-flop circuit associated with each of the interposed magnets 80. The circuits represented by blocks 81 are identical, the details of one being shown in FIG. 6a as associated with an odd column interposed magnet 80, another flip-flop circuit being shown in detail in FIG. 6b as associated with an even column interposer magnet 80. Each parity control flip-flop receives an input pulse from its associated interposer magnet in each punching cycle wherein the magnet is effective for causing its respective punch to perforate the card, the manner in which the input pulse is fed to the associated flip-flop being described in greater detail hereinafter. The parity control flip-flops are conditioned for receiving inputs from their respective magnets by energization of a Parity Start 1 relay K12, see FIG. 6c, under program card control, and the parity state of the control flip-flops is read out at the completion of punching in the selected parity controlled field of the card by the Odd Parity punch relay K10 with respect to the odd columns and the Even Parity Punch relay K6 with respect to the even columns. Since a card field of successive card columns comprises both even and odd columns, the read-out of the parity flip-flops requires two punching cycles, one for odd columns and one for even columns in order that the row parity condition embracing all columns within the selected field can be properly established. A parity start program control hole is punched into the program card in "1" index position of the first column of the selected parity card field. In the case where the field starts with an odd column it will be seen that the program drum star wheel sensing members upon detecting this control perforation will close the parity start contacts 166, see FIG. 6c, whereby a circuit is established from B— potential source through contacts K5–9 which will be in normally closed position since we are starting with an odd column and thence over lead 178 through the contacts of PC5 and thence to the odd column star wheel sensing contacts 166, now closed to start the automatic parity recording operation in the field, thence over lead 221 running to contacts K11–2 of the Parity Start 2 relay K11, normally closed, and thence to the control grid of tube V6 which will fire to energize the Parity Start 1 relay K12. At the same time, a parallel circuit is established running along lead 221 from contacts K11–2 and through diode 222 and a 5.1K resistor 223, see FIG. 6d, to the control grid of tube V14 which fires to energize Parity Start 2 relay K11. Relay K11 is slow to energize due to provision of a 1 μf. capacitor 224 in parallel with its grid bias resistor 64 so that K12 will remain energized for a predetermined time interval during the charging of capacitor 224 until relay K11 energizes, at which time contacts K11–2 will open to de-energize relay K12. When relay K11 energizes it locks in through a locking circuit starting from lead 106 normally at B— potential thence over line 235 through normally closed contacts K6–12 and K10–12 of the even and odd column parity punch relays thence through its own contacts K11–1, now closed, to the control grid of tube V14 to hold the relay K11 energized until one or the other of the contacts K6–12 or K10–12 opens to interrupt the locking circuit. The locking circuit for relay K11 just described is provided so as to prevent the re-energization of the Parity Start 1 relay K12 before the Parity Punch relays K6 and K10 are brought in under program control, as will now be described, to read the parity condition of the row and cause the automatic recording of the appropriate parity bit at the end of the parity field. In the event that the parity field starts with an even column, the circuit to the Parity Start relays would then be established from the B— potential on the relay K5–9 contacts, now in the even column condition, and thence over lead 179 to the parity start program drum contacts 176, which would be closed upon the star wheel sensing contacts finding a control perforation in the "1" index position of the first column of the parity field, and thence over line 231 to a connection with lead 221, see FIG. 6c, and thence to the parity start relays K12, K11 to complete the same parity start circuits to these relays as just described in connection with reference to the odd column starting of the automatic parity operation. The momentary energization of the Parity Start 1 relay K12 operates, in a manner to be hereinafter more fully described, to drive each of the parity control flip-flops to their even parity condition, whereafter the flip-flops associated with each of the interposed magnets 80 receive inputs as the punching progresses through the successive columns of the parity field until the last column for receiving keyboard entered data is reached and the column is punched. Thereafter, the next two columns of the field, i.e. the final odd and final even column are automatically punched, under program control, in accordance with the parity condition of the flip-flops associated with each of the interposed magnets thereby providing all rows within the field with the same parity count, which in the instant machine would be an odd count. Parity punching at the termination of the parity field is brought into operation under program control by a control perforation punched in the last two columns of the field, in the "2" index positions of the columns. The odd column parity punch control perforation, when sensed by the star wheel sensing member, will complete a circuit from the counter relay contacts K5-9 which would be in the odd condition, through the odd function cut off cam contacts of PC5 to the parity punch contacts 165, now closed, thence over lead 225 to the control grid of tube V5 which fires to energize the Odd Parity Punch relay K10. The line 225 continues from its connection with control grid for V5 through diode 226 to a connection with the lead 107 running to the control grid of tube V9 which also fires to energize the punch clutch magnet 70. Energization of the relay K10 will operate its contacts in a manner hereinafter to be more fully described to read out the odd column parity control flip-flops so as to control punching in the odd column in accordance with the parity state thereof. In the case of the even column parity punching, the star wheel control contacts 175 will be closed by detecting a control perforation in the "2" index position of the last even column of the parity field completing a circuit from the counter relay contacts K5-9, now transferred because of being in the even column condition, and thence over line 227 running to the control grid of tube V13 which fires to energize the even column Parity Punch relay K6. A parallel circuit is also completed running from lead 227 over line 228 through diode 229 to a connection with the lead 107 running to control grid of tube V9 for bringing in the Punch Clutch magnet 70. Relay K6 operates for even columns (in similar manner as relay K10, above described, with respect to odd columns) in controlling the punching in the last columns of the field so as to establish an odd parity condition in all rows of index positions within the even columns of the parity field.

With reference now to FIG. 6a, illustrating in detail one of the parity control circuits associated with an odd column interposer magnet 80, the parity control flip-flop counter input pulse results from the collapse of the magnetic field of the associated interposer magnet 80 when its control tube V20 is cut off by opening of the cut-off timing cam contacts of PC2. The resulting inductive surge from the circuit constants utilized in the present instance, with B+ at 165 volts and B— representing 0 volts, will result in an inductive surge pulse of approximately 320 volts which is dissipated through a pulse shaping network comprised of three parallel paths, one of which provides an input pulse to the associated flip-flop to switch the flip-flop from one stable state to another. The first dissipation path of the inductive surge pulse is through the associated tube V20, common cathode lead 82 and through the 510K resistor 86 and contacts K13-5 to B— potential. It will be noted that the resistor 86 is in the cathode supply circuit in parallel with the cut off timing cam contacts of PC2, and the main reason for it in the circuit is for unloading the grid during tube transfer time, providing an additional discharge path through the screen and the cathode of the associated tube V20. The second parallel path for dissipation for the inductive surge pulse extends from the interposer magnet lead 85 over line 240 through a 22K resistor 241 to a connection with a lead 242 which is common to all odd column parity control circuits and which runs to B— potential through a 10K resistor 243 and a 0.2 µf. capacitor 244 connected in parallel. The effect of the resistor 243 in this common lead is negligible because of the pulse rise time constants. The third parallel path for dissipating the inductive surge pulse runs over line 245 and through a 0.02 µf. capacitor 245a to a voltage dividing network consisting of diode 246, a 22K resistor 247, a 5K resistor 248 and a 51K resistor 249 which connect to B— potential over a line 250 and a lead 251 common to all the parity control circuits for odd columns. The common lead 251 runs to B— through the normally closed contacts K10-7 of the odd column Parity Punch relay K10 and contacts K13-5 of the Card Lever Relay. It also connects to B— in a parallel path through the contacts of the V20 tube cut-off cam PC2 via a diode 252. This third parallel path of dissipation for the inductive surge pulse will provide, with the circuit constants given, a positive pulse of approximately 60 volts at the junction of resistors 247, 248, which pulse is fed over line 255 and provides the input signal to the associated thyratron flip-flop.

The parity control flip-flops comprise circuits which include two cold cathode thyratrons, V21, V22 (5823 tubes in the present instance). The plate circuit of each of the tubes V21 and V22 are connected by leads 256, 257, in parallel, to a 2K plate load resistor 258 which in turn runs to B+ potential over lead 259, see also FIG. 6b, which lead is common to each of the twelve flip-flops. The plate lead for tube V21 includes a contact K12-1 operated by the Parity Start 1 relay K12.

The cathode of each of the tubes V21, V22 is connected to B— potential over the line 250 through a 6.8K cathode resistor (resistor 263, 265, respectively) connected in parallel with a 0.5 µf. capacitor (capacitor 264, 266, respectively). The cathode of each of the tubes V21, V22 is coupled to its starter electrode by diodes 267, 268, respectively, so as to prevent any grid to cathode current flow, and the cathode of each tube is also connected to the starter of the opposite tube through 51K resistors 271, 272, respectively, so that, when one of the tubes is conducting, its cathode potential will be applied to the starter electrode of the other tube. The tubes V21, V22 require a minimum of 105 volts on their starter electrodes to cause the tubes to ionize. The voltage output over line 255, through the pulse shaping network heretofore described, each time the associated interposer magnet 80 deenergizes, is a 60 volt pulse which is applied to the starter electrodes of both tubes through capacitors 275, 276, respectively. If neither tube is ionized at the time of receiving an input on their respective starter electrodes over line 255, no action will result since the input pulse is insufficient in amplitude to fire the tubes.

The flip-flop is conditioned for starting a parity count by energization of the Parity Start 1 relay K12, which as heretofore described is brought in by the closing of the program drum sensing contacts in either an even or odd column, i.e. contacts 166 or contacts 176, to place the keypunching under parity control. Relay K12 energizes only momentarily due to the action of Parity Start 2 relay K11, as heretofore described. The momentary energization of relay K12 transfers its contacts K12-1 which breaks the plate circuit 256 for the tube V21 and applies a positive pulse to the starter electrodes of both tubes through capacitors 275, 276, respectively. The positive pulse due to the voltage division between the plate load resistor 258 and resistor 248 has an amplitude of approximately 120 volts and will cause tube V22 to ionize but will not fire tube V21 since its plate circuit is open at contacts K12-1. Tube V22 can be considered the even count tube of the flip-flop and tube V21 the odd count tube, so that with tube V22 now fired by the momentary transfer of the Parity Start 1 relay contacts K12-1, the parity control flip-flop may be considered to be in condition to receive input pulses, being in the even count condition when the tube V22 ionizes. Each tube ionizes initially through the charging of the capacitor in its cathode circuit, capacitor 266 in the case of tube V22, and then after the time delay for charging of the capacitor conducts through the cathode resistor in parallel in the cathode circuit with the capacitor. The tube when conducting, after the initial time delay caused by the cathode capacitor, provides a constant voltage drop of 62 volts across the tube and the remaining voltage will divide proportionally across the plate and cathode resistors so as to maintain the plate potential at approximately 142 volts and the cathode potential at approximately 80 volts. The 80 volt cathode potential on tube V22 will also appear on its own starter electrode through diode 268, will appear on the starter electrode of the opposite tube V21 through resistor 272, and will also result in applying a small positive potential of approximately 9 volts to the cathode of tube V21 through the circuit running from the starter electrode of V22 to the cathode of V21 through resistor 271 thence to the B— line 250 through resistor 263, the resulting 9 volt potential on the cathode of V21 being the result of the ratio between resistors 271 and 263.

With the flip-flop counter now being in a stable state indicative of an even count condition, successive input pulses of 60 volts, each time the associated interposer magnet 80 energizes and subsequently deenergizes in the course of a punching operation, over line 255 and to both starter electrodes through the capacitors 275, 276, respectively, will cause the counter to change state successively from an even (or odd) count condition to an odd (or even) count condition, respectively, to determine the row parity condition within the selected card field. Upon receipt of the first input pulse after the counter is conditioned to start counting, as just described, with the tube V22 conducting and with the starter electrodes of both tubes maintained at 80 volt positive potential through the heretofore described connection with the cathode of tube V22, the 60 volt input will raise both starter voltages to approximately 140 volts which will thus cause the tube V21 to fire. At the instant of firing, the initial cathode circuit to the tube will be established though the cathode bypass capacitor 264 which, while charging, provides a low impedance path in the tube circuit which results in momentarily dropping the common plate supply potential to both tubes. The voltage drop across each tube being constant at 62 volts, the result will be that at the instant the tube V21 fires through its bypass capacitor 264, the common plate supply to both tubes will drop momentarily to 62 volts which is below the 80 volt cathode potential on tube V22. The cathode potential on tube V22 cannot change state instantaneously, due to the positive charge on its cathode bypass capacitor 266, with the result that tube V22 extinguishes while tube V21 continues conducting, after charging of its bypass capacitor 264, through its cathode resistor 263, at which time its cathode potential eventually rises to 80 volts, and the circuit constants previously existing for tube V22, when conducting, now apply equally to the tube V21 which resumes an equivalent state. Any subsequent input pulse will, in the same manner, cause extinction of the conducting tube and the firing of the non-conducting tube. Thus, as a punching operation continues through the selected parity field, each time one of the interposer magnets 80 is energized and deenergized in the course of a punching cycle, its associated parity counter will change state so as to give an indication of the parity count of the number of punchings in the respective row of the card field. An even count is indicated by the conduction of the even count tube V22, and an odd count is indicated by conduction of the odd count tube V21. As heretoforementioned, when either tube is conducting its cathode potential is at approximately 80 volts, with the cathode potential of the other tube being at approximately 9 volts.

After the last data entry is made in the selected parity field of the card, the parity counter is read out under program card control by energization of the odd column Parity Punch relay K10 and the even column Parity Punch relay K6 in succession through circuits heretofore described so as to cause automatic punching of the last two columns of the selected parity field with parity bits which will provide each row of index positions within the parity field with an odd parity count. With respect to the odd numbered card columns the energization of the odd column Parity Punch relay K10 will close its contacts K10-1 to K10-6 for the y, x, 8, 4, 2, and 1 odd stages, respectively. In the detailed circuit now being described, as shown in FIG. 6a, which controls punching in the "Y" index position of the odd card columns, the closure of the odd column Parity Punch relay contacts K10-1 will complete a circuit from the cathode of the associated parity counter flip-flop tube V22, over line 278 which includes an 82K resistor 279 and a diode 280, through the transferred contacts K10-1 to the junction of grid bias resistors 87, 88 for the associated tube V20. If at this time, the tube V22 is non-conducting its cathode potential is at approximately 9 volts and the counter is in a state indicative of an odd parity count. The resulting 9 volt potential from the cathode of the tube applied to the grid bias resistor of tube V20 is insufficient to drop the grid bias to a level sufficient to fire the tube V20 with the result that the associated interposer magnet 80 will not energize and no punching will occur in the last column of the selected parity field (i.e. the column reserved for parity bit punching), since the row of index positions within the selected field will already show an odd parity count. If, however, at the time the contacts K10-1 close, the tube V22 is conducting, which indicates an even parity count, the cathode potential of the tube will be at approximately 80 volts, and this potential, when applied to the grid bias resistors of the associated tube V20 through the closure of contacts K10-1, will result in removing the grid bias on the tube V20 to cause the tube to fire and energize the associated interposer magnet 80, thus causing a parity bit to be punched into the parity bit recording column of the card so as to provide the respective row of index positions within the selected parity field with an odd parity count.

When the odd column Parity Punch relay K10 energizes, it also opens its contacts K10-7 which removes one source of B— potential for the thyratron flip-flop circuit over line 250. However, at the time the relay K10 energizes, the V20 cut off cam contacts operated by PC2 are closed thereby providing another source of B— potential through lead 251 to the flip-flop circuit. During the ensuing punching cycle in which the parity bits are recorded in the card, the V20 cut-off cam contacts of PC2 will open at about 30 degrees of the punching cycle which will thereby cut off all B— potential to the flip-flop circuit, since K10-7 contacts will still remain open at this time of the punching cycle, with the result that the cathode circuit to both tubes of the flip-flop will be opened and neither tube will then be able to conduct until the counter is again brought into operation by energization of the Parity Start 1 relay K12 under program control in the manner hereinbefore described.

The parity counting circuits for the even numbered card columns are in all respects similar to those just described for odd numbered card columns, B+ potential being provided by the common B+ lead 259, B— potential being supplied to a manner equivalent to that for the add numbered columns, a separate line 282 providing a pulse dissipation path from the even column interposer magnets 80 to B— through a parallel connected 10K resistor and a 0.2 μF capacitor which serves the identical function as the line 242, heretofore described, connecting the odd column interposer magnets in a similar manner to B— potential. In the case of the even column parity counters, the readout is accomplished through the even column Parity Punch relay K6 which is energized under program card control upon the card arriving at the last even column of the selected parity field, which relay operates identically to the odd column Parity Punch relay K10 to cause automatic punching in the last column of the field, the column selected for parity bit recording. Contacts K6-1 through K6-6 of the even column Parity Punch relay complete circuits from the even column parity counters to the control grids of the associated even column interposer control tubes V20 in the same manner as heretofore described in connection with the odd column parity readout. B— potential is applied to the even column parity control flip-flops through contacts K6-7, see FIG. 6a, of the even column Parity Punch relay over a common lead 285, the common lead 285 also connecting to B— through the V20 cut-off cam contacts of PC2 by a diode 286. In reading out the parity counters for the even card columns, contact K6-7 will be open as a result of energization of the even column Parity Punch relay, and during the ensuing parity punching cycle as the punch cam contacts of PC2 open at about 30° both sources of B— potential will be cut off from the even column flip-flop circuits so as to extinguish all tubes in the even column parity counting flip-flops and thereby prevent any further parity count until the circuits are conditioned to start counting again by energization of the Parity Start 1 relay K12, as heretofore described, at the beginning of another selected parity field. As heretoforementioned, the automatic punching of the parity bit in the last columns of the parity field require two successive punch cycles to bring in the odd column parity punch relay K10 and the even column parity punch relay K6 under program control in succession, the order in which they are brought in being determined by the location of the last column of the parity field, i.e. whether the parity field ends with an odd numbered column or an even numbered column. If the selected parity field is programmed to end with an even column, then of course the odd Parity Punch relay K10 would be programmed to operate first in the last odd column of the selected parity field followed by energization of the even column Parity Punch relay K6 in the final column of the field which as above mentioned would be an even column. In the event that the selected parity field ended with an odd column, then the order in which the respective relays K10 and K6 were energized in the final two punching cycles would be reversed, as is obvious.

In the event that all of the parity counters are in the odd parity condition at the time the parity punch relay, i.e. either relay K10 or relay K6, is energized, none of the respective interposer magnets 80 would be energized, and the last column of the field reserved for automatically recording the parity bit would be left blank. However, a punching cycle would be initiated since the punch clutch magnet is energized in a circuit paralleling the control circuits to the odd Parity Punch relay K10 and the even Parity Punch relay K6, as heretofore described. This provision for cycling the punch shaft, even though the parity condition is such that no punching is to occur in the card at the final odd or even column of the parity field, gives assurance that at least a spacing operation will occur so as to condition the machine for punching in the next successive column. As heretofore described, the spacing operation is accomplished by cycling the punch shaft which in turn shifts the odd-even column counter to its opposite state and also brings in the escape magnet 75 to advance the card only if the spacing operation is initiated from an even numbered card column.

It should be pointed out that a parity field may be punched with either alpha or numeric informations, and it normally will contain numeric data since parity is accomplished only under program card control when the keyboard is normally in the numeral shift condition, as heretofore described. Should it be desired to program the operation so as to have the parity field contain only alpha data, this may be accomplished by preparing the program card with alpha shift control perforations, which will place the keyboard in the alpha shift condition, throughout all columns of the parity field except the last two columns, of the field. In the last two columns the alpha shift control perforation would not be required and would be ineffective since punching in the last two columns is under control of the parity counters.

*Alternative embodiment*

FIGS. 8a, b, c, d, e, and f when arranged according to the plan of FIG. 8g comprise the wiring diagram for another or second embodiment of the invention. This second embodiment of the invention makes use of the mechanical features of the machine of the aforesaid Patent No. 2,647,581 except for minor mechanical modifications therein, which will be pointed out hereinafter, in order to enable the objects of the invention to be attained. In the wiring diagram of this second embodiment all relays are designated with a reference numeral preceded by the letter R, and the contacts operated by the respective relays are designated by numbers prefixed by a dash and the associated relay designation. In the certain instances some of the relays have separate windings for picking and holding, respectively, and in these instances the respective winding is indicated by P or H. The function of each relay is also indicated, sometimes in abbreviated form, on the diagram. In some instances, the relay function is performed by two commercial or standard wire type relays in series in order to provide a sufficient number of contacts and thereby avoiding the necessity for providing a single specially designed relay for a particular function.

The tubes shown in the circuit are prefixed by the letter T. The electrical circuit breaker cams associated with the card feed shaft are prefixed by the letters CFC and those associated with the punch shaft are prefixed by the letters PC. In this second embodiment of the invention, the same keyboard layout is employed as in the first embodiment, and, in the circuit diagram, the contacts operated directly by the keys of the keyboard are appropriately labeled.

Generally stated, the portion of the circuit shown in FIG. 8a shows, in addition to a power supply, the circuits involved in card feeding operations and also an odd-even column counter, comprising relays R103, R107 and R115, which is normally stepped each punching cycle by a counter input or step pulse resulting from closure contacts operated by punch cam PC103. The power supply provides through a bridge rectifier a positive potential of approximately 160 volts indicated B+ on the diagram, the opposite terminal of the rectifier being at "0" volts and indicated as B— in the wiring diagram. The power supply also provides a transformer for low voltage alternating current which is employed for heating tube filaments and illuminating the column indicator dial lamps 303a, 303b corresponding to lamps 18a, 18b heretofore described, the transformer also providing through a diode a negative 50 volt potential indicated on the diagram as —50 v. and employed as a grid bias potential for the control tubes in the circuit.

Figure 8B:
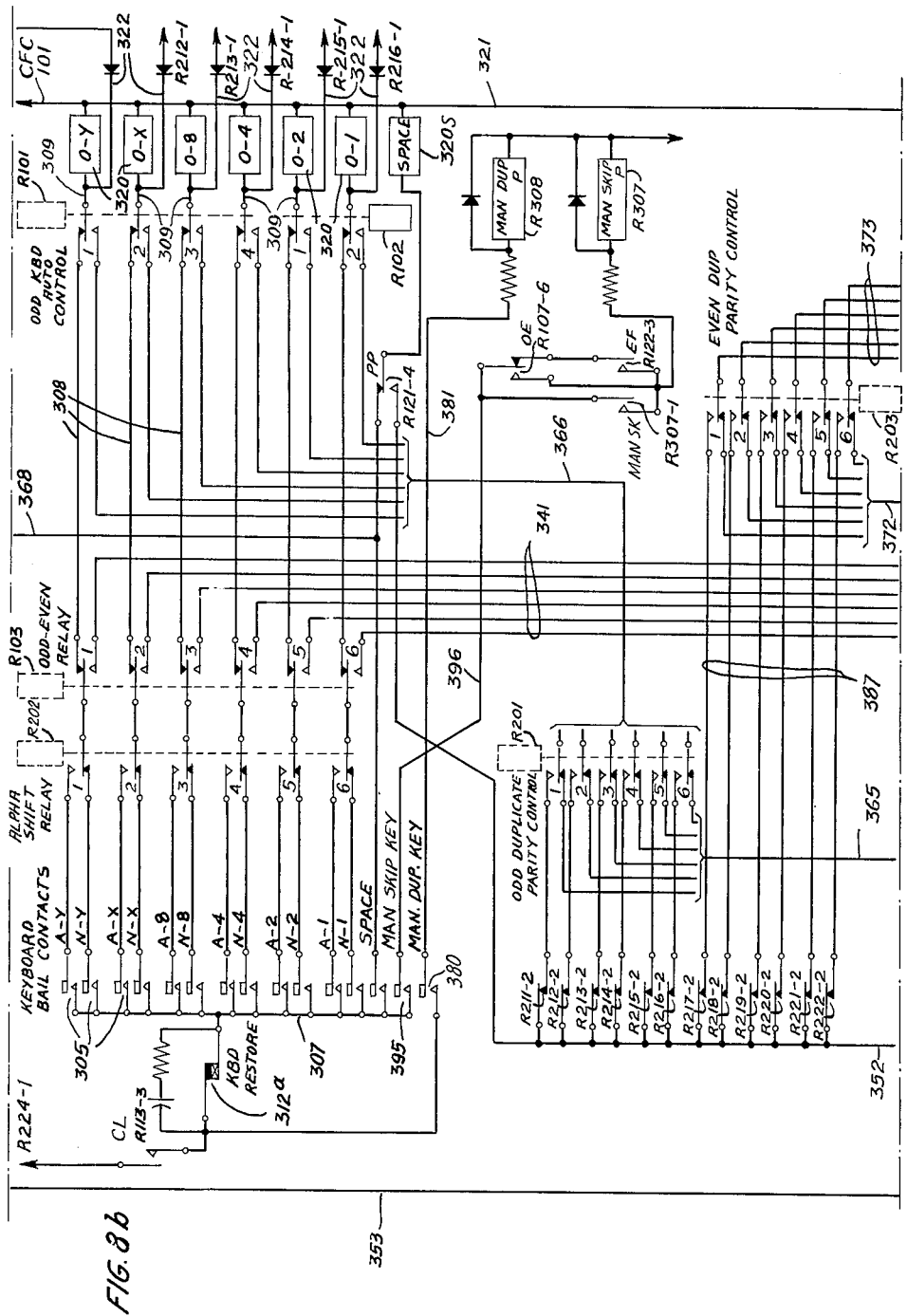

The portion of the circuit shown in FIGS. 8b and 8c, generally stated, show various inputs to the interposer magnets which include, as shown in FIG. 8b, keyboard permutation bail contacts 305 of which, as in said heretofore first described embodiment of the invention, there are six contacts effective when the keyboard is in the numeral shift condition and six contacts effective when the keyboard is in the alpha shift condition. In FIG. 8b are also shown contacts operated by relays R211 through R222 which provide input circuits to the interposer magnets when reading out the row parity counters in automatic parity punching operations as will be described hereinafter.

The contacts 306 shown in FIG. 8c are the contacts operated by the reading pins at the reading station of the machine which include six for the odd columns and six for the even columns. In the present embodiment of the invention, due to the nature of the respective registrations of the cards at the punch station and at the read station, as will be hereinafter more fully pointed out, a memory is provided for the data sensed by the even column pins, the memory comprising six relays R205 through R210. The read-out of the memory, when called for, is through the "2" contacts of relays R205 through R210, providing further input to the interposer magnets.

Figure 8D:
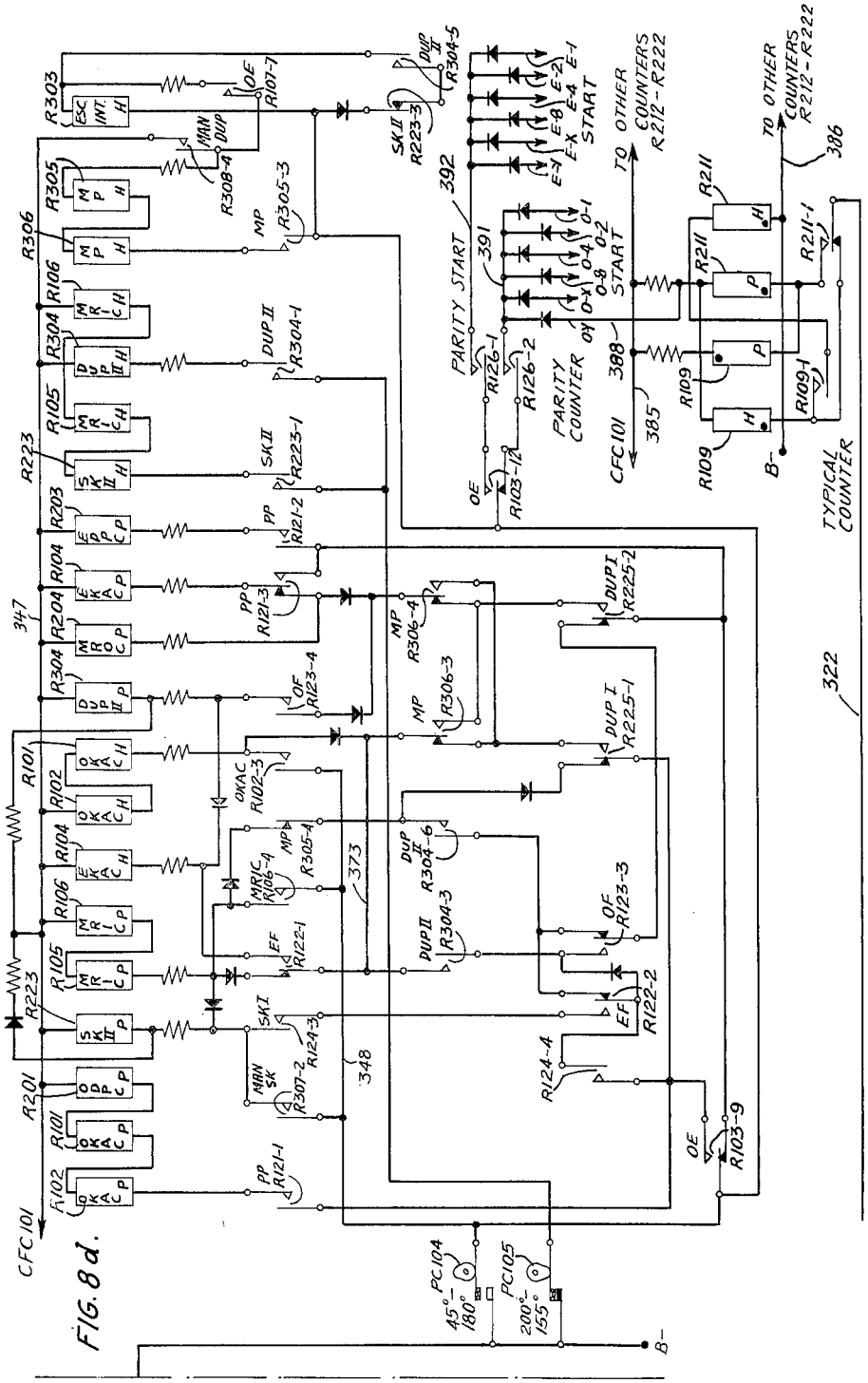

The portion of the circuit shown in FIG. 8d includes a number of control relays which are gated by the timing cams PC104 and PC105. These relays include the Odd Column Keyboard Automatic Control (OKAC) relays R102, R101, the Odd Column Dup-Parity Control (ODPC) relay R201, the Skip 2 relay R233, the Memory Read In Control (MRIC) relays R105, R106, the Even Column Keyboard Automatic Control (EKAC) relay 104, the Dup 2 relay R304, the Memory Read Out Control (MROC) relay R204, the Even Column Dup-parity Control relay (EDPC) R203, the hold windings of the Multi-punch relays R306, R305, and the hold winding of the Escape Interlock relay R303. FIG. 8d also includes a typical binary counter employed for parity checking purposes and comprising relays R109 and R211, it being understood that twelve such counters are employed in the circuit, each being associated with a respective one of the interposer magnets so as to provide a row parity check of each of the six index positions of the even card columns and the six index positions of the odd card columns.

Figure 8E:
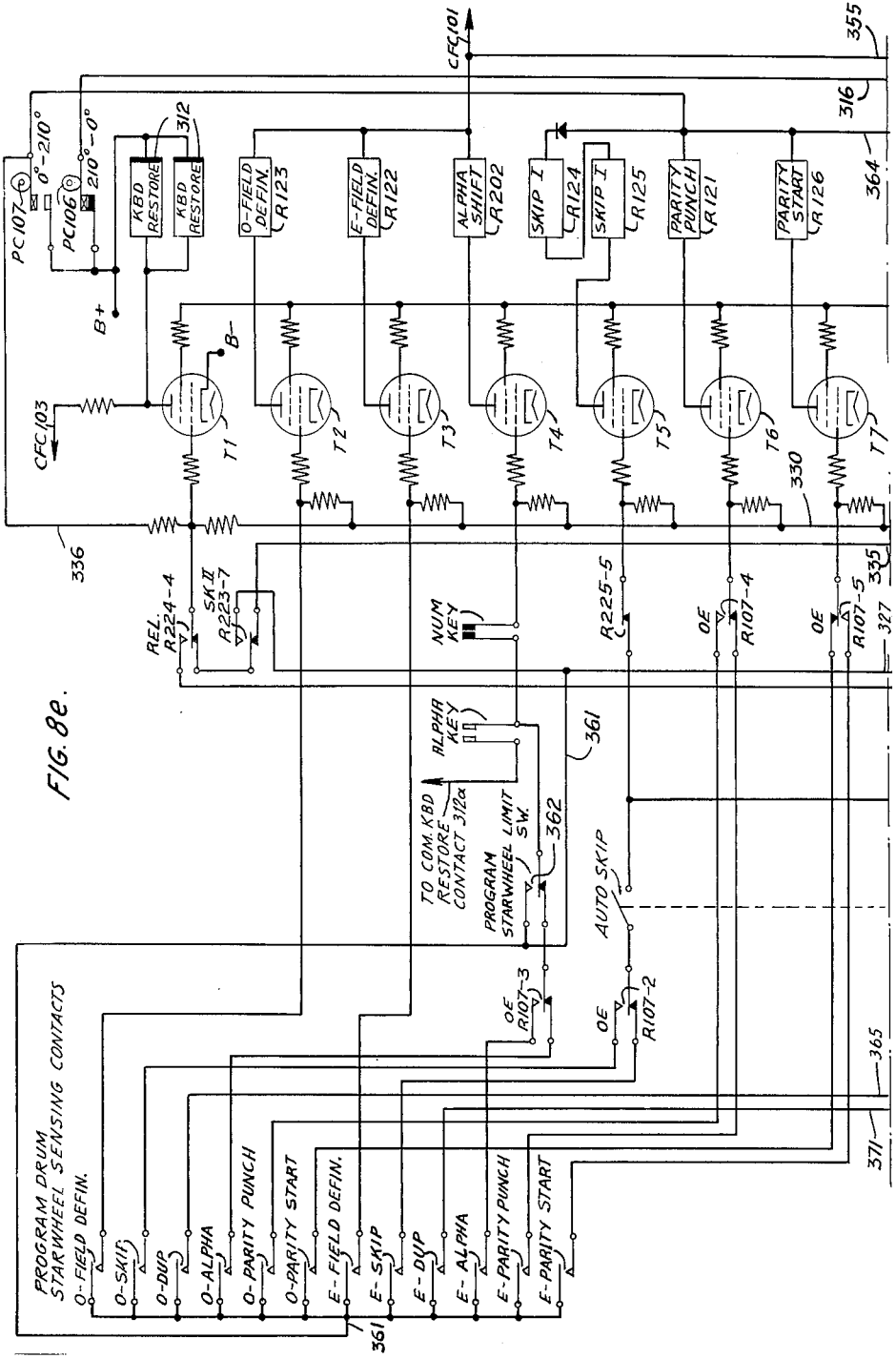
Figure 8F:
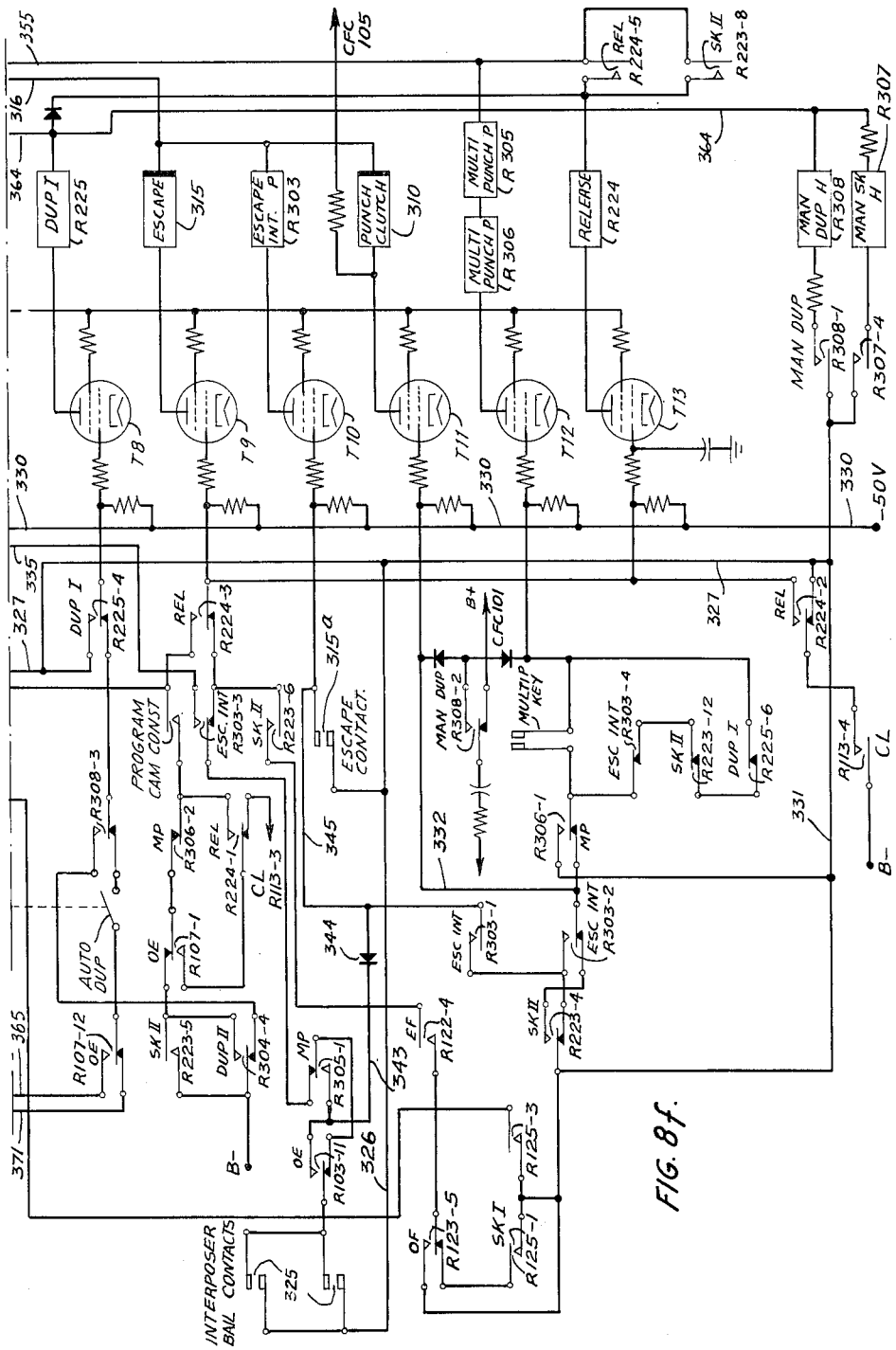

The portion of the circuit shown in FIGS. 8e, 8f includes a number of control tubes T1 through T13 which in this instance are 25L6 type tubes, the plate circuits of which tubes contain control relays or magnets which are brought into operation for various machine functions as are indicated. FIG. 8e includes the contacts which are operated by the program drum star wheel sensing members which close to initiate and control automatic machine functions under program card control. FIG. 8f includes circuits which are effective for initiating each punching cycle and exercising appropriate control over the punch clutch magnet 310 and the escape magnet 315.

Before proceeding further with a more detailed description of the circuit diagram, it should be clearly understood that there is a distinction between the embodiment of the invention now being described and the first embodiment heretofore described with respect to the mechanical modifications of the basic machine of the aforesaid Patent Number 2,647,481 for effecting registration of the cards at the punch station and reading stations, respectively. In the present embodiment of the invention now being described, as represented by circuit diagram of FIGS. 8a through 8f, the card pusher arm mechanism has not been mechanically modified so that it operates (as described in the aforesaid patent) at the completion of a card feeding cycle, to register the card one column in advance of the first card column, referred to in said patent as the zero card column. The card being registered at the reader station is registered, as in the aforementioned patent, with the first column (first two columns in the instant case i.e., an odd and even column) at the reading line. This relative disposition of the cards in the reader and punch stations continues as long as the cards are advanced through the respective stations by the escapement mechanism so that while columns "1" and "2" are being punched at the punch station, columns "3" and "4" of the preceding card are being read at the reading station, etc. as the cards are advanced through the respective stations. In the instant embodiment of the invention, a modification has been made in the registration of the program drum star wheel sensing members, some of which are longer to the extent of one column width than others for reasons which will hereinafter be apparent. The arrangement is such that all of the star wheel support arms associated with odd columns are of normal length, so as to provide the odd column program drum reading line in column for column registration with the card at the reader station, with one exception. At the "1" index position of an odd column of the program card, for initiating a parity start operation, the star wheel support arm is longer than the normal star wheel supporting arms to place this star wheel in column for column registration with the card at the punching station. The supporting arms, with one exception, for the star wheels associated with even columns are all longer by one column than the normal star wheel support arms so as to place the associated star wheels in column for column registration with the card at the punch station. The support arm of the even column star wheel associated with the "Y" index position for field definition control purposes is of normal length so as to place its associated star wheel in column for column registration with the card at the reader station.

Control of card feeding operations is essentially the same as heretofore described in connection with the first embodiment of the invention, which is also similar to that described in the aforementioned patent, so that only brief description thereof is deemed necessary at this time. With reference to FIG. 8a, card feed is initiated by depressing the card feed key on the keyboard whose contacts, if the Card Lever relay R113 is nonenergized, complete a circuit from B—, through the normally closed contacts R113-2, to the Card Feed clutch 311 and thence to B+ potential source. Energizing the card feed clutch causes a one cycle operation of the card feed shaft, the clutch latching up at zero degrees of the cycle. The card feed shaft drives the mechanism the same as heretofore described in conjunction with the first embodiment of the invention for activating the card pickers and card feed rolls so as to remove a card from the hopper, and if there are cards in the feed bed for advancing them into registration with the punch station and read station, respectively, and also ejecting a card into the eject hopper. The first circuit established by operation of the card feed shaft is that controlled by card feed cams CFC103 (top center, FIG. 8a) which at 20° of the card feed cycle applies B— potential to the plate circuit of tube T1, see FIG. 8e, to energize the Keyboard Restore magnets 312 which are in the plate circuit of tube T1 and are connected directly to B+ potential. The Keyboard Restore magnets restore the keyboard, in the manner heretofore described in conjunction with the first embodiment of the invention, and in the present instance also operate their contacts 312a, see FIG. 8b, to interrupt the circuit feeding B— potential to the keyboard permutation bail contacts 305. The Keyboard Restore magnets are held energized until 330° of the card feed cycle. At 40° of the card feed cycle, the card feed cam CFC101 (upper right, FIG. 8a) opens its contacts for the main purpose of clearing the odd-even column counter and the several relay binary counters used for parity counting. At 70° of the card feed cycle, cam CFC104 closes its contacts to apply B— potential to the card lever switch. If a card was in the punch bed when the card feed cycle was initiated, the Card Lever relay R113 would pick up at this time via the card lever switch. The contacts operated by CFC104 also apply B— potential through a diode and Odd-Even Column Counter relay contacts R103-8 to the Odd-Even Column Counter contacts R115-1. At this period of the card feed cycle, the relays R103, R107 and R115 are all deenergized due to the opening of the contacts controlled by cam CFC101 which removes B+ potential from the relays. These three relays comprise the Odd-Even Column Counter and operate in the same manner as the Odd-Even Column Counter of the first embodiment of the invention heretofore described, relay R115 being a mercury wetted contact relay corresponding to relay K15 heretofore described and the relays R103, R107 corresponding in function to the relay K5 heretofore described. The relays R103, R107 when deenergized condition the machine for odd column punching, and when energized condition the machine for even column punching. At 135° of the card feed cycle, the contacts operated by the cam CFC101 close to apply B+ potential to the counter relays at which time the relay R115 energizes and transfers its make before break contacts R115-1 to complete a hold circuit directly to B— potential. The counter relays R103, R107 do not energize at this time since B— potential is being applied around the relays to short them out through contacts R103-7. At 150° of the cycle, the contacts operated by the cam CFC104 open to interrupt the shorting circuit around the relays R103, R107 thereby enabling the relays to energize and switch the counter to the even column state. At 300° of the card feed cycle, which is after the cards have been registered at the punch and read stations, respectively, the contacts operated by the cam CFC105 close to complete a circuit from B— to the Punch Clutch magnet 310, see FIG. 8f, which magnet is in the plate circuit of tube T11 and is connected to B+ potential over a common plate lead 316 and through contacts operated by the punch shaft cam PC106 (FIG. 8e). Energizing the punch clutch causes a cycling of the punch shaft for the purpose of reading, into memory, the data in column two of the card at the read station, so that this data will not be lost in instances where it may be desired to start a duplicating operation beginning with even column number two. The reason why a punch cycle is initiated as a function of a card feed cycle, with the machine in the even column condition, will become more apparent as the description proceeds and results from the non-correspondence of columnar registration between the cards at the punching station and at the reading station, respectively. During the course of the punching cycle, the cam PC103, see FIG. 8a, closes its contacts to complete a stepping pulse to the Odd-Even Column Counter during the period 105° to 165° of the punch cycle. This circuit can be traced from B— potential through the cam contacts, the normally closed contacts R304-2 of the Dup 2 relay, the normally closed contacts 223-2 of the Skip 2 relay, normally closed contacts R124-2 of the Skip 1 relay, the contacts R305-2 of the Multi-punch relay and thence to the counter relay contacts R115-1. Since, at this time, the counter is in the even column state, this pulse has the effect of dropping out the counter control relay R115 to break the hold circuit through said contacts directly to B—, and at the termination of the step pulse at 165° of the punch cycle the counter relays R103, R107 also drop out so as to effectively switch the counter to the odd column condition. It should here be noted that although the second pulse to the Odd-Even Column Counter through the punch shaft cams PC103 terminates at 165° of the punch cycle, the counter does not actually change state until about 210° of the punch cycle due to the pickup time of the counter relays R103, R107 which are controlled by the resistors in series with the relays.

At 330° of the card feed cycle, the cam CFC103 opens its contacts to deenergize the Keyboard Restore magnets 312 so that as a feed cycle is completed, with the card feed latching up at zero degrees, the keyboard will be free for manual operation and the Odd-Even Column Counter will be in the odd column condition. When the cycle just described concerns the first card to enter the machine, then the Card Lever relay R113 would not be energized at the conclusion of that cycle, the second card feeding cycle bringing in the Card Lever relay and registering the first card at the punch station all as heretofore described in conjunction with the first embodiment of the invention.

Depression of the Register key causes a card feed cycle which is the same as the cycle just described and performs the same functions except that the picker knives are restricted so as to prevent a new card from entering the feed bed from the card supply hopper. As seen in FIG. 8a, the Register key contacts are in parallel with the Feed key contacts and complete a circuit under the same condition to a Card Feed Latch magnet 313 which, as heretofore described, when energized disables the card picker mechanism while at the same time closing its contacts 313a to complete a circuit for energizing the Card Feed Clutch magnet 311 thereby initiating a card feed cycle but preventing a card from feeding out of the card hopper.

Assuming now that a card has been fed and registered at the punch station, data may be punched into the card under control of the keyboard in the following manner. It will first be recalled that at this point the Odd-Even Column Counter is in the odd column state and that the card at the punch station is registered therein one column before card column one i.e., at the "0" card column. The movement of the card from this point on until the completion of the punching is under control of the card escapement mechanism. Upon depression of a data key, a combination of the contacts 305 (upper left FIG. 8b) are made in the keyboard as determined by the coding of the keyboard permutation bails. The keyboard permutation bail contacts are connected to a common lead 307 which is supplied with B— potential through the keyboard restore contacts 312a, contact R113-3 now closed of the Card Lever relay and a normally closed contact of the card release relay R224, i.e. contacts R224-1, see FIG. 8f. The twelve keyboard permutation bail contacts 305 are connected to the contacts of the Alpha-Shift relay R202 which when in its normal deenergized state places the output of the keyboard in the numeral shift condition and when energized places the keyboard in the alpha shift condition. The relay R202 when deenergized connects the numeral keyboard bail contacts 305 of which there are six, since we are encoding into a six bit code, to the transfer contacts of the Odd-Even Column Counter relay R103. When the Alpha Shift relay is energized to place the keyboard in the alpha shift condition, it switches to connect the alpha keyboard permutation bail contacts 305 with the transfer contact of the Odd-Even Column Counter relay R103. When relay R103 is in its normal unenergized odd column state, circuits established by the keyboard permutation contacts 305 are continued over lines 308 to the contacts of the Odd Keyboard Auto Control relays R101 and R102 which, when in the normal deenergized state, continue the circuits over six lines 309 to the six odd interposer magnets 320. The circuits established by the keyboard permutation bail contacts 305 are completed through the interposer magnets 320 by a common lead 321 connected to B+ potential through the contacts operated by card feed cam CFC101. At this point it might be mentioned that, at the same time, parallel circuits are established from each lead 309 over a line 322 which constitutes the input line to an associated parity counter, to be hereinafter more fully described. Hence, the same electrical signals which initiate a punching cycle from the keyboard are used for counting the row parity condition within a selected card field. Parity is counted regardless of whether or not it is intended to punch a parity bit into the card.

Figure 7B:
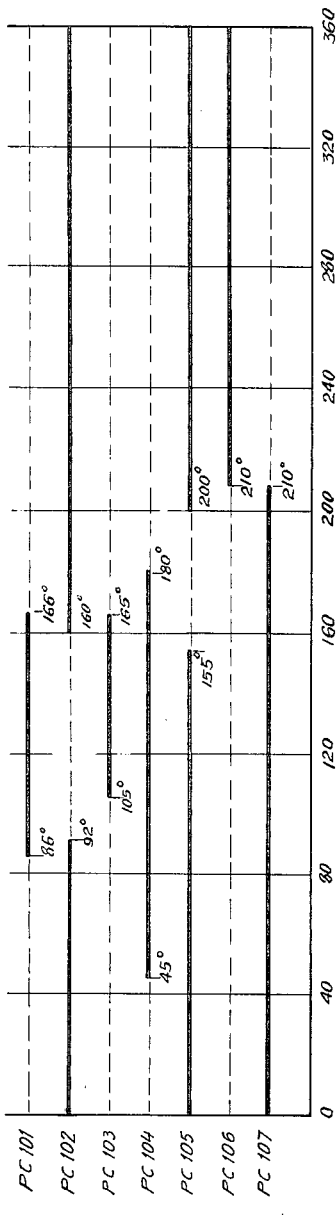
Figure 7C:
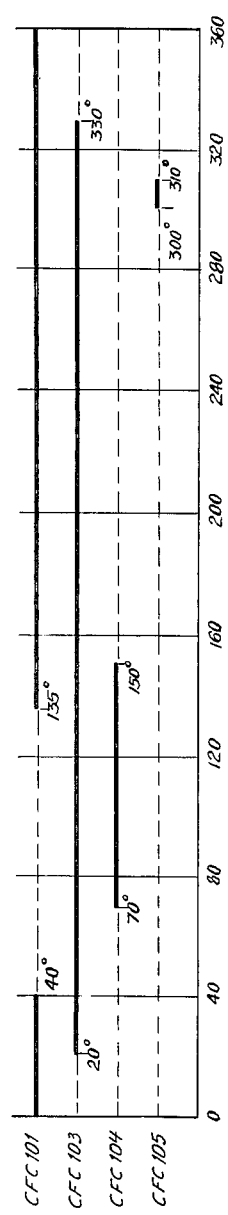

As heretofore described in relation to the first embodiment of the invention, energization of any one of the interposer magnets releases its interposer which latches onto the punch bail and in so doing rocks an interposer bail to close interposer bail contacts 325, see FIG. 8f, which are connected to B— potential over a line 326, connecting with a line 327 and thence through the normally closed contacts R224-2 of the Release relay and contacts R113-4 of the Card Lever relay which are in turn directly tied to the B— terminal of the power supply. Since we are at the moment discussing the punching of the first column of the card, which is an odd column, and with the odd-even column counter being in the odd state as heretofore explained, the closure of the interposer bail contacts 325 carries B— potential to the normally closed contacts R103-11 of the counter relay, thence to normally closed contacts R305-1 of the Multi-punch relay, to contacts R303-3 of the Escape Interlock relay and thence to contacts R224-3 of the release relay, thereby applying the B— potential to the grid of tube T9. The grids of all tubes T1 through T13 are held at −50 volt grid bias through a common bias lead 330 and a pair of grid bias resistors of 56K and 10K, respectively, so that when B− or "0" volts potential is applied to the junction of said resistors the negative grid bias is removed, enabling the tube to fire. The plate circuit of tube T9 includes the Escape magnet 315 and is connected to B+ potential over the common lead 316 and the contacts operated by the cam PC106 which make at 210° of the punch cycle and break at zero degrees of the punch cycle. The punch clutch latches up at 345° of the punch cycle so that at this time the plate circuit of tube T9 is connected to B+, enabling the tube to fire and bring in the Escape magnet 315. Energization of the escape magnet causes the card to advance, as heretofore described in connection with the first embodiment of the invention, and at the same time closes the Escape magnet contacts 315a which applies B− potential to the control grid of tube T10 to fire the tube and bring in the Escape Interlock relay R303. The plate circuit of the tube T10 is in parallel with that of tube T9 enabling the tube T10 to fire and bring in the escape interlock at this time. The energization of the Escape Interlock relay R303, through transfer of its contacts R303-3, brakes the B− circuit to the Escape magnet control tube T9 to deenergize the Escape magnet 315 and stop the escapement travel of the card. The time between the energization of the Escape magnet 315 and the Escape Interlock relay R303 is such as to permit the card to advance a distance equivalent to the width of one card column. The Escape Interlock relay R303 when energized also, through its contacts R303-2, applies B− potential to the control grid of tube T11 to energize the Punch Clutch magnet 310. This circuit can be traced from the B− potential source through contacts R113-4 of the Card Lever relay, contacts R224-2 of the Release relay over line 331 to contacts R223-4 of the Skip 2 relay and contacts R303-2, now transferred, of the Escape Interlock relay and thence over a lead 332 to the control grid of the tube T11, the plate circuit of which includes the Punch Clutch magnet 310 and runs to B+ potential over the common plate lead 316. Energizing of the Punch Clutch magnet commences the mechanical punching of the holes in the card in accordance with whichever interposer magnet 320 or combinations of magnets was selected as a result of the keyboard operation. In addition, energization of the Punch Clutch magnet starts the electrical timing of the punch clutch mechanism. The timing of the various circuit breakers associated with the punch shaft is shown in the timing chart of FIG. 7b. Returning now to the Escape Interlock contacts R303-3, it will be seen that, when the contacts tranferred, they not only broke the circuit to the Escape Magnet tube T9 but also completed a circuit from B− potential to the control grid of tube T1 by way of a line 335, contacts R223-7 of the Skip 2 relay and contacts R224-4 of the Release relay. The plate circuit of tube T1 includes the Keyboard Restore magnets 312 and is connected directly to B+ potential. The Keyboard Restore magnets remain energized, after the Escape Interlock relay drops out at zero degrees of the punch cycle, through a circuit over line 336 running to the control grid of tube T1 from the contacts operated by the cam PC107 which make at zero degrees of the punch cycle and apply B+ potential through a suitable resistor to the control grid of tube T1 thereby maintaining the Keyboard Restore magnets energized until the contacts of the cam PC107 open at 210° of the punch cycle. During the course of a punch cycle, the punches physically enter the card at about 90° of the cycle and are physically retracted from the card at approximately 175° of the cycle. In the instant embodiment of the invention, as distinguished from the earlier described embodiment of the invention, the timing of the reader pins is in synchronism with the punches, i.e. the reader contacts 306, see FIG. 8c, make at the same period of the punch cycle.

At 105° of the punch cycle, the contacts operated by the cam PC103 make to apply a stepping pulse from B− potential to the Odd-Even Column Counter relay over a circuit path which has heretofore been described in conjunction with the card feed cycle. At 165° of the punch cycle, the stepping pulse to the Odd-Even Column Counter is removed by opening of the cam PC103 contacts, whereupon the counter (which had been in the odd column state at the start of the first punching cycle) switches its state to the even column condition at about 210° of the first punch cycle.

To briefly review the sequence of operations up to this point, resulting from depression of a key of the keyboard, it will be seen that upon energization of one or more of the odd interposer magnets 320, since the odd-even column counter was in the odd state in preparation for punching column number "1," the resultant closing of the interposer bail contacts 325 first caused escapement of the card to place columns "1" and "2" of the card in register with the punches. Upon escaping, the Escape Interlock relay R303 was energized to properly limit the extent of the escapement and in turn energize the Punch Clutch magnet 310 and also the Keyboard Restore magnets 312. Energizing of the Punch Clutch magnet caused the cycling of the punch shaft to drive the selected punches throught the card, in column "1" thereof, caused the Keyboard Restore magnets to remain energized until about 210° of the punch cycle and in addition stepped the Odd-Even Column Counter to cause it to switch to the even column condition also at about 210° of the punch cycle.

Upon completion of the first punching cycle, the machine is now in condition for punching column "2," an even column. It will be remembered that, for the punching of the odd column number "1," at the time the key was depressed column "1" of the card was not in line with the punches but first had to escape a distance equivalent to the width of one column to bring column "1" into line with the punches prior to energization of the Punch Clutch magnet. For the punching of an even column, it will be noted that the card column is already in line with the punches so that no escapement travel of the card is necessary prior to the energization of the Punch Clutch magnet.

Upon depressing a key of the keyboard for punching column number "2," a selected keyboard bail contact 305 or combination of contacts 305 make in accordance with coding for the particular character to complete corresponding circuits to the contacts of the Alpha Shift relay R202 and thence to the contacts of the Odd-Even Column Counter relay R103 which at this time is in the even column condition. Accordingly, the six output circuits of the keyboard are transferred by contacts R103-1 through R103-6 and continue over lines 341 to contacts of the Even Keyboard Auto Control relay R104 which when deenergized continues the circuits through its normally closed contacts to the six even column interposer magnets 320, the circuits being completed to B+ potential over the common lead 321. At the same time, parallel circuits are established over lines 342, from the contacts of relay R104, which carry step or input pulses to the Parity Counters associated with the even card columns. Energization of any one of the even column interposer magnets will release its associated interposer to latch on to the punch bail and which at the same time rocks the interposer bail to close the bail contacts 325 thereby applying B− potential existing at the bail contacts, as heretofore described in conjunction with the first punching cycle, to the contacts R103-11, now transferred, of the Odd-Even Column Counter relay and thence over a line 343 and through a diode 344 to a lead 345 running to the control grid of tube T10 which fires to energize the Escape Interlock relay R303. Energization of the Escape Interlock relay R303, as in the case of an odd column punch cycle, causes energization of the Punch Clutch magnet 310 through transfer of the Escape Interlock contacts R303–2 to initiate a cycle of the punch shaft for punching the even card column. It will be noted at this point that the only difference between an odd column punch cycle and an even column punch cycle is that the Escape Magnet 315 is bypassed in an even column punching cycle.

Due to the nature of manually controlled duplicating operations, it is necessary that each even column punch cycle read the even column of the card at the read station into a memory. For purposes of explaining memory read-in it will be assumed that at this time there is a card advancing through the read station, which card at the read station is one step further advanced with respect to the read station than the card at the punch station so that while the card at the punch station is punching column "2" the reading pins at the read station will be reading column "4." The memory consists of six relays R205 through R210, see FIG. 8c. The read-in is accomplished by energizing the Memory Read-In Control relays R105, R106. With reference now to FIG. 8d, at 45° of the punch cycle for an even column, the contacts operated by PC104 establish B— potential through the normally open contacts R103–9, since the counter is now in an even column condition, to normally closed contacts R225–1, through a diode to contacts R305–4 and thence through another diode to relays R105, R106 connected in series to a common lead 347 running to B+ potential through the contacts of cam CFC101. Upon energization, the relays are held through a circuit established by contacts R106–4 completing a hold circuit over line 348 with the contacts operated by PC104 to effectively hold the relays until 180° of the punch cycle. The Memory Read-In Control relays R105, R106, upon energizing, transfer their contacts R105–1 through R105–4 and R106–1 (FIG. 8c), R106–2 so as to connect the reading pin contacts 306 for the even columns with their associated memory relays R205–R210 over memory input lines 351. The reader contacts 306 are connected to B— through a common lead 352 running to contacts operated by the cam PC101 and thence over a line 353 to B— potential via Card Lever relay contacts R113–2, see FIG. 8a. The contacts operated by the cam PC101 makes at 86° and break at 166° of the punch cycle. Accordingly, during the period from 86° to 166° of the punch cycle for an even card column the memory relays R205–R210 will be energized in accordance with the punching in the even card column then registered at the reader station, the memory magnets being tied directly to B+. The "1" contacts of the memory relays establish holding circuits to B— potential through the contacts operated by the cam PC102 and thence to the B— lead 353. The "2" contacts of the memory relays R205–R210 are connected to the common lead 352 and complete circuits through the contacts to effect the read-out of the memory. Contacts R106–3 of the Memory Read-Out Control relay bypass the contacts operated by PC102 so as to hold the memory relays energized in odd column punch cycles. Energization of the Memory Read-In Control relay R106 opens its contacts R106–3 at 45° of the even column punch cycle. At 92° of the cycle the contacts of the cam PC102 open to drop the information stored in memory from a preceding even column punch cycle whereupon the memory relays remain energized in accordance with the column being read in the current cycle by circuits through the contacts of the cam PC101. At 160° of the punch cycle, the contacts operated by the cam PC102 makes so as to establish holding circuits for the memory relays through their "1" contacts prior to the time that the contacts operated by the cam PC101 open at 166° of the cycle. At approximately 180° of the punch cycle, contacts R106–3 close to hold the information read into the memory relays throughout the following odd column punch cycle, i.e. throughout the period the cam PC102 contacts are open in the following odd column punch cycle. It will be noted that the memory read-in circuits are independent of character punching and that the memory read-in occurs in each even column keyboard controlled punch cycle.

Returning now to other circuits operating in an even column punch cycle, at 105° of the cycle the cam PC103 contacts close to provide a pulse to the Odd-Even Column Counter through the same circuit path heretofore traced in connection with the card feed cycle description, and since the counter at this time is in the even column condition the pulse will have the effect of dropping out the counter control relay R115 so that at the termination of the pulse at 165° of the cycle the counter relays R103, R107 will also drop out thereby switching the state of the counter to the odd column condition at about 210° of the punch cycle.

To briefly review an even column punching operation under keyboard control, it will be recalled that closing of the interposer bail contacts 325 as a result of keyboard operation brought in the Escape Interlock relay R303 in a circuit by-passing the Escape magnet and in turn energizing the Punch Clutch magnet 310 and the Keyboard Restore magnets 312. Energizing of the Punch Clutch magnet caused the cycling of the punch shaft to punch in the even card column. In addition it electrically caused a read-in of the even card column then at the read station into the even column memory. At about 210° of the punch cycle of the Odd-Even Column Counter was stepped from the even to the odd column condition, and at 210° of the cycle the Keyboard Restore magnets de-energized to unlock the keyboard in preparation for the initiation of the next keyboard controlled punch cycle.

The Multi-punch key, as heretofore described in conjunction with the first embodiment of the invention, is utilized to enable punching of more than one code in a single card column. Depression of the Multi-punch key closes its contacts, see FIG. 8, whose function is to establish a circuit to the Multi-punch control tube T12 in parallel with the circuit to the punch clutch control tube T11. As heretofore described, the punch clutch control tube is fired to start a punch cycle by a circuit over grid lead 332 established by the transfer of the Escape Interlock contacts R303–2. Closure of the Multi-punch key contacts completes a circuit from the line 332 through the contacts R306–1 of the Multi-punch relay R306 to the control grid of tube T12 which will cause the tube T12 to fire and bring in the Multi-punch relays R305, R306 over a plate circuit which returns to B+ potential through the contacts of the cam CFC101. The contacts R306–1 provide a holding circuit for the Multi-punch relays as long as the Multi-punch key is held depressed, said holding circuit running from the normally B— lead 331 to the control grid of tube T12. The picking of the Multi-punch relays effectively inhibits card escapement and stepping of the Odd-Even Column Counter during successive punch cycles. It will be noted however that depression of the Multi-punch key permits escapement in the first Multi-punch cycle if the column to be multiple punched happens to be an odd column. The inhibition of escapement is accomplished by the Multi-punch relay contacts R305–1 which switch the circuit of the interposer bail contacts 325 from the input line for the Escape Magnet control tube T9 to the input line 345 to the grid of the Escape Interlock relay control tube T10. This results in energizing the Escape Interlock relay thereby causing an immediate punch cycle without first causing card escapement. However, escapement in the first cycle would be permitted if an odd column is involved because the Multi-punch relays R305, R306 will not be picked until the Escape Interlock relay R303 is picked to also bring in the Punch Clutch magnet 310. The contacts R305–2, see FIG. 8a, of the Multi-punch relays, interrupt the stepping pulse to the Odd-Even Column Counter from punch shaft cam PC103 so as to prevent the counter from changing state as long as the Multi-punch relays are energized. It will be noted that there is a parallel hold circuit for the Multi-punch relays around the Multi-punch key contacts including Escape Interlock relay contacts R303-4, Skip 2 relay contacts R223-12 and Dup 1 relay contacts R225-6. In the last punching operation in a series of multiple punching operations, after the Multi-punch key is released, the picking of the Escape Interlock relay R303 will open its contacts R303-4 to break the parallel hold circuit to Multi-punch relay control tube T12 so that, in this last punching cycle of a multiple punching operation, the Multi-punch relays will drop out whereby, via contacts R305-2, see FIG. 8a, the stepping pulse to the Odd-Even Column Counter will be effective for switching the counter to its opposite state.

The keyboard of the machine is shifted from upper to lower case by means of the Alpha Shift relay R202. This relay, as seen in FIG. 8b, has six operating contacts which switch from one set of permutation bail contacts 305 effective in numeral shift conditions to another set of bail contacts which are effective in the Alpha Shift condition. Alpha Shift relay 202 may be controlled by the Alpha Shift and Numeral Shift key contacts which, as seen in FIG. 8e, are in the grid circuit of tube T4 which controls the relay R202. The Alpha Shift contacts are connected to B— by way of the keyboard restore contacts 312a, and when the Alpha Shift key contacts are closed the B— potential is applied to the grid of tube T4 to energize the Alpha Shift relay R202 via the normally closed contacts of the Numeral Shift key. Alpha Shift may also be automatically initiated under program card control, as in the heretofore described first embodiment of the invention, by perforations in the appropriate index position of each column of the program card in which Alpha Shift is desired. It will of course be understood that in this second embodiment of the invention now being described, the same type of program card is used as in the first embodiment with the same index positions being employed for initiating or controlling the same machine function. The contacts closed by the program sensing star wheels are shown in FIG. 8e and are appropriately labeled to identify the function each contact performs, the six upper contacts being associated with odd columns and the six lower contacts being associated with or controlled by the even columns of the program card. The program sensing contacts are connected to B— potential over a line 361 which is common to all of the contacts and which runs to a connection with line 327 which as heretofore described connects to B— potential through contacts 113-4 of the Card Lever relay. As heretofore described in connection with the first embodiment of the invention, a star wheel limit switch is associated with the star wheel sensing members so that when the machine is not under program control and the star wheel sensing members are raised to an ineffective position, the limit switch 362 will transfer to complete a circuit through its normally open contacts between the line 361 and the control grid of tube T4 so as to energize the Alpha Shift relay R202 to place the keyboard in the alpha shift condition. Under these conditions, when the machine is thus placed in the alpha shift condition, operation of the Numeral Shift key will open its associated normally closed contacts to break the grid circuit to tube T4 to thereby place the keyboard in the numeral shift condition. When the machine is operating under program control with the star wheels lowered to their effective sensing position for reading the program card, the limit switch 362 completes the grid circuit through its normally closed contacts from the Odd-Even Column Counter contacts R107-3 which establish the grid circuit from the Alpha Shift star wheel sensing contacts for either an odd column or an even column. Thus, when the machine is operating under program control, the keyboard is normally in the numeral shift condition, and any column of the program card in which an alpha shift control performation is sensed will bring in the Alpha Shift relay R202 prior to operation of the keyboard key for initiating a punching cycle for the corresponding column of the card at the punch station.

Automatic functions

In order to more clearly understand automatic functions of the machine certain basic principles which apply to the disclosed circuit are as follows:

(A) During an even column punch cycle, the even column registered at the read station is read from the reader pin contacts into the even column memory. This read-in is necessary in order to retain the even character, since the following punch cycle will commence with a card escapement. If the memory were not utilized under manual key board control, it would not be possible for duplication to commence with an even column, since the even column to be duplicated would have already been moved beyond the read station.

(B) All automatic functions commence during the previous punch cycle. This is accomplished by means of the Odd-even Column Counter contacts in the grid circuits of the automatic function control tubes in conjunction with the punch shaft cam PC107 which make the plate circuits of the automatic function control tubes at zero degrees of the punch cycle.

(C) In a high-speed skip operation, it is necessary to determine or sense the skip start signal and initiate a punch cycle which will cause the read-in to memory of the appropriate even column character such that the condition of the basic principle (A) stated above is met. During card escapement in an automatic skip operation the punch clutch does not operate. Hence, the Odd-even Column Counter does not maintain a column count. The binary Odd-even Column Counter is adjusted during the last punch cycle of the operation. During the skip operation, the counter is maintained in the odd column condition.

(D) There are two modes of duplication. In the high-speed duplicate mode, the Odd-even Column Counter is maintained in the odd condition during the period of duplication. It is adjusted during the last cycle of duplication during which the even memory is again loaded with the appropriate character.

(E) All automatic punching functions are gated by the cam PC101. For this reason, provision is made to have a punch cycle during which no actuators are energized and in which no punching actually occurs. This is necessary for both duplication and parity punching.

(F) Since the machine ordinarily anticipates each automatic function by one cycle and since a movement of the program drum occurs prior to each odd column punch cycle, the even column star wheels, with the exception of the star wheel for detecting field definition, are off-set to the extent of one column spacing in relation to the odd column star wheels, so as thereby to be in column for column registration with the card at the punch station. Also, the odd column star wheel for detecting a parity start control hole is similarly off-set to be in column for column registration with the card at the punch station. Despite the off-set of the even column star wheels, it will readily be appreciated that prior to each even column punching cycle they have already made their respective contacts in the appropriate column for automatic control.

Automatic duplication

There are two modes of duplication. The first mode is duplication of a single column. It may be initiated by a single duplicate control hole in an odd or even column of the program card. It is possible to continue this mode of operation in successive columns by punching control holes for automatic duplication in successive columns of the program card. This first mode of duplication is the mode employed for duplication under manual keyboard control when there is no field definition punched in the program card. The second mode of duplication may be considered to be high speed duplication since it operates to duplicate successive columns, two colums at a time. The second mode of duplication is achieved only by utilizing field definition control perforations in the program card. An example of the first mode of duplication, i.e. single column duplication, will now be described.

As an example, it will be assumed that it is desired to duplicate the single column nineteen and that, accordingly, the program card has a control punching in the "8" index position of column nineteen. During the escapement preceding the punching of column seventeen, the program card star wheel for the odd column duplicate function will sense the hole in the program card to apply B— potential from line 361 over line 365 to the contacts R107–12 of the Odd-even Column Counter. However, at this time the circuit is open since the machine is in the odd column condition and about to punch column seventeen. At about 210° of the punching cycle for punching column seventeen, the column counter transfers or switches to the even column condition at which time the circuit is continued through the contacts of the Auto Dup-Auto Skip switch which, it is understood, is closed in order to employ program control for Auto Dup and Auto Skip functions, the circuit continuing through contacts R308–3 of the Manual Dup relay and contacts R225–4 of the Dup 1 relay to the control grid of tube T8. The plate circuit of tube T8, which includes the Dup 1 relay R225, runs over a common plate lead 364 to B+ through contacts operated by the cam PC107 which break at 210° of the punch cycle. Accordingly, Dup 1 relay R225 will not pick up in the punching cycle for column seventeen and not until zero degrees of the next punch cycle which is the punching cycle for column eighteen. At 45° of the column eighteen punch cycle, the contacts controlled by the cam PC104 make, see FIG. 8d, to establish a circuit through Odd-even Column Counter relay contacts R103–9, Dup 1 relay contacts R225–1, now transferred, Multi-punch relay contacts R306–3 and a diode for picking the Odd Keyboard Automatic Control relays R101 and R102 through their hold windings. At the same time, a parallel circuit is also established via line 373, the Even Field Definition relay contacts R122–1 and a diode to pick the Memory Read-in Control relays R105 and R106. At 86° of the eighteenth column punch cycle, the cam contacts operated by the cam PC101, see FIG. 8c, make, establishing B— potential on the reader pin contacts 306, thence over lines 365 to the contacts of the Odd Column Duplicating-Parity Control relay R201 which contacts are in turn connected by lines 366 to the contacts of the Odd Keyboard Auto Control relays R101 and R102. Thus at 86° of the eighteenth column punch cycle, the odd column reader pin contacts complete circuits from B— through the contacts of relay R201 of the contacts, now transferred, of the Odd Keyboard Auto Control relays R101 and R102 and thence to the odd column interposer magnets 320. At the same time, i.e. at 86° of the eighteenth column punch cycle, since the Memory Read-in Control relays R105, R106 are energized, the reader contacts for the even columns complete circuits through the Memory Read-in Control relay contacts and over lines 351 to the even column memory relays R205–R210 to store the data read from even column number twenty into the memory. Thus, during the eighteenth column punch cycle, the data read from column nineteen of the card at the read station is entered into the punch interposer magnets and the data read from column twenty of the card at the read station is entered into the even column memory. At 105° of the eighteenth column punch cycle, the contacts operated by the cam PC103 (FIG. 8a) close to complete a stepping pulse from B— potential to the Odd-even Column Counter through the circuit path heretofore described which includes contacts R304–2, R223–2, R124–2, and R305–2. From the contacts R305–2, a parallel circuit is now established through a diode to the Dup 1 relay contacts R225–3 now transferred to complete a circuit over line 367, contacts R125–2 of the Skip 1 relay, contacts R224–6 of the Release relay and thence over a line 368 running through contacts R121–4 of the Parity Punch relay straight to the space interposer magnet 320S, the circuit returning to B+ over common line 321 through the contacts operated by the cam CFC101. As fully described in the aforementioned Patent 2,647,581, the space interposer magnet when energized releases an interposer which is effective for actuating the interposer bail for the purpose of initiating a punching cycle but which does not cause any one of the punches to be coupled to the punch bail and therefore does not result in any punching of the card. The reason for energizing the space interposer magnet 320S is to ensure the duplication of a blank card column. At about 210° of the eighteenth column punch cycle, the Odd-even Column Counter switches from the even to the odd column state and also at about the same time of the cycle the contacts operated by cam PC107 (FIG. 8e) open to drop out the Dup 1 relay R225. However, during the course of this cycle, the information read from column 19 has energized the odd interposer magnets 320 which in turn have closed the interposer bail contacts 325 so as to cause the initiation of another punch cycle, i.e. the nineteenth column punch cycle which is the duplicating cycle. The circuit for initiating the nineteenth column punch cycle, i.e. the duplicating cycle, runs from the interposer bail contacts 325, normally at B— potential, through the normally closed contacts R103–11, R305–1, R303–3, and R224–3 to the control grid of tube T9 to bring in the Escape Magnet 315 causing the card to advance one column and close the escape contacts 315a which in turn pull in the Escape Interlock relay R303 to result in energization of the Punch Clutch magnet 310 which, it will be noted, is the same circuit as described for initiating a normal odd column punching operation.

To summarize briefly, a single odd column duplication commenced with the previous punch cycle. During the previous punch cycle, the interposer magnets were loaded from the reader pin contacts 306 via cam PC101. The loading of the interposer magnets 320 is what sustained the second punch cycle since it substituted for the keyboard in normal operations. From this point on, the punching cycle was a typical odd column punch cycle.

To describe mode one duplication for even columns, it will be assumed that the machine is programmed to duplicate the single even column number twenty-four. During the escapement preceding the punching of column twenty-three, the duplicate control hole in the program card is sensed by the star wheel to apply B— potential from the common lead 361, through the star wheel sensing contacts over line 371 to contacts R107–12 and thence through the closed Auto Skip-Auto Dup switch, contacts R308–3 and contacts R225–4 to the control grid of tube T8. When the punch cycle is initiated for punching columns twenty-three, the Dup 1 relay R225 will be energized at zero degrees of the cycle. At 45° of the cycle, the cam PC104, see FIG. 8d, establishes B— potential by way of contacts R103–9 normally closed, contacts R225–2, now transferred, contacts R306–4 and then via a diode to the Memory Read-out Control relay R204 and also via contacts R121–3 to the Even Keyboard Automatic Control relay R104.

At 86° of the column twenty-three punch cycle, the cam PC101, see FIG. 8c, makes its contacts establishing B— potential on the reader pin contacts 306 and also on the number "2" contacts of the even column memory relays R205–R210. These number "2" contacts of the memory relays determine the code combinations to be transferred to the even column interposer magnets 320.

in the machine. The card in the reader station is registered at column twenty-five and twenty-six, the card at the punching station is registered in columns twenty-three and twenty-four with the punches for column twenty-three presently being driven through the card. At 86° of the punch cycle for punching column twenty-three, the memory is read out from the memory read-out contacts over lines 371 (FIG. 8c), through the contacts of the Memory Read-Out Control relay R204 (now energized), over lines 372 to the contacts of the Even Dup-Parity Control relay R203, over lines 373 to the contacts of the Even Keyboard Automatic Control relay R104 (now energized), to the even column interposer magnets 320. With reference to the previous discussion of mode one duplication of an odd column, further action follows in the same manner as in the duplication of a single odd column. The Odd-even Column Counter is advanced to the even state and the space interposer magnet 320S is energized as a function of the closing of the punch shaft cams PC103. Energizing the interposer magnets for the even columns in accordance with the information read out from even column memory will initiate a punch cycle for punching column twenty-four immediately after the completion of the column twenty-three punch cycle. It will be noted that at 210° of the column twenty-three punch cycle, the Dup 1 relay R225 was dropped by the opening of the contacts of cam PC107 (FIG. 8e). Hence, the punch cycle for punching column twenty-four is a typical even column punch cycle which does not At this point we will note the registration of the cards include any duplication control. It will be noted further that the even column memory is being reloaded with information read from column twenty-six at the read station during the punching of column twenty-four. By punching the program card with duplication control perforations in successive columns of the program card, the sequence of odd and even column duplication may be continued in succession in a column by column manner as long as an uninterrupted series of control perforations for initiating the duplicating operation are contained in the program card.

The next operation to be described will be a mode two high-speed duplication, starting with an odd column. For the purposes of this explanation, it will be assumed that a duplication control hole is punched in column twenty-three of the program control card followed by field definition control holes, i.e., in the "Y" index position, of successive columns of the program card. During the punch cycle for column twenty-two, the Dup 1 relay R225 is picked at zero degrees of the cycle by way of cam contacts operated by the cam PC107 and the appropriate grid control previously described to the tube T8. At 45° of the column twenty-two punch cycle, cam PC104, see FIG. 8d, establishes B— potential through contacts R103-9, now transferred, contacts R225-1, now transferred, and contacts R306-3 to energize the Odd Keyboard Automatic Control relays R101 and R102. Simultaneously, the same B— potential is applied through contacts R122-1 of the Even Field Definition relay, thence to the relay R104 hold coil to pick the Even Keyboard Automatic Control relay, and through a diode to pick the Dup 2 relay R304. At 86° of the column twenty-two punch cycle, contacts of the cam PC101, see FIG. 8c, establish B— potential to the common line 352 for the reading pin contacts 306. The data in the odd column then at the read station, i.e. column twenty-three, is transferred to the odd punch interposer magnets 320 through the normally closed contacts of the Odd Dup-Parity Control relay R201 and over lines 366 to the contacts of the Odd Keyboard Automatic Control relays R101, R102, now transferred, and thence to the odd interposer magnets 320. At the same time, the data in the even column at the reader station, column twenty-four, is transferred to the even interposer magnets through the normally closed contacts of the Memory Read-In Control relays R105, R106, and the normally closed contacts of the Memory Read-Out Control relay R204 and thence over lines 372 to the normally closed contacts of the Even Dup-Parity Control relay R203, continuing over lines 373 through contacts of the Even Keyboard Automatic Control relay R104, now transferred, to the even interposer magnets 320. Thus, during the punching cycle for column twenty-two, information from columns twenty-three and twenty-four of the card at the read station are transferred simultaneously to the associated interposer magnets. At 105° of the column twenty-two punch cycle, the contacts operated by the cam PC103 close to drive the Odd-even Column Counter to the odd condition by a circuit running through the normally open contacts R304-2 (now transferred), a diode, over a line 374 to counter relay contacts R103-8. At the same time, the counter stepping pulse follows a parallel circuit from contacts R304-2 through another diode, over lines 367 and 368, through contacts R121-4 to the space interposer magnet 320S. At 185° of the column twenty-two punch cycle, the contacts of cam PC104 open which drops out relays R101, R102, R104. The pick circuit to Dup 2 relay R304 also opens; however, the Dup 2 relay R304 is held in by a hold circuit through contacts of cam PC105 running to the relay through its own hold contacts R304-1. The hold circuit for the Dup 2 relay will remain until 155° of the next punching cycle. Initiation of the next punching cycle for punching columns twenty-three and twenty-four takes place as a result of the activation of the interposer bail contacts 325, and in as much as the Odd-even Column Counter has been jammed in the odd state due to the transfer of the Dup 2 relay contacts R304-2, the punching cycle will be initiated similar to a normal odd column punch cycle which commences with card escapement. The escapement necessarily transfers the control over the Odd and Even column Field Definition relays. It will be noted that the Odd Column Field Definition relay R123, which is in the plate circuit of tube T2, will be picked upon the star wheel sensing member detecting a control perforation in the odd column field definition control hole to complete a circuit from the normally B— line 361 to the control grid of tube T2. Similarly, the Even Column Field Definition relay R122, in the plate circuit of tube T3, will be picked upon the sensing of an even field definition control hole to complete a circuit from line 361 to the control grid of tube T3. The plate circuit of both said tubes T2 and T3 is connected to B+ through the contacts of card feed cam CFC101. The Dup 2 relay, R304, is sustained by the alternating picking circuit and holding circuit established through the contacts of the PC104 and PC105, respectively. As long as both odd and even field definition continues to be present in the control card, relay R304 will be held and the duplication will continue on a two column per cycle basis. The transfer time of the odd or even Field Definition relays is approximately 280° to 300° of the punch cycle, during which period of time the plate circuit of the Escape Magnet can be energized via the cam PC106. It should be noted at this point that the interposer bail contacts 325 will close at approximately 100° of the cycle as a function of the energization of the interposer magnets which were energized at 86° of the cycle by way of the reader pin contacts 306. Closing of the interposer bail contacts establishes B— potential on the grid of the Escape Magnet tube T9. Energizing the Escape Magnet determines when the star wheel sensing contacts will make or break. The Odd or Even Field Definition relays are controlled directly by the star wheel sensing contacts.

Referring now to FIG. 8d, at 45° of the punch cycle B— potential is established to contacts R103-9 by the cam PC104 contacts and thence to the normally closed contacts R225-2, through the transferred Odd Field Definition contacts R123-3, the transferred Dup 2 relay contacts R304-3 to a first branch including, the transferred contacts of the Even Field Definition relay R122-1 to pick the Even Keyboard Automatic Control relay R104 and also through a diode to pick the Dup 2 relay R304, and to a second branch through a diode via line 373 a circuit is established also to the Odd Keyboard Automatic Control relays R101, R102. As long as Dup 2 relay remains and is held energized in the manner heretofore described, each punch cycle will accordingly bring in relays R101, R102 and R104 to effect the reading of both columns of the card at the read station into the interposer magnets on each punch cycle thereby affecting a high-speed duplication. In high-speed duplication, the counter control circuitry is used only to energize the space interposer magnet 320S to assure duplication of blank columns. The stepping pulse line to the Odd-even Column Counter is interrupted at the Dup 2 relay contacts R304–2 which results in maintaining the counter in the odd column condition.

Stopping a high-speed duplicating operation may be accomplished by the lack of either an odd or even column field definition control hole. If we assume for the moment that the odd field definition control hole is not present the Odd Field Definition relay R123 will drop out at approximately 280° of a punch cycle. At 45° of the next punch cycle when contacts of cam PC104 close to establish B— potential on contacts R103–9 and through the normally closed contacts R225–2 to contacts of the Odd Field Definition relay R123–3, the dropping out of this Odd Field Definition relay breaks the fixed circuit previously sustaining high speed duplication. However, a circuit is completed through the Dup 2 normally open contacts R304–6 and contacts R305–4 normally closed to pick the Memory Read-In Control relays R105, R106, the picking of which causes the read-in of the even column information into the even column memory. During this last punching cycle, the Dup 2 relay R304 is held by way of its holding contact R304–1 and the contacts operated by the cam PC105 until 155° of the cycle when the cam contacts open to drop the Dup 2 relay. Relays R105 and R106 are held in by the contacts R106–4 until the cam PC104 contacts open at about 180° of the cycle.

At this time we may review the sequence of operations in stopping the high speed duplication by losing an odd column field definition control hole. Upon the dropping of the Odd Column Field Definition relay R123, it is no longer possible to bring in the Even Keyboard Automatic Control relay R104 due to the transfer of contacts R123–3 which instead now cause pickup of the Memory Read-In Control relays R105, R106, which have the effect of transferring the next even column of the card at the read station into the even column memory. At 105° of the last punch cycle, a stepping pulse is generated from the cam PC103 contacts to the Odd-even Column Counter which pulse also energizes the space interposer magnet 320S. It will be remembered that the counter was held in the odd state throughout the duplicating operation and that at 105° of the last punch cycle, the Dup 2 relay is still held in. The stepping pulse to the counter is established from the cam PC103 contacts to Dup 2 contacts R304–2 still transferred, through a diode and line 367 to contacts R225–3 and thence through another diode to the Odd Field Definition relay contacts R123–1 which are now normally closed since odd column field definition has been lost, the circuit continuing through contacts R305–2 to the counter to switch the counter to the even column state. The same stepping pulse runs over lines 367 and 368 to the space actuator to cause the punch to cycle again. In effect, we have logically advanced the counter one step backwards and have spaced forwards. The purpose of doing this is to enable other automatic functions such as an automatic skip or parity punch to be recognized. It may be noted that the memory in this case is loaded twice. However, the punch cycling was an even column space cycle and there is no advance of the card by the escapement mechanism. During the space cycle, the Odd-even Counter is again stepped to switch to the odd column condition whereupon the machine is in condition for proceeding with the punching of the next odd column. It might be mentioned at this point that the loss of field definition control holes in both the odd and even columns simultaneously would have generated the same sequence of operations as above described.

If we assume now that the high speed duplication operation were to stop by reason of having lost even column field definition, the following circuits would be established. At 45° of the last punch cycle, the cam PC104 contacts make to establish B— potential through contacts R103–9 and contacts R225–2, normally closed, to the transferred contacts R123–3, thence to the transferred contacts R304–3 of the Dup 2 relay, over line 373 and through a diode to bring in the Odd Keyboard Automatic Control relay R101 and R102 through their hold windings. The dropping out of the Even Column Field Definition relay R122 transfers the previously fixed circuits through its contacts R122–1 to the Even Keyboard Automatic Control relay and Dup 2 relay so as now to pick the Memory Read-In Control relays R105, R106. This being the case, when the cam PC101 (FIG. 8c) contacts close at 86° of the cycle, only the odd column information is transferred to the odd column interposer magnets 320. The circuitry which previously was reading the even characters into the even interposer magnets is no longer energized. Hence at 86° of the cycle, the odd column is being read into the odd interposer magnets and the even column is being transferred into even column memory relays R205–R210. At 105° of this cycle, the cam PC103 (FIG. 8a) contacts pulse the counter control circuitry which, since the Dup 2 relay R304 is still energized, results in completing a circuit to the space interposer magnet over lines 367, 368. This provides assurance that the last duplication cycle will duplicate over a blank column of the card at the read station. At 155° of the cycle the Dup 2 relay R304 is dropped by the opening of its hold circuit through the cam PC105 contacts. Hold circuits are still provided however for relays R105 and R106 as well as for relays R101 and R102 through the contacts R106–4, and contacts R102–3, respectively. These latter hold circuits remain until 180° of the cycle when the cam PC104 contacts open. It will be noted that one more punch cycle will follow which will be a regular odd column punch cycle, during which cycle the Odd-even Column Counter will be switched from the odd to the even column condition through the counter step circuit via the cam PC103 contacts since during this cycle the Dup 2 relay is no longer energized.

At this point the description will return to the high-speed duplicating starting circuit to review conditions that would exist if a high speed duplicating operation started in an even column. For purposes of discussion it will be assumed that a duplicate control hole is punched in column twenty-four of the program card and that field definition control holes are punched into several columns immediately following. At zero degrees of the column twenty-three punch cycle the Dup 1 relay R225 is energized, through circuits heretofore described, as a result of the escapement of the card into position for punching column twenty-three and the subsequent closing of the cam PC107 contacts at zero degrees of the column twenty-three punching cycle. At 45° of the cycle the cam PC104 contacts close to establish a circuit through contacts R103–9 normally closed, contacts R225–2 normally open, to normally closed contacts R306–4 to pick the Memory Read-Out Control relay R204, the same circuit through contacts R121–3, normally closed, picking the Even Keyboard Automatic Control relay R104. Another parallel circuit is established from the contacts R306–4 through a diode to contacts R123–4, now transferred since field definition exists in the next odd column, to complete a circuit to the Dup 2 relay R304. At 86° of the column twenty-three punch cycle, punch cam PC101 contacts (FIG. 8c) apply B— potential to the "2" contacts of the memory relays R205–R210 so as to read-out the even column memory through the contacts now transferred of the Memory Read-Out Control relay R204, the circuits continuing over lines 372 to the normally closed contacts of the Even Dup-Parity Control relay R203 and thence over lines 373 to the contacts, now transferred, of the even Keyboard Automatic Control relay R104 to energize the even column interposer magnets in accordance with the memory read-out circuits. During the punching cycle for column twenty-three, the even column memory has been read into the even interposer magnets and the Dup 2 relay R304 has been picked. The Odd-even Column Counter circuit when pulsed at 105° of the cycle via the cam PC103 contacts interrupts the stepping pulse to the counter at the Dup 2 relay contacts R304–2 which are transferred to bring in the space actuator 320S over lines 367, 368. Dup 1 relay R225 holds until 210° of the cycle when the cam PC107 contacts open at which time the Dup 1 relay contacts R225–2 (FIG. 8d) restore to interrupt the circuit to the memory Read-Out Control relay R204. By this time, however, field definition control holes have been detected in the odd columns of the program card so that as the machine proceeds into the column twenty-four punching cycle, at 45° of the cycle, when contacts of the cam PC104 close with Dup 2 relay R304 still held, a circuit is completed through the normally closed contacts R225–2 and normally open contacts R123–3, normally open contacts R304–3 of Dup 2 relay and normally open contacts R122–1 to bring in the Even Column Automatic Control relay R104 through its hold winding so that, from this cycle on, the duplication at high speed continues by duplicating both the odd and even column each punch cycle, as heretofore described in connection with the operation starting with an odd column and continuing until field definition control is lacking in either an odd or even column of the program card.

In the manual keyboard controlled duplication, a windup cycle is provided for the punch shaft before the start of the operation. In automatically controlled duplication, the last punch cycle prior to the start of the operation has already been completed so that, in effect, a manually controlled duplicating control signal can not be recognized until about 345° later in the punch cycle than is the case in an automatic duplicating start. It is for this reason that a windup cycle is provided. The Multi-punch relays are utilized for the purpose of creating a free windup cycle and for adjusting the circuits so that appropriate relays are energized during the windup cycle. The Manual Dup key contacts 380, see FIG. 8b, are shown below the keyboard bail contacts 305. Depression of the Manual Dup key, which is not interlocked, completes a circuit from B— potential through Card Lever relay contacts R113–3 and over a line 381 to the Manual Dup relay R308, the circuit returning to B+ through the card feed cam CFC101 contacts. The relay R308 is provided with diode suppression for the purpose of protecting the duplicate key contacts and also for the purpose of providing a slow dropout. The relay contacts R308–2, see FIG. 8f, transfer to discharge a capacitor through a pair of diodes into the grid network of tubes T11 and T12. Tube T11 fires to energize the Punch Clutch magnet 310 causing the machine to commence the punch cycle. Tube 12 energizes the Multi-punch relays R305, R306. The Manual Dup relay contacts 308–1, see also FIG. 8f, close to effect a hold circuit through the hold winding of the relay which hold circuit is returned to B+ through lead 364 and the contacts operated by the cam PC107, this hold circuit taking effect at zero degrees of the punch cycle. The necessity for the slow drop out of relay R308 is apparent when one considers that the hold circuit is not immediately available but becomes operable after the punch shaft has been engaged and turned 15°. The Manual Dup relay contacts R308–4, see FIG. 8d, close to establish a hold circuit for the Multi-punch relays R305, R306 with the result that the Multi-punch relay is held in by the the contacts operated by the cam PC104 and its own hold contacts R305–3 until 180° of the punch cycle.

Returning now for a moment to the R–C circuit which initiated the punch cycle and the pickup of the Multi-punch relays, it will be apparent that the discharge of the capacitor is faster than the punch cycle and therefore turns off the tubes early in the cycle. The Multi-punch relays therefore stay up for only one cycle and can not be repicked unless the Manual Dup relay R308 is dropped out and the capacitor is allowed to recharge. Contacts R308–3 of the Manual Dup relay, see also FIG. 8f, transfer and apply B— potential through Dup 2 relay contacts R304—4 and over line 383 to the control grid of the Dup 1 relay control tube T8 via contacts R225–4 so as to bring in the Dup 1 relay R225. The Dup 1 relay will pick at zero degrees of the cycle and drop out at 210° of the cycle via contacts operated by the cam PC107. However, as long as the Manual Dup key is depressed, the Dup 1 relay R225 will continue to repick each cycle. Referring now to FIG. 8d, at 45° of the windup cycle, B— potential is applied to the Odd-even Column Counter relay contacts 103–9 via the contacts operated by the cam PC104. If the counter is in an odd column state, this potential is then applied through the normally open Dup 1 relay contacts R225–2 and thence to the normally open Multi-punch relay contacts R306–3. If the counter were in the even column state, the circuit would be through the normally open Dup 1 relay contacts R225–1 and thence to the normally open Multi-punch relay contacts R306–4. Effectively, the "3" and "4" contacts of the Multi-punch relay R306 interchange the function of the Odd-even Column Counter. This is to account for the fact that duplication is being detected after the counter has changed its state in the previous punch cycle. Accordingly, if the counter is in the odd column state, the circuit via the cam PC104 will bring in the Odd Column Automatic Control relays R101, R102, while if the column counter is in the even column state the circuit will bring in the Even Keyboard Automatic Control relay R104 along with the Memory Read-Out Control relay R204. During this first windup cycle, the column counter control circuit will not advance the counter due to the opening of the Multi-punch relay contacts R305–2 FIG. 8a. The stepping pulse to the counter, however, is effective for energizing the space interposer magnet R320S since the Dup 1 contacts R225–3 transfer to switch the pulse over lines 367, 368 to the space interposer magnet. However, it will be noted, with reference to FIG. 8f, that no escapement can occur as a result of energization of the space interposer magnet since the Multi-punch relay contacts R305–1 transfer so that, regardless of the condition of the Odd-even Column Counter, there will be no input to the grid circuit of the Escape Magnet control tube T9. The Dup 1 relay R225 was initially energized through the transfer of contacts R308–3 of the Manual Dup relay. Once energized, it established its own hold circuit via its contacts R225–4 which applies B— potential from the lead 327 to the control grid of the tube T8. Accordingly, at the completion of the windup cycle with the Manual Dup key held depressed and with the Multi-punch relays R305, R306 now dropped out, the machine will go through a succession of punch cycles alternating from odd to even columns just as in the case of a series of automatically initiated single column Dup cycles, heretofore described with the Odd-even Column Counter being stepped each punching cycle and bringing in alternately the Odd Keyboard Automatic Control relay R101 and the Even Keyboard Automatic Control relay R104 in conjunction with the Memory Read-Out Control relay R204.

During the course of a manually controlled duplicating operation, it is possible that through detection of field definition control holes in the program card the Dup 2 relay may be picked by transfer of either the Even Column Field Definition relay contacts R122–1 or the Odd Column Field Definition relay contacts R123–4. In this event it will be noted that upon energization of the Dup 2 relay, the Dup 1 relay R225 will drop out at 210° of punching cycle by opening of the contacts of the cam PC107 and cannot be repicked as long as the Dup 2 relay R304 remains energized, since the Dup 2 contacts R304–4 break the input circuit to the control grid of the Dup 1 relay control tube T8 so as to render the Manual Dup relay contacts R308–3 ineffective for firing the tube T8. It is only when the Dup 2 relay R304 drops out that it is again possible to pick the Dup 1 relay R225.

*Parity control*

In FIG. 8d is shown a typical Parity Counter comprised of a pair of relays R109, R211, and although only one counter is shown in the diagram it should be understood that, as indicated, one is provided for each index position row of the card, i.e. the six rows of index positions embracing the odd columns of the card and six embracing the even columns of the card. Each of the relays R109 and R211 have a pick and hold winding, and in the case of the relay R109 the pick and hold windings are oppositely wound for reasons which will hereinafter be explained. The pick winding of the relay R211 is connected through a 1.2K resistor to a lead 385, common to all the Parity Counters and which runs to B+ potential through the contacts of the card feed cam CFC101. The pick winding of relay R109 is also connected to the common lead 385 via a 5K resistor. The stepping pulses feed to the counter over the lead 322 which, as seen in FIG. 8b, is connected to the interposer input line 309 originating at the keyboard permutation bail contacts so as to feed B— potential, an input pulse, to a counter in parallel with the input to the associated interposer magnet 320. The inputs are initiated by keyboard operation and terminate with the energization of the Keyboard Restore magnet at the beginning of a punch cycle.

In the logics employed, the counter is in an odd parity count condition when the relay R211 is energized and is in an even parity count condition when the relay R211 is deenergized. Assuming for the moment that neither of the counter relays is energized which is the condition when the counter is cleared as will hereinafter be described, a stepping pulse resulting from keyboard operation will be applied to the normally closed contacts R211–1 and then through the hold winding of the relay R109 and to the B+ lead 385 through a 1.2K resistor so as to bring in relay R109. For the duration of this first input pulse, R109 is the only relay of the counter which will be held, and its contacts R109–1 will be transferred. At the termination of the input pulse, relay R211 energizes over a circuit running from the common B— lead 386, through its hold winding and thence through the transferred contacts R109–1 and the hold winding of R109 to the B+ common lead 385, thus holding both relays after the termination of the stepping pulse at which time contacts R211–1 will be transferred. The counter is now in the odd parity condition thus indicating that a punching of the card has resulted from the simultaneous energization of the associated interposer magnet 320.

With the counter now in the odd parity condition, the next or second input pulse to the counter will result in applying B— potential to the transferred contacts R211–1 and thus through the pick windings of relays R211 and R109. For the duration of this second input pulse relay R211 remains energized, but since the pick and hold windings of relay R109 are oppositely wound, the simultaneous energization of both its windings results in dropping the relay R109. At the termination of the second pulse, the circuit through the pick winding of relay R211 is broken. The relay drops out restoring its contacts R211–1, and both the relays remain deenergized to indicate an even parity count. In this manner, as successive input pulses are applied to the counter, the counter changes state alternating from odd to even parity count at the termination of the respective stepping pulse.

As seen in FIG. 8b, the number "2" contacts of the counter relay R211, along with the "2" contacts of corresponding relays, not shown, in each of the several parity counters are tied to the common lead 352, the contacts being normally closed, completing a circuit from lead 352 to the contacts of the Odd Duplicate-Parity Control relay R201 in the case of the odd column Parity counters and, in the case of the even column Parity counters, over lines 387 to the contacts of the Even Column Duplicating-Parity Control relay R203. The circuits from the relay R201 continue in the manner heretofore described to the contacts of the Odd Keyboard Automatic Control relays R101, R102 and thence to the odd column interposer magnets 320 so as to complete circuits to the magnets in accordance with the parity condition of the respective Parity Counters when the relays R201 and R101, R102 are energized. Similarly, the even column interposers will be energized in accordance with the parity condition of the even column Parity Counters when both the relay R203 and the relay R104 are simultaneously energized. The "2" contacts of the Parity Counter relays R211–R222 are normally closed so that on a parity punch cycle at termination of a parity field, brought about in a manner to be hereinafter described, if a counter is in even parity condition it will cause the punching of a parity bit.

The Parity Counters are conditioned for starting a parity count under program control, hereinafter more fully explained, by detection of a parity start control perforation which switches any counter which may be in the odd condition at the time to the even condition by applying B— potential to the positive side of relay R211 pick winding over a line 388, see FIG. 8d, which runs via a diode to a line 391 common to all odd column counters and thence through contacts R126–2 of the Parity Start relay, the contacts R103–12 of the Odd-even Column Counter relay and thence through the contacts operated by the cam PC104 to B— potential. The even column Parity Counters are cleared in a similar circuit running via a common lead 392 through the contacts R126–1 of the Parity Start relay, the contacts R103–12 of the column counter relay to B— potential through the contacts operated by the cam PC104.

In the presently described embodiment of the invention, as distinguished from the first embodiment of the invention heretofore described, parity start is programmed by perforating the program card with a parity start control perforation in both the odd and even column of the program card immediately preceding the parity field. The "1" index position of the column, as in the earlier described embodiment, is the index position employed for the parity start control perforation. It will be remembered that the star wheel supporting arm associated with the odd column parity start index position is off-set with respect to the other odd column star wheels so as to place both the odd column and even column star wheels associated with parity start control perforations in column for column registration with the card at the punch station. Assuming by way of example that a parity field is to start with column twenty-one, then the parity start control perforations would be punched in both columns nineteen and twenty. During the escapement advance of the card prior to punching odd column nineteen, both the odd and even column star wheels will sense a parity start control perforation and a circuit will be completed from the odd column star wheel contacts normally at B— potential via lead 361 through the normally closed contacts R107–5, since the column counter is in an odd column state, and thence to the control grid of tube T7 of which the plate circuit includes the Parity Start relay R126. The plate circuit of the tube however is open at this time via contacts operated by the cam PC107 and does not close until zero degrees of the nineteenth column punching cycle. At this point of the punching cycle, the tube fires to bring in relay R126 whose contacts R126-2, see FIG. 8d, close to clear the odd column Parity Counters in the manner heretofore described at 45° of the punch cycle when the contacts operated by the cam PC104 close. The clearing circuit via the cam PC104 contacts terminates at 180° of the cycle. At about 210° of the cycle, the Odd-even Column Counter switches to the even condition whereupon a circuit is completed from the even column parity start star wheel contacts through the normally open contacts R107-5 to the control grid of tube T7. However, at this same time the plate circuit of the tube is removed by operation of cam PC107 contacts so that the Parity Clear relay R126 is not energized at this time. At zero degrees of the column twenty punching cycle, the plate circuit will be restored to the parity start control tube T7 so as to bring in relay R126 whose contacts R126-1, see FIG. 8d, transfer so as to establish a circuit through column counter contacts R103-12, now transferred, for clearing the even column Parity Counters when the cam PC104 contacts close at 45° of the column twenty punch cycle. Thus, at the completion of the column twenty punch cycle, both the odd and even column Parity Counters will be cleared prior to the start of the cycle for punching column twenty-one which is the first column of the parity field. It will be seen that the clearing of the Parity Counters is accomplished in the last odd and even punching cycle preceding the start of the parity field, and it will be apparent that the same result will occur regardless of whether the parity field starts with an odd column or with an even column.

Parity punching is programmed by control perforations, as in the first embodiment of the invention, in the last two columns of the parity field. If we assume for example that the parity field ends with column thirty, then columns twenty-nine and thirty of the program card would be punched at the "2" index positions. In this case, upon the escapement of the card prior to the column twenty-seven punch cycle, the odd column parity punch star wheel contacts would close by detecting the control perforation in column twenty-nine to apply B— potential from common star wheel lead 361 to the normally open contacts of the column counter relay R107-4. Since the counter at this time is in the odd column state, the circuit is not completed to the control grid of the Parity Punch control tube T6. At about 210° of the column twenty-seven punch cycle, the Odd-even Column Counter switches to the even column condition, but since at this same time of the cycle the plate voltage on tube T6 is removed via the cam PC107 contacts, relay R121 is still not brought in. At zero degrees of column twenty-eight punch cycle, the plate circuit is restored to the tube T6 which energizes the Parity Punch relay R121 whose contacts R121-1, see left side of FIG. 8d, set up a circuit to the Odd Column Keyboard Automatic Control relays R102, R101 and the Odd Column Duplicating-Parity Control relay R201 in series therewith. At 45° of the column twenty-eight punch cycle, the circuit is completed to these relays via the cam PC104 contacts through the normally open column counter contacts R103-9. The picking of the relays R102, R101 and R201 establishes circuits which read out the odd column Parity Counters into the odd column interposer magnets 320 through circuit paths heretofore described so as to condition the machine to automatically initiate a punch cycle for punching column twenty-nine with odd row parity bits as determined by the condition of the odd column Parity Counters. After the completion of the column twenty-eight punching cycle, and as the card escapes prior to the automatically initiated column twenty-nine parity punch cycle, the even column parity punch star wheel will detect a parity punch control hole in column thirty and through its contacts complete a circuit from the common star wheel lead 361 and through the normally closed contacts R107-4 of the odd-even column counter to the tube T6, which circuit will be effective for firing the tube to bring in the parity punch relay R121 again at zero degrees of the column twenty-nine punch cycle. Thereafter at 45° of the column twenty-nine punch cycle, a circuit is established via the cam PC104, see FIG. 8d, through normally closed contacts R103-9 and through Parity Punch relay contacts R121-2 and R121-3, in parallel and now transferred, to bring in the Even Column Duplicating-Parity Control relay R203 and the Even Keyboard Automatic Control relay R104. Energization of these two relays complete circuits for reading out the even column Parity Counters, over circuit paths heretofore described, see FIGS. 8b and 8c, into the even column interposer magnets 320, thus conditioning the machine for automatically initiating a punch cycle for punching odd row parity bits in column thirty as determined by the parity condition of the even column Parity Counters. Thus it will be seen that in the last two columns of a parity field, under appropriate program control, two punching cycles will be automatically initiated to punch the last two columns in succession under control of the Parity Counters, and it will be apparent that this is true regardless of whether the parity field ends with an odd column or an even column. In the event that the parity field should end with an odd column, parity punch control holes in both the last even and last odd columns of the field will be detected simultaneously, but due to the control exercised by the Odd-even Column Counter contacts R107-4 in the grid circuit of tube T6, the Parity Punch relay R121 will be controlled to automatically initiate first the even column parity punch cycle followed by the odd column parity punch cycle.

*Automatic skip operations*

Automatic skip is similar to automatic duplication in that it has two modes of operation. Within these two modes of operation there are various cases of stopping and starting. Mode "1" of automatic skip is generally for the purpose of skipping a single column. Mode "2" skipping is primarily for the purpose of skipping multiple columns. Mode "1" skipping is essentially a spacing operation whereas mode "2" skipping latches the punch clutch and allows the escape clutch to free run until field definition control holes in the program card terminate. Before commencing the discussion of skipping operations some of the general principles pertaining to automatic operations heretofore set forth will be reviewed.

It will be understood that automatic skipping is initiated by an appropriate control hole in the program card so that the timing for the initiation of the automatic skipping is the previous punch cycle. On concluding the skipping operation it is desirable to place the even column back into memory since the character stored in the even column memory might be that read from many columns earlier. Furthermore, the Odd-even Column Counter must be adjusted so that it conforms to the termination of the skipped field as determined by field definition control punching. In as much as the column counter is stepped by a cam on the punch shaft, a punch cycle is provided for adjusting the column counter which punch cycle also operates to read the even columns into memory. Hence, all automatic skipping operation will end with a punch cycle.

As an example of mode "1" automatic skipping for a single odd column, we will assume that the program card is punched to skip column seventy-three which would mean that a perforation would be in the "X" index position in column seventy-three of the program card. During the column seventy-two punch cycle this control hole would be effective to pick the Skip 1 relays R124 and R125 at zero degrees of the cycle. This is accomplished by a circuit established by the odd Skip star wheel from the star wheel lead 361 normally at B— potential through the star wheel contacts to the normally open contacts R107-2 of the column counter, thence through the closed Auto Skip-Auto Dup switch and the normally closed contacts R225-5 to the grid of tube T5, the plate circuit to which includes the Skip 1 relays. The plate circuit for tube T5 is established at zero degrees of the column seventy-two punch cycle via the cam PC107 contacts so that the Skip 1 relays are energized at that time. At 45° of the cycle, the information control circuit of FIG. 8d is probed by a pulse through the cam PC104 contacts. However, it is only possible to energize the Memory Read-in Control relays R105, R106 through the normal path established in the even column punch cycles. This path can be traced from the cam PC104 contacts to normally open contacts R103-9 of the column counter relay to the normally closed contacts R225-1, thence through a diode to the normally closed contacts R305-4 and through another diode to the pick windings of relays R105 and R106. The fact that the Skip 1 relay contacts are closed in this circuit does not affect the circuit since there are no field definition relays energized. In the column counter control circuitry of FIG. 8a, a stepping or probe pulse via the cam PC103 contacts at 105° of the cycle steps the column counter to the odd condition and also energizes the space interposer magnet 320S, see also FIG. 8b. This circuit can be traced from the cam PC103 contacts to the normally closed contacts R304-2, normally closed contacts R223-2 to contacts R124-2 of the Skip 1 relay now transferred, thence through two diodes and normally closed contacts R225-3 to line 367 and thence over line 368 to the space interposer magnet 320S. Continuing from the normally open contacts of relay R124-2 the pulse also runs through one of two diodes through the normally closed contacts R123-1 and contacts R305-2 to step the Odd-even Column Counter to the odd state. At 210° of the column seventy-two punch cycle, the counter switches its state to the odd condition which opens the grid circuit to the Skip 1 relay at column counter contacts R107-2, while at the same time the plate circuit to the relay is reopened by the cam PC107 contacts so that the Skip 1 relays are dropped out at this time. Accordingly, with the space interposer magnet energized during the column seventy-two punch cycle, an odd column space cycle will thereby be initiated for column seventy-three, which odd space cycle as heretofore described, is preceded by card escapement and during which the column counter will be stepped to the even state so as to thereby effect the skipping of column seventy-three and place the machine in condition for punching column seventy-four.

The same logic is employed for the automatic skipping of a single even column. In this instance it will be assumed that we are programmed to skip the even column number eighty-two. During the column eighty-one punch cycle, the Skip "1" relays will be energized over a circuit from the star wheel lead 361 through the even column skip star wheel contacts to the normally closed contacts R107-2 of the column counter, since we are now in an odd punch cycle, and thence through the Auto Skip-Auto Dup switch and contacts R225-5 to the tube T5 which fires at zero degrees of the cycle when the plate circuit thereto is established via the cam PC107 contacts thereby energizing the Skip "1" relays. At 45° the information control circuitry is probed. However, no relays are energized as a result of the probe although certain Skip "1" relay contacts are transferred. In the column counter control circuitry of FIG. 8a, the stepping pulse via the cam PC103 contacts is able to step the column counter and also to energize the space actuator. The electrical path for this is the same as explained for the single odd column skipping operation above described. The Skip "1" relays will drop out at 210° of the cycle as a function of the opening of both the plate and the grid circuits for the tube T5. At the completion of the column eighty-one punch cycle, another punch cycle follows which cycle is an even column space cycle heretofore described, preceding which the card does not escape and no punching occurs but in which the column counter is again stepped to the odd condition to place the machine in condition for punching in column eighty-three. In summarizing single column automatic skipping, it will be seen that the picking of the Skip 1 relays operates to bring in the space interposer magnet at 105° of the punch cycle as a function of column counter control to initiate the cycling of the punch for another cycle which is a space cycle, thereby in effect skipping a single card column.

Mode "1" skipping is also followed for the skipping of two successive columns starting with an even column. For the purpose of this discussion we will assume that a skip control hole is punched into column eighty-two, as in the last example, and that a field definition control hole is punched into column eighty-three of the program card for the purpose of skipping both columns. As heretofore described, the skip control hole is detected during the column eighty-one punch cycle so as to bring in the Skip 1 relays R124, R125 at zero degrees of the cycle. The field definition control hole in column eighty-three is also detected at the beginning of the column eighty-one punch cycle to complete a circuit from the star wheel common lead 361 through the field definition contacts and thence to the grid of the tube T2 controlling the Odd Column Field Definition relay R123, the plate circuit of which runs directly to B+ through the contacts operated by the card feed cam CFC101. As a result, the Odd Column Field Definition relay is energized as the card escapes into position for punching column eighty-one. At 45° of the cycle, the information control circuitry of FIG. 8d allows odd column memory read-in as a function of having both the Odd Field Definition relay and the Skip 1 relay energized when the column counter is in the odd state. The memory read-in is provided so as to load column eighty-four information into memory before the escape movement of the card takes place to allow the registration to be advanced to column eighty-four as a function of the skipping of both columns eighty-two and eighty-three. The circuit for energizing the Memory Read-In Control relays R105, R106 is as follows. At 45° of the cycle, the cam PC104 contacts make to apply B— over a circuit to the normally closed contacts R103-9, the normally closed contacts R225-2, the transferred contacts of the Odd Field Definition relay R123-3, through a diode to Skip 1 relay contacts R124-4 now transferred, thence to the normally closed Dup "1" relay contacts R225-1, through a diode to the normally closed contacts R305-4 and thence through another diode to the pick windings of the Memory Read-In Control relays R105 and R106. The logic of the column counter control circuitry of FIG. 8a is such as to prevent stepping of the counter but to energize the space interposer magnet. The circuit for accomplishing this is from contacts of the cam PC103 when closed at 105° of the cycle through normally closed contacts R304-2, normally closed contacts R223-2, contacts R124-2 of the Skip 1 relay now transferred, and thence through a pair of diodes and contacts R225-3 to line 367 running, as before described, to the space interposer magnet 320S, see also FIG. 8b. It will be noted that the transfer of the contacts R123-1 of the Odd Field Definition relay prevents the stepping pulse from switching the Odd-even Column Counter. Energization of the space interposer magnet causes the initiation of another punch cycle. Since the column counter is in the odd state, this following punch cycle will be initiated by card escapement. At 210° of the column eighty-one punch cycle the Skip 1 relay is dropped. The following space cycle is a normal odd column space cycle during which the column counter is stepped to the even condition. Accordingly, the card has taken one escapement and the column counter has been switched to the even state so that, at the end of the space cycle, the machine is conditioned for punching column eighty-four, having skipped column eighty-two and column eighty-three.

The following examples will described Mode "2" automatic skipping which employs the Skip 2 relay R223, and for an example it will be assumed we are programmed to skip columns forty-seven and forty-eight, i.e. starting the skip in an odd column. The commencement of the skip starts in the same manner regardless of whether it is a mode "1" or mode "2" skip, i.e. the Skip 1 relays are energized at zero degrees of the previous cycle as a function of the skip program drum sensing contacts. Mode "2" skipping is established at 45° of that cycle. The Skip "2" relay is picked through the information control circuitry of FIG. 8d in the following manner. At 45° of the column forty-six punch cycle, the cam PC104 contacts close, thereby establishing a circuit through normally open contacts R103–9 to contacts R124–4 (now transferred) of the Skip 1 relay thence to contacts R122–2 of the Even Column Field Definition relay now transferred, to contacts R124–3 of the Skip "1" relay now transferred, and thence to the pick winding of the Skip 2 relay R223. This circuit is maintained until about 180° of the cycle. The Even Column Field Definition relay R122 is energized at this time because a field definition control hole, placed in column forty-eight, is detected by the even column field definition star wheel during the column forty-six punching cycle, since this star wheel, as before mentioned, is off-set relative to the other star wheels associated with even columns so as to be in register with the next higher numbered even column of the program card in relation to punch registration. Accordingly, in the column forty-six punching cycle, a circuit is established from the common star wheel head 361 through the even column field definition contacts to the control grid of tube T3 to energize the Even Column Field Definition relay R122, the circuit returning to B+ potential through the card feed contacts of the cam CFC101. Referring now to FIG. 8d, the cam PC104 contacts hold power on the pick coil of the Skip 2 relay until 180° of the cycle. The relay is slow to release, and thereafter at 200° of the cycle the cam PC105 contacts apply B— potential to the hold coil of the Skip "2" relay through its contacts R223–1, which circuit also it will be noted holds in the Memory Read-In Control relays R105 and R106. The Memory Read-In Control relays were picked also at 45° of the cycle by the cam PC104 contacts over a circuit running through contacts R103–9 transferred, contacts R225–1 normally closed, thence through a diode to contacts R305–4 normally closed, and through another diode to the pick windings of relays R105, R106. In the column counter control circuitry of FIG. 8a the column counter is jammed in the odd condition. The circuit for jamming runs from the cam PC103 contacts to contacts R304–2 normally closed, contacts R223–2 now transferred, through contacts R307–3 to contacts R124–1 of the Skip 1 relay now transferred, and thence to the column counter contacts R103–8 to switch the counter to the odd condition. It will be noted that the normal stepping pulse path to the counter is interrupted by contacts R223–2.

Referring now to lower left portion of FIG. 8f, B— potential is applied to the Escape magnet over a circuit running from the normally B— line 331, contacts R125–1 of the Skip 1 relay, normally closed contacts R123–5 of the Odd Field Definition relay, contacts R122–4 now transferred of the Even Field Definition relay, and thence to contacts R223–6 of the Skip 2 relay now transferred, to contacts R224–3 normally closed to the grid of tube T9, to energize the Escape magnet when the tube plate circuit is completed at 210° of the column forty-six punch cycle by the cam PC106 contacts. Once the Escape magnet is energized to start escapement, it is held energized to allow continued escapement by means of a series circuit including contacts of both the odd and even Field Definition relays in conjunction with the Skip 2 relay contacts, these being contacts R123–5, R122–4 and R223–6 which maintain the circuit to the Escape magnet control tube T9 from B— line 331 as long as field definition is detected in both odd and even columns as the card escapes. As long as the Escape magnet is energized, the Escape Interlock relay R303 is energized by means of the Escape magnet contacts 315a which apply B— potential from line 327 to the grid of tube T10 to hold the Escape Interlock relay R303 energized. As soon as one or the other of the Field Definition relays deenergizes, the Escape magnet is dropped which, in turn, opens the Escape magnet contacts 315a to deenergize relay R303. When this occurs, the Escape Interlock relay contacts R303–2 restore to establish a circuit from B— line 331 through contacts R223–4 of the Skip 2 relay still transferred, to contacts R303–2, now restored, and over line 332 to the grid of tube T11 controlling the Punch Clutch magnet 310. Inasmuch as positive potential is supplied during latch up time through the cam PC106 contacts, the clutch energizes to cause a punch cycle. The purpose of the punch cycle is to load memory and to adjust the column counter. It will be remembered that the Memory Read-In Control relays R105 and R106 are being held together with the Skip 2 relay R223 by way of the cams PC105 contacts until 155° of the punching cycle through contacts R223–1. At 155° of this punching cycle the hold circuit is broken and the Skip 2 relay R223 drops out at this time. However, an additional hold circuit for relays R105, R106 previously described, through contacts R106–4 and gated by the cam PC104 contacts holds these Memory Read-In Control relays until 180° of the punch cycle. To continue the specific example given, i.e. skipping columns forty-seven, forty-eight, it will be seen that the Escape magnet would be energized long enough for only one column escapement since field definition would be lacking in both columns forty-nine and fifty of the program card. Since the skip started in the column forty-six punching cycle, the card would escape one column to place column forty-seven and forty-eight in register with the punches, and in the final punch cycle of the skipping operation there would of course be no actual punching of the card but column fifty of the card at the read station would be read into the even column memory. The column counter being jammed in the odd column condition, during the escapement operation and during the time of the stepping pulse to the column counter in the last punch cycle of the skipping operation, will interrupt the normal stepping pulse circuit to the column counter at contacts R223–2 so that the counter remains in the odd column condition thereby conditioning the machine for the punching of column forty-nine after having skipped columns forty-seven and forty-eight.

In mode "2" skipping, starting from an even column, the start of the skipping operation takes place as described in conjunction with mode "1" skip, starting from an even column. However, at 45° of the last punch cycle preceding the skip, Skip 2 relay is energized together with the Memory Read-In Control relays. The circuit for accomplishing this, see FIG. 8d, runs from the contacts operated by the cam PC104 through contacts R103–9 normally closed because the counter is now in the odd column state, and thence to normally closed contacts R225–2, contacts R123–3 now transferred because of odd column field definition, thence through a diode and the contacts R122–2 now transferred because of even column field definition, thence through contacts R124–3 of the Skip 1 relay now transferred, and thence to the pick winding of the Skip 2 relay R223. Referring back in the circuit to the contacts R122–2 the circuit follows another path through the Skip 1 relay contacts R124–4 to normally closed contacts R225–1, thence via a diode and contacts R305–4 and through another diode to the pick windings of the Memory Read-In Control relays R105, R106. The read-in control at this point will cause the column presently at the read station to be read into the even column memory. It will be noted that these relays will be held until the next punch cycle, occurring at termination of the skip operation, during which cycle the even column then at the read station would be read into memory. The termination of the skip operation proceeds in the same manner as described in connection with mode "2" skip starting from an odd column, as a result of lack of a field definition control hole in either an odd or even column.

*Keyboard initiated skipping*

Referring to FIG. 8b it will be seen that the keyboard output includes contacts 395 labeled Manual Skip. Depression of the Skip key transfers, through the mechanical permutation system of the keyboard not shown herein but which follows the general encoding principles disclosed in the aforementioned Patent Number 2,647,581, three keyboard contacts which are the Skip key contacts 395, the space bar contacts, and the permutation bail contacts for the "X" card index position when the keyboard is in the numeral shift condition. Accordingly, depression of the manual Skip key will energize the space interposer magnet 320S and, depending upon the shift condition of the keyboard, the interposer magnet 320 for the "X" position. Therefore, it will be seen that manual operation of the Skip key will in any event cause a punch cycle which will be a space cycle if the keyboard is in the alpha shift condition or will be a recording cycle for punching the "X" index position if the keyboard is in the numeral shift condition. Depending upon the condition of the Odd-even Column Counter and also on whether even column field definition is present, the operation of the Skip key will also bring in the Manual Skip relay R307 over a circuit running from the Skip key contacts 395 tied to the common keyboard B— line 307 and thence over line 396 to the contacts R107–6 of the column counter and, if the counter is in the even column condition, directly to the Manual Skip relay R307. The contacts R307–1 hold the circuit until it is opened by the Keyboard Restore contacts 312a, it being understood of course that the circuit is completed to B+ potential through the card feed contacts of cam CFC101. At 45° of the punch cycle initiated by the Manual Skip key, the Skip 2 relay R223 is energized through a circuit, see FIG. 8d, extending from contacts of the cam PC104 and thence over line 348 through contacts R307–2 of the Manual Skip relay and thence to the pick winding of the Skip 2 relay R223. Before proceeding further we will note that the relay R307 has another hold circuit which permits it to remain energized although the keyboard is restored. This latter hold circuit is shown in the lower portion of FIG. 8f and includes the contacts R307–4 completing a circuit from line 331 normally at B— potential to the relay R307 and thence returning over line 364 to B+ potential through the contacts operated by the cam PC107 which make at zero degrees of the punch cycle. Relay R307 has diode suppression which enables the hold circuit to take effect although the keyboard may be restored prior to zero degrees of the cycle. Referring now to the counter control circuit of FIG. 8a, it will be noted that the stepping pulse to the counter from contacts operated by the cam PC103 at 105° of the cycle will, if we presume the counter to be in the even column state, switch the counter to the odd state via contacts R304–2, contacts R223–2 now transferred of the Skip 2 relay, contacts R307–3 of the Manual Skip relay now transferred, and thence to contacts R103–8 of the column counter to switch the counter if it is in the even column state. During this first punch cycle from an even column, which may be only a spacing cycle if the keyboard were in the alpha shift condition, the Skip 2 relay has been energized and the column counter has been switched to the odd column condition.

We will now investigate the conditions for stopping a manually initiated skip operation. If we presume that no field definition exists, the Escape magnet can not be energized, and if the Escape magnet is not energized then the Escape Interlock relay can not be energized. Since the Skip 2 relay contacts R223–4, see lower left portion of FIG. 8f, are transferred there is a circuit through these contacts, the normally closed contacts R303–2 and over line 332 to the grid of the Punch Clutch control tube T11 which will fire to initiate a second punch cycle. It will be noted that the keyboard restore mechanism has restored the Skip key contacts by this time, removing energy from the circuit to the Manual Skip relay R307. Referring now to the counter control circuitry of FIG. 8a it will be seen that, during the second punching cycle, the stepping pulse to the counter steps the counter to the odd condition and will also initiate another punch cycle by bringing in the space interposer magnet 320S. The circuit for accomplishing this is as follows, starting from the contacts of the cam PC103, to the contacts R304–2 normally closed, to Skip 2 relay contacts R223–2 now transferred, to the Manual Skip relay contacts R307–3 now restored, through the contacts R124–1 and thence via a diode to contacts R123–1 and contacts R305–2 to step the column counter to the even column condition. The space interposer magnet is energized over a parallel circuit from the Skip 1 relay contacts R124–1 thence through normally closed contacts R225–3 to the line 367 running through contacts R125–2 and R224–6 to line 368 and thence to the space interposer magnet 320S. During this second punch cycle, therefore, the column counter been stepped to the even column condition and the Skip 2 relay is dropped by the opening of its hold circuit as previously explained in discussing mode "2" automatic skipping operation. Accordingly, another or third punch cycle follows due to the fact that the space interposer magnet has been energized. At the completion of this third punch cycle, which is a normal space cycle, the machine comes to rest with the odd column counter has been stepped to the even column condition and odd column state. It will be noted that the Escape magnet was not energized at any time during the machine cycle just described but that the column counter has changed state so that the machine has in effect skipped a single even column.

It will now be assumed that, at the start of the manually initiated key skip operation, odd field definition exists in the next odd column. The operation would have been initiated in the same manner, i.e. the first punch cycle would have been caused by the space interposer magnet and also by the "X" index position interposer magnet if the keyboard were in the numeral shift condition. Under this condition, during the second punch cycle, the counter control circuitry will not step the column counter but does energize the space actuator. This can be seen by the circuit running from cam PC103 through contacts R304–2, contacts R223–2 now transferred, through contacts R307–3 now restored, contacts R124–1, contacts R225–3 to the line 367 and thence to the space interposer magnet. Returning now to the contacts R124–1 it will be observed that a parallel path through the diode and thus to the column counter is no longer available since the Odd Column Field Definition relay contacts R123–1 are now open. Under this condition the counter remains in the odd state. The space interposer magnet having been energized in the second cycle, another space cycle results with the column counter in the odd condition so that card escapement occurs prior to this third space cycle. The machine finally stops cycling at the end of the third cycle with the column counter in the even state and the card having escaped once, therefore, in effect skipping two card columns. If both odd and even column field definition had existed at the beginning of the skip operation, the Escape magnet would have become energized at 210° of the first punch cycle when the plate circuit to tube T9 makes via the cam PC106 contacts. The circuit for bringing in the Escape magnet at this time runs from the B— lead 331, see FIG. 8f, through contacts R123–5 now transferred of the Odd Column Field Definition relay and thence through contacts R122–4 now transferred of the Even Column Field Definition relay, and thence to contacts R223–6 of the Skip "2" relay now closed and to the normally closed contacts R224–3 to the grid of tube T9. The Escape magnet would have closed the Escape magnet contacts 315a so as to energize the Escape Interlock relay R303. The picking of the Escape Interlock relay R303 and opening of contacts R303–2 would have prevented the second punch cycle as took place in our prior example when there was not field definition in both an odd and even column. Hence, the machine now enters a mode "2" skipping operation as previously described in conjunction with automatic skipping operations.

Assuming now that manual skip is initiated from an odd column, the closure of the Skip key contacts establishes a circuit over line 396 to column counter contacts R107–6. If the machine is in an odd state, the circuit to the Manual Skip relay R307 is not completed unless even column field definition exists to complete the circuit through the Even Field Definition relay contacts R122–3. Hence, if even field definition does not exist, the machine merely spaces as a result of energization of the escape interposer magnet 320S. However, if even column field definition does exist, the Manual Skip relay R307 will be picked. A punch cycle is initiated as a result of energization of the space interposer magnet. Since this is an odd column space cycle, card escapement occurs prior to the actual punch cycle. At 45° of this punch cycle, cam PC104, see FIG. 8d, closes its contacts to apply B— potential over line 348 to contacts R307–2 to bring in the Skip 2 relay R223. The counter control circuitry of FIG. 8a is inactive on this cycle since the column counter is already in the odd column state. It will be recalled that this cycle was preceded by card escapement which places the machine under control of field definition programming in the succeeding columns. If field definition does exist in the next two card columns, the Escape magnet will be held energized, in the manner heretofore described, through the circuit from line 331 (FIG. 8f) to Odd Column Field Definition relay contacts R123–5, to Even Column Field Definition relay contacts R122–4 and through the Skip 2 contacts R223–6 to the Escape magnet control tube thus holding the Escape magnet energized under control of field definition, at which time the machine is in the normal mode 2 skipping operation heretofore described in conjunction with automatic skipping.

While there has been shown and described what are believed to be preferred embodiments of the invention, it is of course realized that various modifications and changes and forms could be made without departing from the spirit of the invention. It is therefore intended that the invention be not limited to the exact forms herein shown and described nor to anything less than the whole of the invention as hereinbefore set forth and hereinafter claimed.

What is claimed and desired to be secured by Letters Patent is:

1. In a machine for recording encoded data on a record medium divided into separate areas each including a plurality of adjacently arranged data recording columns each of which columns aligns with a column in another area of said record medium,
    (a) a line of recording members which includes groups of members separately operable in a corresponding separate area of said record medium,
    (b) means for selectively actuating said members in accordance with the data to be recorded, and
    (c) sequence control means for rendering the groups of said recording members operable in succession so that data is recorded in the aligned columns of the areas in succession.

2. The invention according to claim 1 wherein said recording medium comprises a card means and wherein said recording members comprise punches operable for perforating related positions of said card means.

3. The invention according to claim 2 including means for successively registering the adjacently disposed columns of said card with said line of punches throughout each sequence of operations of the individual groups of said punches.

4. The invention according to claim 1 including means for effecting in succession the registration of the adjacently disposed columns of said record medium with said line of recording members throughout each sequence of operations of the separate groups of said recording members.

5. In a machine for recording encoded data in a record medium divided into separate intelligent bearing halves, each half including a plurality of adjacently arranged data recording columns each of which columns aligns with a column in the other half of said record medium,
    (a) a line of recording members including groups thereof separately operable in each half of said record medium,
    (b) means for selectively actuating said members in accordance with the data to be recorded, and
    (c) sequence control means for rendering the individual groups of said recording members operable in succession so that data is recorded in the aligned columns of the intelligence bearing halves in succession.

6. The invention according to claim 5 wherein said recording means comprises a card means and wherein said recording members comprise punches operable for perforating related positions of said card means.

7. The invention according to claim 6 including means for registering in succession the adjacently disposed columns of said card means with said line of punches throughout the sequence of operation of said separate groups of punches.

8. The invention according to claim 5 including means for effecting sequential registration of the adjacently disposed columns of said recording medium with said line of recording members to enable the sequence of operation of the groups of said recording members.

9. In a machine for recording encoded data in a record medium divided into separate areas each including a plurality of adjacently arranged data recording columns, each of which columns aligns with a column in another area of said record medium,
    (a) a line of recording members including groups separately operable in corresponding separate areas of said record medium,
    (b) a line of reading members including groups separately operable in corresponding separate areas of said record medium,
    (c) means for stepping individual records synchronously past said line of reading members and said line of recording members, respectively,
    (d) means controlled by each group of said reading members for selectively actuating a corresponding group of said recording members to duplicate in the record medium at said line of recording members, and
    (e) sequence control means for rendering said groups of reading members effective in succession within each step position of said record medium in relation to said reading members.

10. The invention according to claim 9 wherein said reading members are perforation detecting elements and said recording members comprise punches for perforating the record medium in accordance with the perforations detected by said reading members.

11. The invention according to claim 9 wherein each said separate area comprises one half of the record medium, and wherein said sequence control means prevents operation of said stepping means until columns within both halves of said record medium have been sequentially read by said reading members.

12. The invention according to claim 9 including key means manually operable to place said recording members under control of said reading members.

13. In a keyboard controlled machine for recording encoded data column for column on a record medium having columns and rows of index positions, each column being adapted to record one item of encoded data,
 (a) a plurality of recording members including one for each index position of a record medium column,
 (b) means controlled by said keyboard for selectively actuating said members to record one encoded representation of data in a column of said record medium,
 (c) a plurality of counting means, each counting means associated with a respective one of said recording members for providing a parity count of the number of actuations of its associated recording member during the recording of a predetermined number of columns, in excess of one, of said record medium.

14. The invention according to claim 13 wherein said record medium is a card means and said recording members comprise punches actuable for perforating said card means.

15. The invention according to claim 14 including means controlled by each said counting means for selectively actuating its respective recording member in accordance with the parity count determined by said counting means.

16. The invention according to claim 13 including means controlled by each said counting means for selectively actuating the respective recording members in accordance with the parity count determined by said counting means.

17. In a machine for recording encoded data in a record medium divided into separate areas each including a plurality of adjacently arranged data recording columns, each of which columns aligns with a column in another area of said record medium,
 (a) a line of recording members including groups thereof separately operable in a corresponding separate area of the record medium,
 (b) a line of reading members including groups thereof separately operable in a corresponding separate area of a record medium,
 (c) means for synchronously stepping individual record mediums past said line of reading members and recording members, respectively.
 (d) means controlled by each group of said reading members for selectively actuating a corresponding group of said recording members to duplicate in the record medium at said line of recording members the data read by said reading members, and
 (e) sequence control means for rendering said groups of reading members effective in succession within each step position of said record mediums in relation to said reading members and recording members, respectively,
 (f) and, means including a programming device for defining fields of successive card columns over which said recording members are selectively actuated by said reading members.

18. The invention according to claim 17 wherein said reading members are perforation detecting elements and said recording members comprise punches for perforating a record medium in accordance with the perforations detected by said reading members.

19. The invention according to claim 17 wherein each said separate areas comprises one half of the record medium, and wherein said control means renders the reading members operable in each half of said record medium simultaneously effective for duplicating the data read by said reading members in the record medium at said line of recording members.

20. In a keyboard controlled machine for perforating records providing separate areas of adjacently arranged columns, each of which columns aligns with a column in another record area,
 (a) a line of punches including groups separately operable in corresponding separate areas of a said record,
 (b) escapement means for successively presenting aligned columns of the record into simultaneous registration with said line of punches,
 (c) means responsive to keyboard operation for selecting individual punches of a group in accordance with the code assigned to the operated keyboard key and for initiating a punching cycle, and
 (d) counting means activated at each punching cycle for conditioning said selecting means to select punches of different groups in successive punchings cycles and preventing operation of said escapement means until a punching cycle has been effected for each group of said punches.

21. The invention according to claim 20 wherein said separate areas comprise one half of the record and wherein said counting means prevents operation of said escapement means until a punching cycle has been effected for columns in each half of said record.

22. The invention according to claim 20 wherein said selecting means includes individual circuits between the keyboard and said punches and wherein said counting means includes a relay having transfer contacts in said circuits.

23. The invention according to claim 22 wherein the relay of said counter is effective for completing circuits from said keyboard for selecting the punches of one group in one punching cycle and the circuits for the punches of another group in the next punching cycle in a predetermined sequence.

24. In a keyboard controlled record punching machine of the character described,
 (a) a punch station including a plurality of punches for perforating a record column registered at said station,
 (b) escapement means for advancing successive columns of a record into registration with said punch station,
 (c) counter means associated with each of said punches for providing a parity count of the number of perforations produced by the associated punch, and
 (d) means advanced by said escapement means in synchronism with said record for programming said counter means for operation during the punching of a preselected field of successive record columns.

25. The invention according to claim 24 wherein each counter means includes parity read-out means for controlling the associated punch in accordance with the parity count determined by said counter means.

26. The invention according to claim 25 wherein said programming means operates when a selected column is in registration with said punch station to condition said counter means to start a parity count and further operates when another record column is advanced into registration with said punching station to activate said parity read-out means.

27. The invention according to claim 26 wherein said programming means includes a record prepunched with control perforations, a control perforation in one position causing said programming means to condition said counter means to start a parity count and in another position causing said programming means to activate said parity read-out means.

28. In a keyboard controlled machine for perforating records containing a series of adjacently arranged record columns in each of two separate record areas,
 (a) a punching station including a line of punches selectively operable in response to key operation for perforating a record column during a punching cycle in accordance with the code assigned to the operated key,
(b) escapement means for simultaneously advancing both columns of said record column by column into registration with said punch station, and
(c) means activated during the cycle for punching a column in one area of said record for conditioning said punches to perforate a column in another area of said record in response to the next key operation, whereby punching is effected in both said record areas alternately during a succession of key operations.

29. The invention according to claim 28 wherein said conditioning means includes a counter for enabling operation of said escapement means in conjunction with every other punching cycle.

30. In a keyboard controlled machine for punching a record divided into separate areas, each area including a series of adjacently arranged columns, the columns in one area being in longitudinal alignment with those in the other area,
(a) a punching station including a line of punches, said punches including groups separately operable during a punching cycle in each of said record areas,
(b) means for advancing both areas of said record past said punch station,
(c) escapement means operable in conjunction with selected punching cycles for controlling said advancing means to simultaneously advance step by step columns within both of said record areas into registration with said punching station,
(d) programming means driven by said advancing means in synchronism with said record, said programming means including a program record arranged in the same columnar format as said first mentioned record, said programming means further including sensing members for detecting control perforations simultaneously in columns within both areas of said program record,
(e) means for activating said escapement means independently of a punch cycle to initiate a skip advance of said record advancing means, and
(f) means controlled by said programming means in response to sensing of control perforations in predetermined positions within columns of both areas of said program record for maintaining said escapement means activated to continue said skipping advance.

31. The invention according to claim 30 including means controlled by said programming means in response to the sensing of a different control perforation in a column of said program record for activating said escapement means to initiate a skip advance of said record advancing means.

32. The invention according to claim 30 wherein said activating means includes a key of the keyboard.

33. The invention according to claim 30 including counter means for enabling one of the other groups of said punches to operate in the first punching cycle following said skip advance depending upon whether the skip advance was terminated by said programming means upon sensing said predetermined control perforation in only one area of said program record or by not sensing said predetermined control perforations in either area of said program record.

34. In a keyboard controlled machine for punching a record divided into separate record areas, each record area including a series of adjacently arranged record columns, the columns of one area being in longitudinal alignment with the columns in another area,
(a) a punching station including a line of punches, said punches including groups separately operable during a punching cycle in each of said record areas,
(b) a reading station including a line of reading members, said reading members including groups separately operable in each of said separate record areas,
(c) escapement means for synchronously advancing step by step a record past said punching station and another record past said reading station to present columns within both areas of each record in registration with said line of punches and said line of reading members, respectively,
(d) programming means driven under control of said escapement means in synchronism with the stepping of said records, said programming means including a program record having columns arranged in the same columnar format as said first mentioned record, said programming means further including sensing members for detecting control perforations in columns within both areas of said program record,
(e) means for placing said punches under control of said reading members to initiate a punching cycle in which perforations detected by said reading members are duplicated by said punches in the record at said punching station,
(f) and means controlled by said programming means in response to sensing of control perforations in a predetermined position within both areas of said program record for maintaining said punches under control of said reading members to initiate a succession of duplicating cycles for duplicating perforations sensed in both areas of the record at said reading station.

35. The invention according to claim 34 wherein the means for placing said punches under control of said reading members includes an element of said programming means responding to the detection of a control perforation in another position within said program record.

36. The invention according to claim 34 wherein the means for placing said punches under control of said reading members includes a key of said keyboard.

37. The invention according to claim 34 including means for terminating a succession of duplicating cycles with a cycle wherein the perforations read from only one record area are duplicated when the program sensing members detect said predetermined control perforation in only the corresponding area and not the other area of said program record.

38. In a keyboard control machine for perforating records containing a series of adjacently arranged record columns in each of two record areas, the columns of one record area aligning with those in the other record area,
(a) a punching station embracing both record areas and including a line of punches selectively operable for perforating a record column during a punching cycle,
(b) escapement means for simultaneously advancing columns within both of said record areas column by column into registration with said punching station,
(c) means controlled by said keyboard for selecting punches for operation during a punching cycle,
(d) means responsive to the selection of punches for operation for initiating a punching cycle, and
(e) counting means activated during a cycle for punching a column in one area of said record for conditioning said selecting means to select punches for perforating a column in another area of said record in the following punching cycle, said counting means further conditioning said escapement means for operation in conjunction with every other punching cycle, whereby punching is effected in both said record areas alternately during a succession of punching cycles.

39. The invention according to claim 38 wherein said escapement means is activated, when conditioned by said counting means, subsequent to the operation of said punches during the course of a punching cycle.

40. The invention according to claim 38 wherein said escapement means is activated, when conditioned by said counting means, prior to the initiation of a punching cycle.

41. The invention according to claim 38 including a reading station comprised of a line of reading members for sensing columns within both areas of another record medium advanced to said reading station by said escapement means in synchronism with the advance of said first mentioned record medium, said reading members when effective controlling said selecting means in accordance with the data read from said second mentioned record medium.

42. The invention according to claim 41 wherein said records are advanced by said escapement means in column to column registration with each other relative to the punching station and reading station, respectively, and wherein said reading members are operable earlier in the punching cycle than said punches for controlling said selecting means to select punches for operation in the same punching cycle.

43. The invention according to claim 38 including a reading station embracing both areas of another record medium and comprising a line of members for reading columns within both areas of said other record medium and controlling said selecting means in accordance with the data read from said other record medium, the columns within each area of said second mentioned record medium being registered with said reading station one column ahead of the registration of the columns of said first record medium with said punching station, said reading members being operable in one punching cycle for controlling said selecting means to select punches for operation in a subsequent punching cycle.

44. The invention according to claim 43 including memory means connected to the members for reading columns in one area of said second mentioned record medium for storing the data read by said members and controlling said selecting means to select punches for operation in a subsequent punching cycle.

References Cited by the Examiner
UNITED STATES PATENTS

| | | | |
|---|---|---|---|
| Re. 21,719 | 2/41 | Maul | 234—44 |
| 2,566,931 | 9/51 | Cunningham et al. | 234—15 |
| 2,684,718 | 7/54 | Luhn | 234—43 |
| 2,729,289 | 1/56 | Maul | 234—44 |
| 2,751,007 | 6/56 | Maul | 234—18 |
| 2,814,003 | 11/57 | Alizon | 317—140 |
| 2,901,041 | 8/59 | Barbeau et al. | 234—33 |
| 2,998,912 | 9/61 | Hagen | 234—18 |
| 3,023,952 | 3/62 | Thomas | 234—13 |
| 3,025,433 | 3/62 | Rogers | 317—140 |

ANDREW R. JUHASZ, *Primary Examiner.*

FRANK H. BRONAUGH, J. SPENCER OVERHOLSER, *Examiners.*